(12) United States Patent
Guo et al.

(10) Patent No.: US 12,444,378 B2
(45) Date of Patent: Oct. 14, 2025

(54) DISPLAY PANEL, DRIVING METHOD THEREOF AND DISPLAY APPARATUS

(71) Applicant: BOE Technology Group Co., Ltd., Beijing (CN)

(72) Inventors: Yuzhen Guo, Beijing (CN); Haoliang Zheng, Beijing (CN); Minghua Xuan, Beijing (CN); Hebin Zhao, Beijing (CN); Meirong Lu, Beijing (CN); Chenyang Zhang, Beijing (CN); Li Xiao, Beijing (CN); Xiaorong Cui, Beijing (CN); Jiao Zhao, Beijing (CN); Shulei Li, Beijing (CN); Weixing Liu, Beijing (CN); Jintao Peng, Beijing (CN); Chunfang Zhang, Beijing (CN); Xinxing Wang, Beijing (CN); Zhiqiang Xu, Beijing (CN); Wanpeng Teng, Beijing (CN); Kai Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/290,924

(22) PCT Filed: Sep. 5, 2022

(86) PCT No.: PCT/CN2022/117117
§ 371 (c)(1),
(2) Date: Jan. 22, 2024

(87) PCT Pub. No.: WO2023/226230
PCT Pub. Date: Nov. 30, 2023

(65) Prior Publication Data
US 2024/0257772 A1  Aug. 1, 2024

(30) Foreign Application Priority Data
May 26, 2022 (CN) .......................... 202210590095.1

(51) Int. Cl.
G09G 3/34 (2006.01)
G02F 1/167 (2019.01)
G02F 1/16756 (2019.01)
G02F 1/16761 (2019.01)
G02F 1/16766 (2019.01)
G02F 1/1677 (2019.01)
G02F 1/1685 (2019.01)

(52) U.S. Cl.
CPC ............. *G09G 3/344* (2013.01); *G02F 1/167* (2013.01); *G02F 1/16756* (2019.01);
(Continued)

(58) Field of Classification Search
CPC .......... G09G 3/344; G09G 2300/0814; G09G 2310/0205; G09G 2310/0262;
(Continued)

(56) References Cited

U.S. PATENT DOCUMENTS 7,612,760 B2 * 11/2009 Kawai .................... G09G 3/344
                                                                      345/204
7,706,051 B2 *  4/2010 Hattori .................... G02F 1/167
                                                                      359/290
(Continued)

FOREIGN PATENT DOCUMENTS

CN      101963733 A      2/2011
CN      103309114 A      9/2013
(Continued)

OTHER PUBLICATIONS

Search Report dated Aug. 12, 2023 issued in corresponding International Application No. PCT/CN2023/092267.

*Primary Examiner* — Amy Onyekaba
(74) *Attorney, Agent, or Firm* — Nath, Goldberg & Meyer; Joshua B. Goldberg

(57) ABSTRACT

A display panel, a method for driving a display panel, and a display apparatus are provided. The display panel includes a first base substrate and a plurality of pixels on one side of the first base substrate. Each pixel includes: a plurality of pixel sub-electrodes independent from each other and configured to form an electric field with an included angle greater than 0 with respect to a direction perpendicular to the first base substrate under control of incompletely same driving sig-
(Continued)

nals; a common electrode on a side of the pixel electrode away from the first base substrate; and an electrophoretic liquid layer between the pixel electrode and the common electrode, including a plurality of charged particles therein.

18 Claims, 33 Drawing Sheets

(52) U.S. Cl.
CPC ...... *G02F 1/16761* (2019.01); *G02F 1/16766* (2019.01); *G02F 1/1677* (2019.01); *G02F 1/1685* (2019.01)

(58) Field of Classification Search
CPC .. G02F 1/167; G02F 1/16756; G02F 1/16766; G02F 1/1677; G02F 1/16761; G02F 1/1676
See application file for complete search history.

(56) References Cited

U.S. PATENT DOCUMENTS

| | | | | |
|---|---|---|---|---|
| 2006/0017865 A1* | 1/2006 | Tsubata | ............. | G02F 1/133512 349/106 |
| 2010/0134871 A1* | 6/2010 | Wang | ...................... | G02F 1/167 359/296 |
| 2011/0102480 A1* | 5/2011 | Miyasaka | ............ | G04G 9/0005 345/107 |
| 2011/0285756 A1* | 11/2011 | Sato | ..................... | G09G 3/2003 345/107 |
| 2011/0304654 A1* | 12/2011 | Murayama | ........... | G09G 3/3446 345/107 |
| 2012/0032992 A1* | 2/2012 | Lim | ........................ | G02F 1/167 349/1 |
| 2012/0069425 A1* | 3/2012 | Sato | ........................ | G02F 1/167 359/296 |
| 2016/0147097 A1* | 5/2016 | Makino | ............. | G02F 1/133345 349/33 |
| 2016/0342039 A1* | 11/2016 | Chen | ................... | G02F 1/13439 |
| 2018/0082648 A1* | 3/2018 | Xu | ....................... | G09G 3/2074 |
| 2018/0136531 A1 | 5/2018 | Moriwaki | | |
| 2018/0151598 A1* | 5/2018 | Nakamura | ......... | G02F 1/136204 |
| 2020/0033688 A1* | 1/2020 | Zhang | ................ | G02F 1/13439 |
| 2021/0012697 A1* | 1/2021 | Xu | ........................ | G02F 1/1685 |
| 2024/0274056 A1* | 8/2024 | Huang | .............. | G02F 1/134309 |

FOREIGN PATENT DOCUMENTS

| | | |
|---|---|---|
| CN | 103984147 A | 8/2014 |
| CN | 106324881 A | 1/2017 |
| CN | 104317132 B | 6/2017 |
| CN | 114764205 A | 7/2022 |
| CN | 113728375 B | 1/2023 |
| JP | 3011-237582 A | 11/2011 |
| WO | 2014147731 A1 | 9/2014 |

* cited by examiner

```
┌─────────────────────────────────────────────────────────────────────┐  S101
│  Determining a pixel in which charged particles are to move along the direction │
│  parallel to the plane where the first base substrate is located according to a picture │
│                           to be displayed                            │
└─────────────────────────────────────────────────────────────────────┘
                                    ▼
┌─────────────────────────────────────────────────────────────────────┐
│ In a data writing stage, providing a first driving signal to the common electrode in │
│ the pixel in which the charged particles are to move along the direction parallel to │  S102
│   the plane where the first base substrate is located, providing the incompletely   │
│ same second driving signals to the plurality of pixel sub-electrodes included in the │
│  pixel electrode in the pixel, to drive at least part of the charged particles to move │
│    along the direction parallel to the plane where the first base substrate is located │
└─────────────────────────────────────────────────────────────────────┘
```

FIG. 43

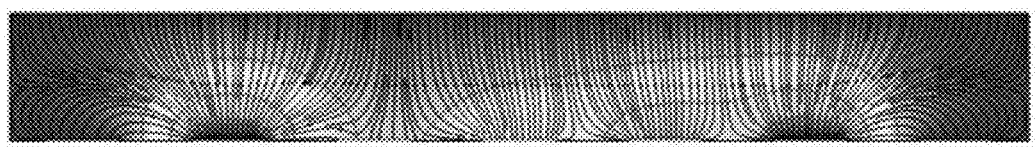

FIG. 44

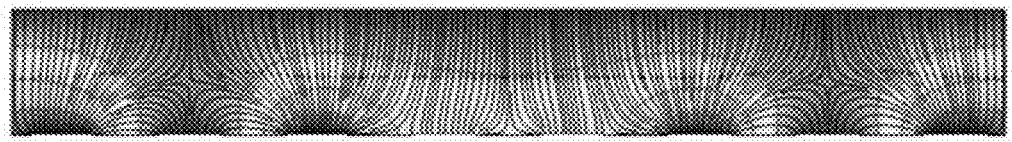

FIG. 45

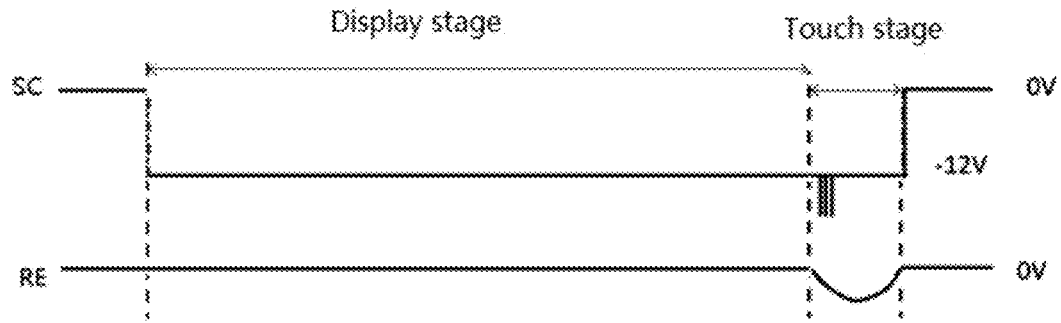

FIG. 46

DISPLAY PANEL, DRIVING METHOD THEREOF AND DISPLAY APPARATUS

CROSS-REFERENCE TO RELATED APPLICATIONS

This is a National Phase Application filed under 35 U.S.C. 371 as a national stage of PCT/CN2022/117117, filed Sep. 5, 2022, an application claiming the benefit of Chinese Application No. 202210590095.1, filed May 26, 2022, the content of each of which is hereby incorporated by reference in its entirety.

TECHNICAL FIELD

The present disclosure relates to the field of display technology, and in particular to a display panel, a method for driving a display panel, and a display apparatus.

BACKGROUND

Electronic paper display products have received a great deal of attention due to their advantages of protecting eyes and saving electricity. A non-capsule type electrophoretic display structure has the advantages of improving reflectivity, reducing response time, improving gray scale capability and the like.

The non-capsule type electrophoretic display structure is characterized in that an electrophoretic liquid layer is formed on a surface of a back plate, and then an upper glass substrate covers the electrophoretic liquid layer in a vacuum cell-assembly mode. The electrophoretic liquid in the electrophoretic liquid layer includes electrophoretic particles with different colors, and electrodes respectively arranged on two sides of the electrophoretic liquid layer are controlled to generate a vertical electric field, so as to adjust the aggregation degree of the electrophoretic particles with different colors at the top of the cell and at the bottom of the cell, to realize different gray scales. However, the electrophoretic particles move for a longer distance under the action of the vertical electric field, resulting in longer driving time and longer refreshing time.

SUMMARY

The embodiment of the present disclosure provides a display panel, which includes: a first base substrate and a plurality of pixels on one side of the first base substrate; each pixel includes: a pixel electrode including a plurality of pixel sub-electrodes independent from each other and configured to form an electric field with an angle greater than 0 with respect to a direction perpendicular to the first base substrate under control of incompletely same driving signals; a common electrode on a side of the pixel electrode away from the first base substrate; and an electrophoretic liquid layer between the pixel electrode and the common electrode, including a plurality of charged particles therein.

In some embodiments, the plurality of charged particles in each pixel includes: a plurality of charged particles of a first color and a plurality of charged particles of a second color each having an electrical property opposite to that of each of the plurality of charged particles of the first color; and the number of the plurality of charged particles of the first color is greater than that of the plurality of charged particles of the second color.

In some embodiments, a ratio of the number of the plurality of charged particles of the first color to the number of the plurality of charged particles of the second color is greater than or equal to 2.

In some embodiments, the plurality of charged particles in each pixel are the charged particles of the first color.

In some embodiments, the display panel further includes: a reflective layer between the first base substrate and the electrophoretic liquid layer.

In some embodiments, the reflective layer is between the first base substrate and the pixel electrode.

In some embodiments, the reflective layer is made of a metal material, and the display panel further includes a first insulating layer between the reflective layer and the pixel electrode.

In some embodiments, the reflective layer is made of a metal material, and is in the same layer as the pixel electrode; and an orthographic projection of the reflective layer on the first base substrate and an orthographic projection of the pixel electrode on the first base substrate do not overlap with each other.

In some embodiments, the display panel further includes: a light shielding layer between the reflective layer and the first base substrate.

In some embodiments, each pixel further includes: a color filter layer between the first base substrate and the pixel electrode and including a plurality of color filters; and an orthographic projection of the pixel electrode on the first base substrate overlaps with an orthographic projection of the corresponding color filter on the first base substrate.

In some embodiments, the display panel further includes: a second insulating layer between the pixel electrode and the electrophoretic liquid layer.

In some embodiments, the display panel further includes a plurality of blocking electrode groups; each blocking electrode group is between any two adjacent pixels, and is configured to: form an electric field to block the charged particles in the pixel from moving to the adjacent pixels; the electric field formed by the blocking electrode group has a component in a direction parallel to a plane where the first base substrate is located; and each blocking electrode group includes: a plurality of strip-shaped blocking electrode portions respectively on both sides of the pixel electrode in an arrangement direction of the plurality of pixel sub-electrodes; the strip-shaped blocking electrode portions on each side of the pixel electrode are independent from each other in the arrangement direction of the plurality of strip-shaped electrodes.

In some embodiments, each blocking electrode group includes only the strip-shaped blocking electrode portions; and each strip-shaped blocking electrode portion further serves a touch electrode.

In some embodiments, the display panel further includes: a plurality of first touch signal lines and a plurality of second touch signal lines; an extending direction of each first touch signal line is the same as that of each strip-shaped blocking electrode portion, and an extending direction of each second touch signal line is the same as the arrangement direction of the strip-shaped blocking electrode portions; and for any side of the pixel electrode of each pixel, an outermost strip-shaped blocking electrode portion is electrically connected to a corresponding first touch signal line, and a strip-shaped blocking electrode portion closest to the pixel electrode is electrically connected to a corresponding second touch signal line.

In some embodiments, each blocking electrode group includes a first strip-shaped blocking electrode portion to an nth strip-shaped blocking electrode portion on each side of the pixel electrode in a direction from the strip-shaped blocking electrode portion to the pixel electrode, where n is an integer greater than or equal to 2; and each blocking electrode group further includes: n connection portions; the n connection portions include a first connection portion to an nth connection portion; an ith connection portion is connected to two ith strip-shaped blocking electrode portions; wherein i is an integer, and 1≤i≤n.

In some embodiments, two ith strip-shaped blocking electrode portions are connected to only one ith connection portion; and the n connection portions are on the same side of the pixel electrode in the extending direction of each strip-shaped blocking electrode portion.

In some embodiments, two ith strip-shaped blocking electrode portions are connected to only one ith connection portion; and the n connection portions are on different sides of the pixel electrode in the extending direction of each strip-shaped blocking electrode portion.

In some embodiments, the plurality of pixels includes a plurality of pixel rows; in the plurality of blocking electrode groups corresponding to each pixel row, the connection portions on the side of the pixel electrode and farthest from the pixel electrode are integrally connected in the extending direction of the strip-shaped blocking electrode portion in the row.

In some embodiments, two ith connection portions are connected to two ends of each ith strip-shaped blocking electrode portion, respectively, in an extending direction of the ith strip-shaped blocking electrode portion; the two ith connection portions and the two ith strip-shaped blocking electrode portions are connected together to form an annular blocking electrode.

In some embodiments, the plurality of charged particles includes: charged particles of a first color and charged particles of a second color; and the strip-shaped blocking electrode portions on each side of the pixel electrode in the direction from the strip-shaped blocking electrode portion to the pixel electrode include: a first strip-shaped blocking electrode portion, a second strip-shaped blocking electrode portion between the first strip-shaped blocking electrode portion and the pixel electrode, and a third strip-shaped blocking electrode portion between the second strip-shaped blocking electrode portion and the pixel electrode.

In some embodiments, the plurality of charged particles are charged particles of a first color; and the strip-shaped blocking electrode portions on each side of the pixel electrode in the direction from the strip-shaped blocking electrode portion to the pixel electrode include: a first strip-shaped blocking electrode portion, and a second strip-shaped blocking electrode portion between the first strip-shaped blocking electrode portion and the pixel electrode.

In some embodiments, the first strip-shaped blocking electrode portions of the plurality of blocking electrode groups are integrally connected, and a pattern of an orthographic projection of the integrally connected first blocking strip-shaped electrode portions of the plurality of blocking electrode groups on the first base substrate is a grid pattern.

In some embodiments, the annular blocking electrode and the pixel electrode are arranged in the same layer.

In some embodiments, the display panel further includes: a plurality of blocking structures on a side of the common electrode close to the first base substrate; an orthographic projection of each blocking structure on the first base substrate overlaps with an orthographic projection of the corresponding blocking electrode group on the first base substrate; a distance between each blocking structure and the corresponding blocking electrode group is greater than 0 in the direction perpendicular to the first base substrate.

In some embodiments, each pixel sub-electrode includes at least one strip-shaped electrode, and at least some of the strip-shaped electrodes of the plurality of pixel sub-electrodes are arranged at intervals.

In some embodiments, the display panel includes a blocking electrode group, including a strip-shaped blocking electrode portion; and in an arrangement direction of the strip-shaped electrodes, a width of the strip-shaped blocking electrode portion is less than that of each strip-shaped electrode, a distance between every two adjacent strip-shaped blocking electrode portions is less than that between every two adjacent strip-shaped electrodes, and a distance between the strip-shaped electrode and the strip-shaped blocking electrode portion adjacent to each other is less than that between every two adjacent strip-shaped electrodes.

In some embodiments, each pixel further includes a plurality of driving units between the pixel electrode and the first base substrate; the plurality of driving units are electrically connected to the plurality of pixel sub-electrodes in one-to-one correspondence manner; each driving unit includes at least a first driving transistor.

In some embodiments, the display panel further includes: a plurality of first scanning signal lines and a plurality of data signal lines; a source electrode of each first driving transistor is electrically connected to the corresponding data signal line, a drain electrode of each first driving transistor is electrically connected to the pixel electrode, and a gate electrode of each first driving transistor is electrically connected to the corresponding first scanning signal line.

In some embodiments, each driving unit includes only the first driving transistor; and in the plurality of first driving transistors corresponding to each pixel, the gate electrodes of different first driving transistors are electrically connected to the same first scanning signal line, and the source electrodes of different first driving transistors are electrically connected to different data signal lines.

In some embodiments, each driving unit includes only the first driving transistor; and in the plurality of first driving transistors corresponding to each pixel, the gate electrodes of different first driving transistors are electrically connected to different first scanning signal lines, and the source electrodes of different first driving transistors are electrically connected to the same data signal line.

In some embodiments, the display panel further includes: a plurality of third driving transistors and a plurality of second scanning signal lines; and in the plurality of first driving transistors corresponding to each pixel, the source electrodes of different first driving transistors are electrically connected to a drain electrode of the same third driving transistor, a source electrode of the third driving transistor is electrically connected to the corresponding data signal lines, and a gate electrode of the third driving transistor is electrically connected to the corresponding second scanning signal lines.

In some embodiments, the plurality of driving units corresponding to each pixel includes one first driving unit and a second driving unit; the first driving unit includes only the first driving transistor, and the second driving unit further includes a fourth driving transistor electrically connected to the first driving transistor; the plurality of first driving transistors in the plurality of driving units are connected in series by source and drain electrodes of the plurality of first driving transistors, and a source electrode of the first driving transistor in the first driving unit is electrically connected to the corresponding data signal line; a source electrode of the fourth driving transistor is electrically connected to the corresponding first scanning signal line, a drain electrode of the fourth driving transistor is electrically connected to a gate electrode of the corresponding first driving transistor, and a gate electrode of the fourth driving transistor is electrically connected to a gate electrode of the first driving transistor in the first driving unit; and the different driving units are electrically connected to different first scanning signal lines.

In some embodiments, each driving unit further includes a fifth driving transistor electrically connected to the first driving transistor; the source electrode of the first driving transistor is electrically connected to a drain electrode of the fifth driving transistor, and a source electrode of the fifth driving transistor is electrically connected to the corresponding data signal line; the gate electrode of the first driving transistor and a gate electrode of the fifth driving transistor are electrically connected to different first scanning signal lines; and in the plurality of driving units corresponding to each pixel, the gate electrodes of the plurality of first driving transistors are electrically connected to the same first scanning signal line, and the gate electrodes of the plurality of fifth driving transistors are electrically connected to the same other first scanning signal line.

In some embodiments, the display panel further includes: a plurality of third driving transistors and a plurality of second scanning signal lines; and in the plurality of driving units corresponding to each pixel, the source electrodes of different fifth driving transistors is electrically connected to a drain electrode of the same third driving transistor, a source electrode of the third driving transistor is electrically connected to the corresponding data signal line, and a gate electrode of the third driving transistor is electrically connected to the corresponding second scanning signal line.

In some embodiments, the display panel further includes: a touch module on a side of the common electrode away from the first base substrate.

The embodiment of the present disclosure provides a method for driving the display panel, which includes: determining a pixel in which charged particles are to move along the direction parallel to the plane where the first base substrate is located according to a picture to be displayed; and in a data writing stage, providing a first driving signal to the common electrode in the pixel in which the charged particles are to move along the direction parallel to the plane where the first base substrate is located, providing the incompletely same second driving signals to the plurality of pixel sub-electrodes included in the pixel electrode in the pixel, to drive at least part of the charged particles to move along the direction parallel to the plane where the first base substrate is located.

In some embodiments, the display panel includes a plurality of blocking electrode groups, and in the data writing stage, the method further includes: providing incompletely same third driving signals to different strip-shaped blocking electrode portions in each blocking electrode group to form an electric field for blocking the charged particles in the pixel from moving to an adjacent pixel.

In some embodiments, the method further includes: providing a touch signal to each blocking electrode group in a touch stage.

In some embodiments, before the data writing stage, the method further includes: in a charged particle activation stage, loading a fourth driving signal to the common electrode and a fifth driving signal to the pixel electrode, to drive the charged particles to move along the direction perpendicular to the first base substrate.

In some embodiments, the charged particle activation stage includes a plurality of gray scale input stages, and the loading the fifth driving signal to the pixel electrode in the charged particle activation stage specifically includes: in the plurality of gray scale input stages, alternately loading a first level signal and a second level signal to the pixel electrode; an electrical property of the first level signal and an electrical property of the second level signal are opposite to each other.

In some embodiments, the charged particle activation stage further includes a plurality of gray scale holding stages; each gray scale holding stage is located after the corresponding gray scale input stage, the method further includes: in each gray scale holding stage, applying a zero-voltage data signal to the pixel electrode.

In some embodiments, the plurality of pixels includes a plurality of pixel rows, the method further includes: activating the charged particles in the plurality of pixel rows row by row according to a picture to be displayed, in the charged particle activation stage of each picture period; writing data in the plurality of pixel rows row by row according to the picture to be displayed in the data writing stage of each picture period.

In some embodiments, the plurality of pixels includes a plurality of pixel rows; the method further includes: performing the charged particle activation stage and the data writing stage for the plurality of pixel rows row by row according to the picture to be displayed, in each picture period.

The embodiment of the present disclosure provides a display apparatus, including the display panel provided by the embodiments of the present disclosure.

BRIEF DESCRIPTION OF DRAWINGS

In order to more clearly illustrate the technical solutions in the embodiments of the present disclosure, drawings required in the description of the embodiments will be briefly described below. It is apparent that the drawings in the description below are only some embodiments of the present disclosure. It is obvious for one of ordinary skill in the art that other drawings may be obtained according to these drawings without creative efforts.

FIG. 43 is a schematic flowchart illustrating a method for driving a display panel according to an embodiment of the present disclosure;

FIG. 44 is a schematic diagram illustrating an electric field of a display panel according to an embodiment of the present disclosure;

FIG. 45 is a schematic diagram illustrating an electric field of a display panel according to an embodiment of the present disclosure;

FIG. 46 is a timing diagram illustrating a method for driving a display panel according to an embodiment of the present disclosure;

DETAIL DESCRIPTION OF EMBODIMENTS

Figure 1:
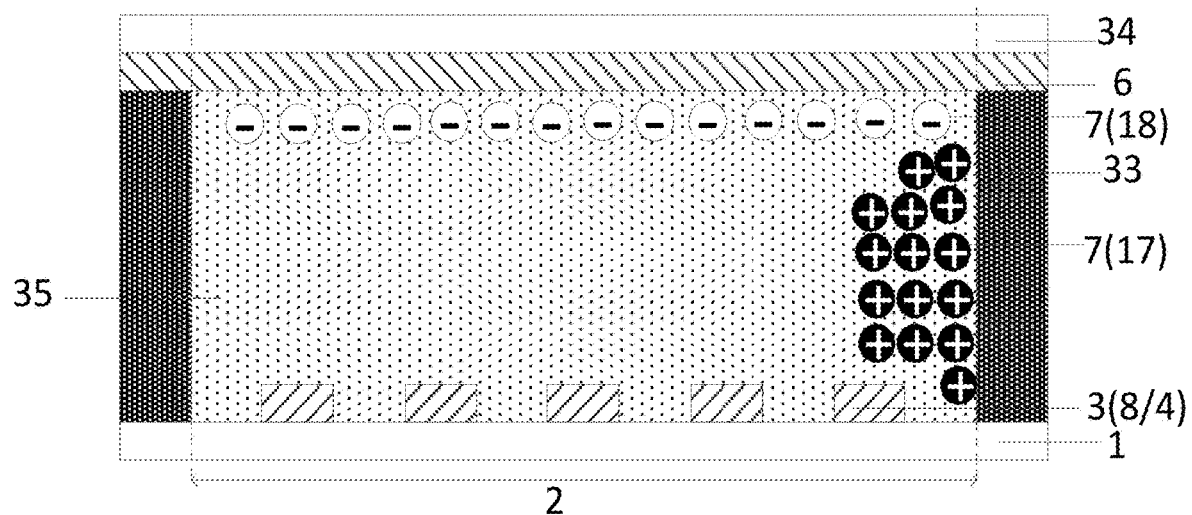
FIG. 1 is a schematic diagram of a structure of a display panel according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. The embodiments and features of the embodiments in the present disclosure may be combined with each other without conflict. All other embodiments, which can be derived by a person skilled in the art from the described embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections.

It should be noted that the shapes and sizes of various elements shown in the drawings are not necessarily drawn to scale and are merely schematic representations of the present disclosure. Like or similar reference numerals refer to like or similar elements or elements having like or similar functions throughout.

An embodiment of the present disclosure provides a display panel, as shown in FIG. 1, including: a first base substrate 1 and a plurality of pixels 2 located on one side of the first base substrate 1; each pixel 2 includes:

A pixel electrode 3 including a plurality of pixel sub-electrodes 8 independent from each other and configured to form an electric field with an angle greater than 0 with respect to a direction perpendicular to the first base substrate 1 under the control of incompletely same (not exactly same) driving signals (at least one of the driving signals is different from other driving signals, that is, at least two of the driving signals are different from each other);

A common electrode 6 on a side of the pixel electrode 3 away from the first base substrate 1;

An electrophoretic liquid layer 35 between the pixel electrode 3 and the common electrode 6, including a plurality of charged particles 7 therein.

According to the display panel provided by the embodiment of the present disclosure, the pixel electrode includes the plurality of pixel sub-electrodes independent from each other. The plurality of pixel sub-electrodes are arranged independently from each other, so that the plurality of pixel sub-electrodes may be provided with the incompletely same driving signals. In this way, the electric field may be formed between the plurality of pixel sub-electrodes with an angle greater than 0 with respect to the direction perpendicular to the first base substrate, so that the electric field generated by the plurality of pixel sub-electrodes may drive the charged particles to move along a direction parallel to a plane where the first base substrate is located, and the electric field generated by the pixel sub-electrodes may be used for changing an aggregation state of the charged particles along the direction parallel to the plane where the first base substrate is located, so as to adjust a gray scale. Compared with a case that an electric field, which is generated by the common electrode and the pixel electrode and is perpendicular to a direction where the first base substrate is located, drives the charged particles to move, in the embodiment of the present disclosure, the charged particles move along the direction parallel to the plane where the first base substrate is located, which can shorten a migration distance of the charged particles, and therefore the refreshing time.

In some embodiments, as shown in FIG. 1, each pixel sub-electrode 8 includes at least one strip-shaped electrode 4, and at least some strip-shaped electrodes 4 included in the plurality of pixel sub-electrodes 8 are arranged at intervals.

The electric field with the angle greater than 0 with respect to the direction perpendicular to the first base substrate may be formed between the plurality of strip-shaped electrodes arranged at intervals, so that the electric field generated by the plurality of strip-shaped electrodes may drive the charged particles to move along the direction parallel to the plane where the first base substrate is located, and the electric field generated by the strip-shaped electrodes may be utilized to change the aggregation state of the charged particles in the direction parallel to the plane where the first base substrate is located, so as to adjust the gray scale.

In some embodiments, as shown in FIG. 1, the display panel further includes: a second base substrate 34 located on a side of the common electrode 6 away from the first base substrate 1.

In a specific implementation, for example, it is possible to form the pixel electrode on the first base substrate to obtain a first substrate; form the common electrode on the second base substrate to obtain a second substrate; and form the electrophoretic liquid layer on one side of the first substrate, and cover the electrophoretic liquid layer with the second substrate by adopting a vacuum cell-assembly process to obtain the structure of the display panel provided by the embodiment of the present disclosure.

In a specific implementation, the common electrodes of different pixels are loaded with the same driving signal, and the pixel electrodes are controlled to be loaded with the incompletely same driving signals, so that each pixel presents a required gray scale. Accordingly, in some embodiments, the common electrodes of the plurality of pixels may be integrally connected (connected together to have a one-piece structure), that is, the whole common electrode may be a planar electrode disposed on the entire surface of the second base substrate. In a specific implementation, the common electrode is, for example, a transparent electrode, and a material of the common electrode includes indium tin oxide (ITO).

Figure 2:
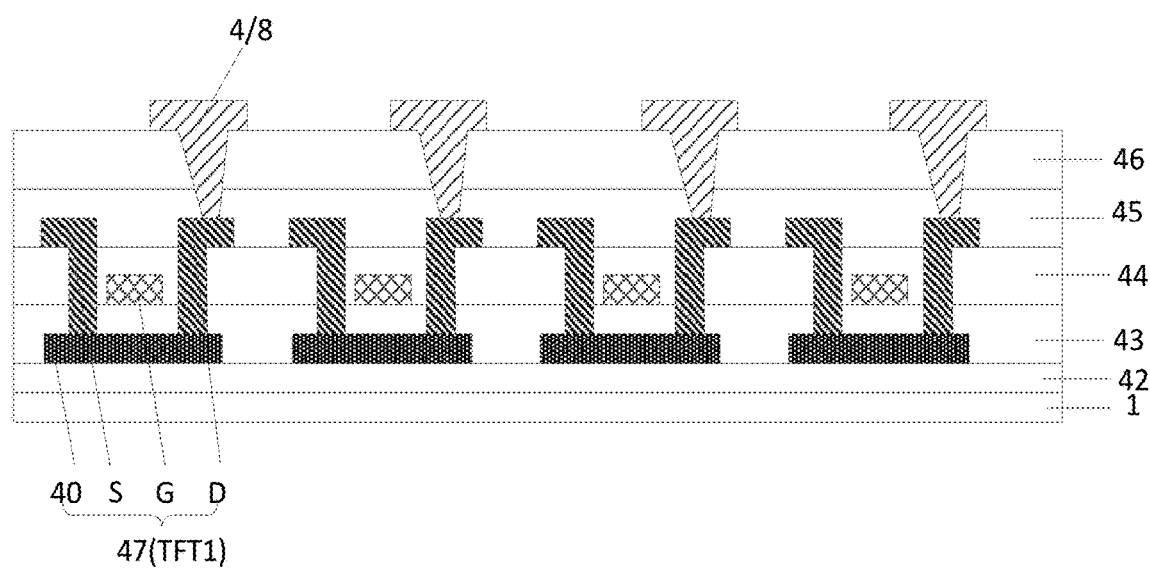
FIG. 2 is a schematic diagram of a structure of a display panel according to an embodiment of the present disclosure.

In some embodiments, as shown in FIG. 2, the pixel further includes a plurality of driving units 47 between the pixel electrode 3 and the first base substrate 1; the plurality of driving units 47 are electrically connected to the plurality of pixel sub-electrodes 8 in one-to-one correspondence; each driving unit 47 at least includes a first driving transistor TFT1; accordingly, the first driving transistors TFT1 are electrically connected to the pixel sub-electrodes 8 in one-to-one correspondence. Therefore, the driving signals may be independently provided for the pixel sub-electrodes, the driving signals for the plurality of strip-shaped electrodes are incompletely same, the electric field with the angle greater than 0 with respect to the direction perpendicular to the first base substrate may be formed between at least part of the strip-shaped electrodes, and drive the charged particles to move along the direction parallel to the plane where the first base substrate is located.

In a specific implementation, as shown in FIG. 2, each first driving transistor TFT1 includes: an active layer 40, a gate electrode G, a source electrode S, and a drain electrode D; the pixel sub-electrode is electrically connected to the drain electrode of the corresponding first driving transistor. Each of the first driving transistors TFT1 shown in FIG. 2 has a top gate structure, i.e., the gate electrode G is located between the active layer 40 and the source and drain electrodes S and D. As shown in FIG. 2, the display panel further includes: a buffer layer 42 between the active layer 40 and the first base substrate 1, a gate insulating layer 43 between the gate electrode G and the active layer 40, an interlayer insulating layer 44 between the gate electrode G and the source electrode S, a passivation layer 45 between the source electrode S and the pixel sub-electrode 8, and a planarization layer 46 between the passivation layer 45 and the pixel sub-electrode 8. Alternatively, the first driving transistor may have a bottom gate structure in a specific implementation. In a specific implementation, the material of the active layer of the first driving transistor may be amorphous silicon (a-Si), or an oxide semiconductor, or polysilicon, and accordingly, the process for forming the first driving transistor may adopt an a-Si process, or an oxide semiconductor process, or a low-temperature polysilicon process.

Figure 3:
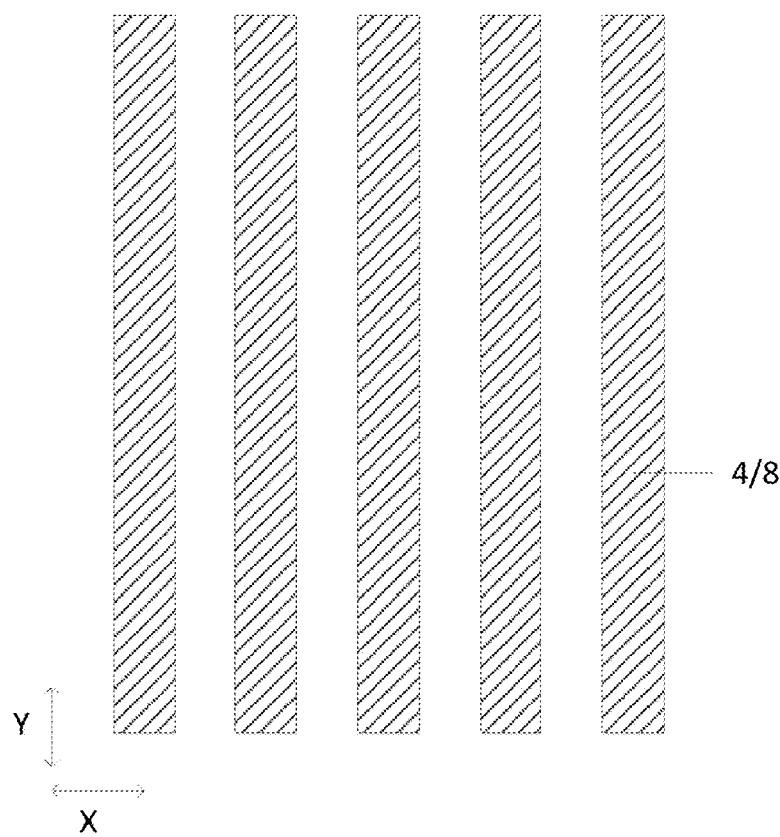
FIG. 3 is a schematic diagram of a structure of a pixel electrode according to an embodiment of the present disclosure.

In some embodiments, as shown in FIG. 3, the pixel sub-electrodes 8 include only the strip-shaped electrodes 4 extending in a first direction Y.

That is, the pixel electrode only includes the strip-shaped pixel sub-electrodes independent from each other, so that a pattern of the pixel electrode including the plurality of strip-shaped electrodes is simple, and the difficulty of forming the pixel electrode can be reduced.

In a specific implementation, as shown in FIG. 3, the plurality of pixel sub-electrodes 8 are arranged along a second direction X, the first direction Y intersects with the second direction X. The first direction Y is perpendicular to the second direction X in FIG. 3.

Figure 4:
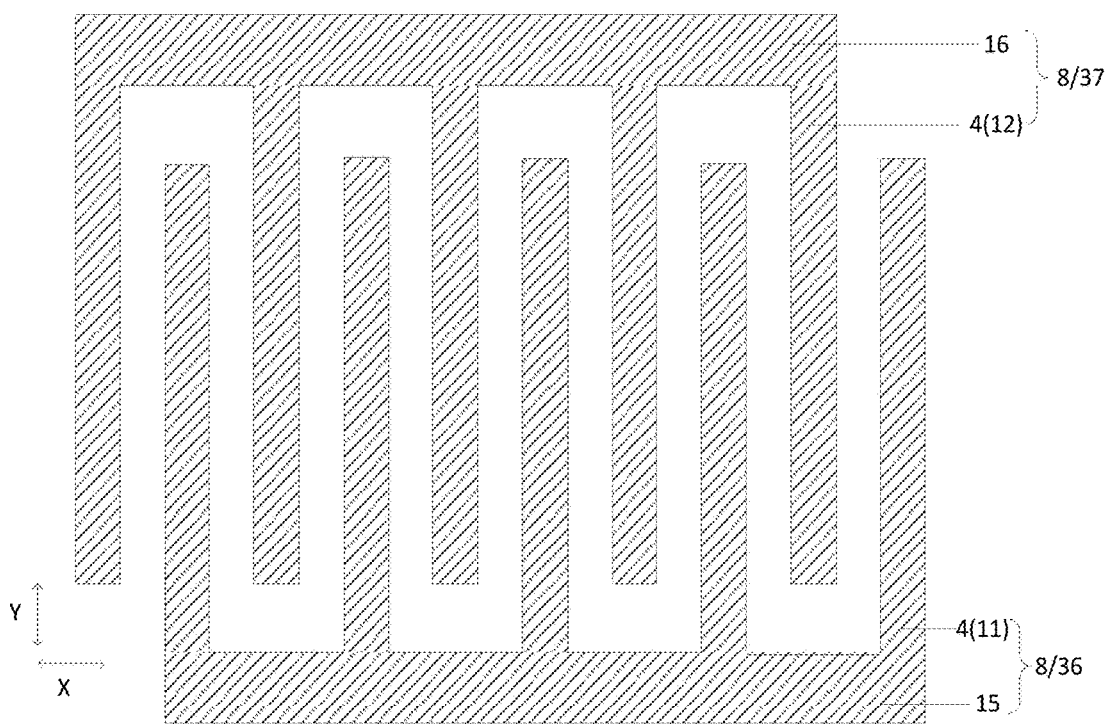
FIG. 4 is a schematic diagram of a structure of a pixel electrode according to an embodiment of the present disclosure.

Alternatively, in some embodiments, as shown in FIG. 4, the plurality of pixel sub-electrodes 8 includes: at least one first pixel sub-electrode 36 and at least one second pixel sub-electrode 37;

Each first pixel sub-electrode 36 includes: a plurality of first strip-shaped electrodes 11 and a first connection electrode 15; the first connection electrode 15 is electrically connected to ends of the plurality of first strip-shaped electrodes 11 on the same side;

Each second pixel sub-electrode 37 includes: a plurality of second strip-shaped electrodes 12 and a second connection electrode 16; the second connection electrode 16 is electrically connected to ends of the plurality of second strip-shaped electrodes 12 on the same side;

The plurality of first strip-shaped electrodes 11 and the plurality of second strip-shaped electrodes 12 are arranged at intervals; the plurality of first strip-shaped electrodes 11 and the plurality of second strip-shaped electrodes 12 extend in the first direction; in the first direction, the plurality of first strip-shaped electrodes 11 and the plurality of second strip-shaped electrodes 12 are positioned between the first connection electrode 15 and the second connection electrode 16.

In the display panel provided by the embodiment of the present disclosure, the first strip-shaped electrodes and the second strip-shaped electrodes are alternately arranged, and orthographic projections of the two pixel sub-electrodes corresponding to each other in the second direction X overlap with each other, that is, the pixel electrode is an interdigitated structure formed by the first pixel sub-electrode 36 and the second pixel sub-electrode 37. In FIG. 4, the pixel electrode only includes one first pixel sub-electrode 36 and one second pixel sub-electrode 37. In a specific implementation, each pixel includes two first driving transistors electrically connected to the first pixel sub-electrode and the second pixel sub-electrode, respectively.

According to the display panel provided by the embodiment of the present disclosure, the pixel electrode is the interdigitated structure, which can improve the arrangement density of the strip-shaped electrodes, and thus, is more beneficial to controlling the aggregation state of the charged particles along the direction parallel to the first base substrate. In addition, driving signals for the strip-shaped electrodes of each pixel sub-electrode are the same, and driving signals for the strip-shaped electrodes of different pixel sub-electrodes are different, so that the electric field with the angle greater than 0 with respect to the direction perpendicular to the first base substrate may be formed between the strip-shaped electrodes, which drives the charged particles to move along the direction parallel to the plane where the first base substrate is located. In this way, the number of the first driving transistors can be reduced, and cost is saved.

In some embodiments, as shown in FIG. 4, the first strip-shaped electrodes 11 and the second strip-shaped electrodes 12 each extend along the first direction Y, and are alternately arranged along the second direction X; the first connection electrode 15 and the second connection electrode 16 are also strip-shaped electrodes, and the first connection electrode 15 and the second connection electrode 16 extend in the second direction X.

Figure 5:
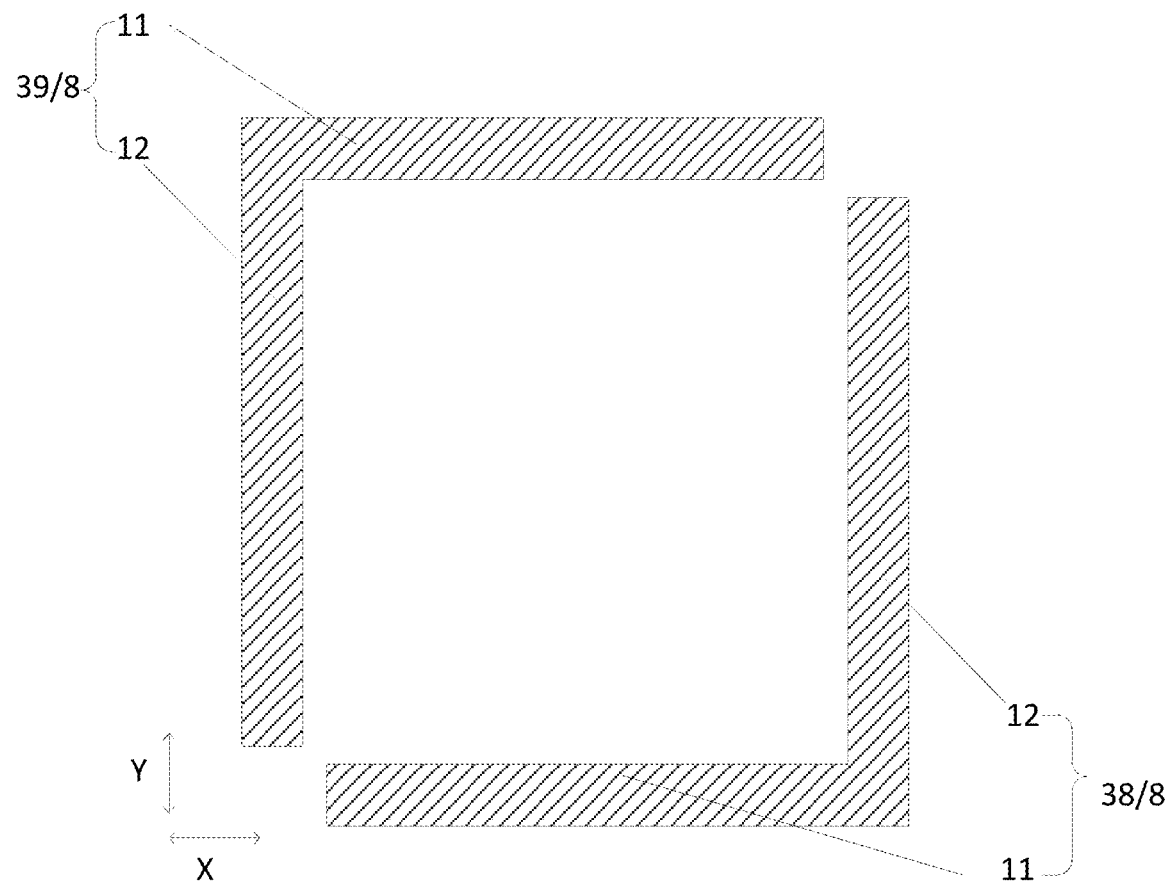
FIG. 5 is a schematic diagram of a structure of a pixel electrode according to an embodiment of the present disclosure.

Alternatively, in some embodiments, as shown in FIG. 5, the pixel electrode 3 includes two pixel sub-electrodes 8;

Each pixel sub-electrode 8 includes: a first strip-shaped electrode 11, and a second strip-shaped electrode 12 electrically connected to one end of the first strip-shaped electrode 11; an extending direction of the first strip-shaped electrode 11 intersects with an extending direction of the second strip-shaped electrode 12;

The first strip-shaped electrodes 11 of the two pixel sub-electrodes 8 are arranged opposite to each other and the second strip-shaped electrodes 12 of the two different pixel sub-electrodes 8 are arranged opposite to each other.

For convenience of description, the two pixel sub-electrodes 8 in FIG. 5 are hereinafter referred to as a third pixel sub-electrode 38 and a fourth pixel sub-electrode 39, respectively; namely, the third pixel sub-electrode 38 and the fourth pixel sub-electrode 39 are both L-shaped electrodes. In a specific implementation, the first strip-shaped electrodes 11 of the third pixel sub-electrode 38 and the fourth pixel sub-electrode 39, which are oppositely disposed, may be used as the plurality of strip-shaped electrodes disposed at intervals for driving the charged particles to move along the direction parallel to the plane where the first base substrate is located, and the second strip-shaped electrodes 12 of the third pixel sub-electrodes 38 and the fourth pixel sub-electrodes 39, which are oppositely disposed, may also be used as the plurality of strip-shaped electrodes disposed at intervals for driving the charged particles to move along the direction parallel to the plane where the first base substrate is located. Therefore, the moving of the charged particles along the direction parallel to the plane where the first base substrate is located is not limited to one direction, and the aggregation state of the charged particles can be changed more favorably.

In some embodiments, a distance between the pixel electrode and the common electrode is greater than or equal to 5 micrometers and less than or equal to 20 micrometers in the direction perpendicular to the first base substrate. For example, the distance between the pixel electrode and the common electrode may be 7 micrometers, 10 micrometers, or 15 micrometers.

It should be noted that in the related art, for a conventional capsule type electrophoretic display panel, it is necessary to leave a sufficient migration distance of the charged particles in a longitudinal direction (the direction perpendicular to the first base substrate), and the distance between the pixel electrode and the common electrode is usually 100 micrometers. According to the display panel provided by the embodiment of the present disclosure, the strip-shaped electrodes are provided to generate a transverse electric field to drive the charged particles to move so as to adjust the gray scale, so that in the direction perpendicular to the first base substrate, the distance between the pixel electrode and the common electrode is much less than that between the pixel electrode and the common electrode in the conventional electrophoretic display panel, and thus, the refreshing time can be shortened, and the thickness of the display panel is reduced.

In some embodiments, in the arrangement direction of the strip-shaped electrodes, a distance between any two adjacent strip-shaped electrodes is, for example, greater than or equal to 4 micrometers and less than or equal to 50 micrometers, and a width of each strip-shaped electrode is, for example, greater than or equal to 2 micrometers and less than or equal to 20 micrometers.

In a specific implementation, no matter what shape of the pixel sub-electrodes of the pixel electrode is, the plurality of strip-shaped electrodes generating the electric field for driving the charged particles to move along the direction parallel to the plane where the first base substrate is located may have the same width and the same thickness, the distance between the strip-shaped electrodes may be set according to a pixel size, the number and the widths of the strip-shaped electrodes, and the distance between any two adjacent strip-shaped electrodes in the plurality of strip-shaped electrodes is constant. For example, in the arrangement direction of the plurality of strip-shaped electrodes, a width of each pixel is 56 micrometers; in the direction perpendicular to the first base substrate, the distance between the pixel electrode and the common electrode is 7 micrometers, and a thickness of each strip-shaped electrode is 0.07 micrometers; in the arrangement direction of the plurality of strip-shaped electrodes, the width of each strip-shaped electrode is 4 micrometers, and a distance between every two adjacent strip-shaped blocking electrode portions is 4 micrometers.

Figure 6:
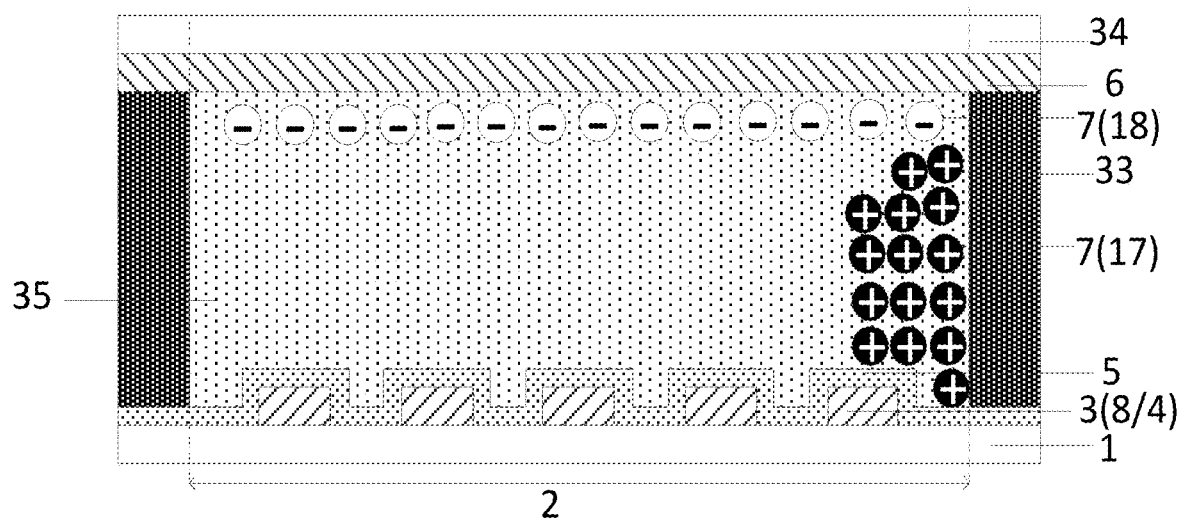
FIG. 6 is a schematic diagram of a structure of a display panel according to an embodiment of the present disclosure.

In some embodiments, as shown in FIG. 6, the display panel further includes:

A second insulating layer 5 between the pixel electrode 3 and the electrophoretic liquid layer 35.

According to the display panel provided by the embodiment of the present disclosure, the second insulating layer is provided between the pixel electrode and the electrophoretic liquid layer, so that contact between the charged particles and the pixel electrode can be avoided, the charged particles are prevented from being adsorbed together and agglomerated at the pixel electrode, which adversely affects the display effect, and the pixel electrode is prevented from being in direct contact with the charged particles, which results in the electrochemical corrosion and adversely affects the life-span of the display panel.

In some embodiments, as shown in FIGS. 1, 6, the plurality of charged particles 7 includes: a plurality of charged particles of a first color 17, and a plurality of charged particles of a second color 18 each having an electrical property opposite to that of each of the plurality of charged particles of the first color 17;

The number of the charged particles of the first color 17 is greater than that of the charged particles of the second color 18.

In some embodiments, the charged particles of the first color are black charged particles and the charged particles of the second color are white charged particles; the black charged particles are positively charged (have positive charges) and the white charged particles are negatively charged (have negative charges).

It should be noted that the black charged particles may be used to implement a black state display, the white charged particles may be used to implement a white state display, and a gray scale display may be implemented by the aggregation degrees of the black charged particles and the white charged particles on the top and the side of the electrophoretic liquid layer. The top of the electrophoretic liquid layer refers to a side of the electrophoretic liquid layer close to the common electrode, and the bottom of the electrophoretic liquid layer refers to a side of the electrophoretic liquid layer close to the pixel electrode. For example, the more black charged particles on the top of the electrophoretic liquid layer are, the lower the brightness of the pixel is, and the more white charged particles on the top of the electrophoretic liquid layer are, the higher the brightness of the pixel is. In addition, the white charged particles also have a scattering effect. In a pixel, the more the white charged particles are relative to the black charged particles, the stronger the reflection effect of the white charged particles is, and the less the white charged particles are relative to the black charged particles, the stronger the scattering effect of the white charged particles is. In the display panel provided by the embodiments of the present disclosure, the number of the white charged particles is less than the number of the black charged particles, that is, the number of the white charged particles is less relative to the number of the black charged particles, so that the scattering effect of the white charged particles is stronger than the reflection effect of the white charged particles in a pixel.

In some embodiments, a ratio of the number of the charged particles of the first color to the number of the charged particles of the second color is greater than or equal to 2.

Figure 7:
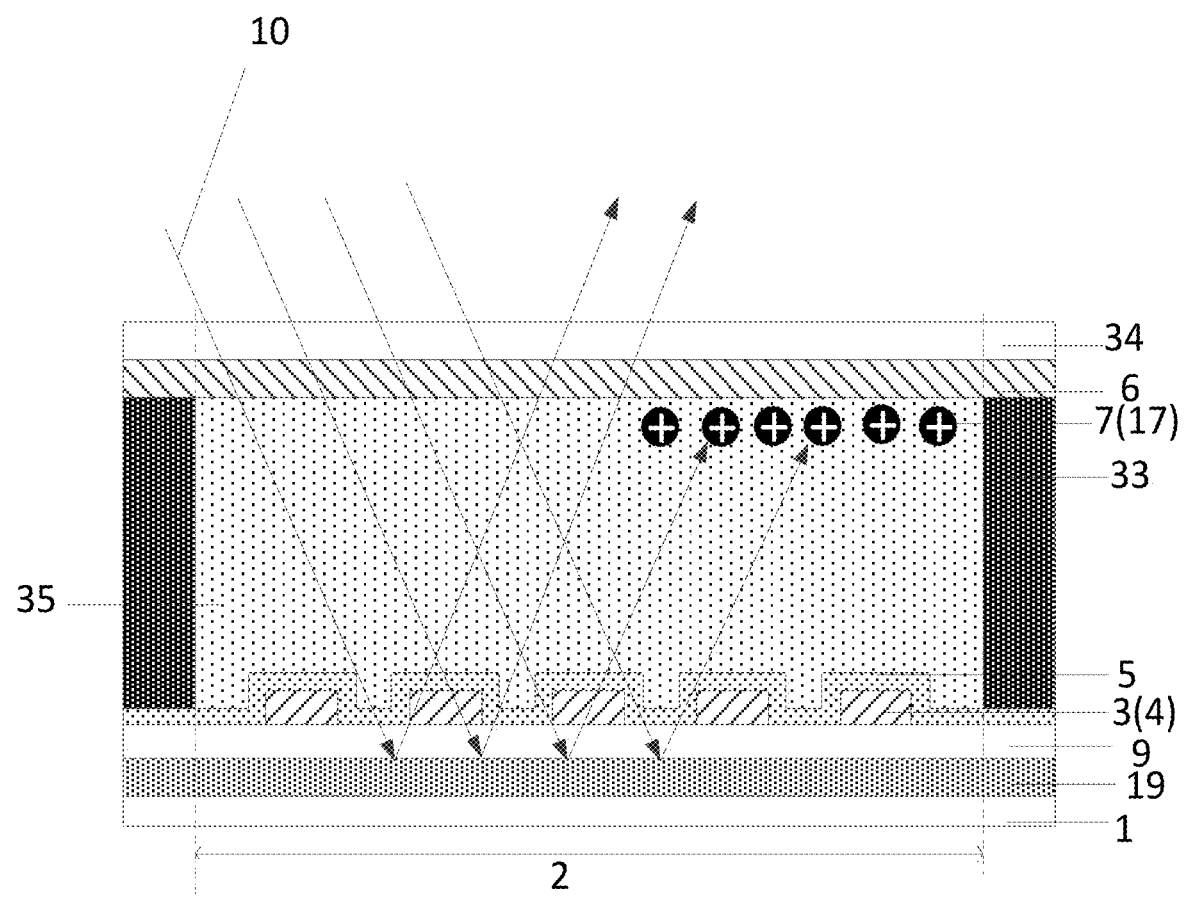
FIG. 7 is a schematic diagram of a structure of a display panel according to an embodiment of the present disclosure.

Alternatively, in some embodiments, as shown in FIG. 7, the plurality of charged particles 7 are the charged particles of the first color 17. That is, the display apparatus includes only the black charged particles.

In a specific implementation, the display panel may be a reflective display panel. In some embodiments, as shown in FIGS. 7 to 10, the display panel further includes:

A reflective layer 19 between the first base substrate 1 and the electrophoretic liquid layer 35.

The display panel provided by the embodiment of the present disclosure includes the reflective layer, so that light can be reflected after reaching the reflective layer, and the reflectivity is improved.

In a specific implementation, the light is incident into the reflective display panel from a side of the second base substrate away from the common electrode.

In a specific implementation, the larger a region of the reflective layer shielded by the charged black particles is, the lower the brightness of the light emitted by the pixel is, and the smaller the region of the reflective layer shielded by the charged black particles is, the higher the brightness of the light emitted by the pixel is.

Figure 8:
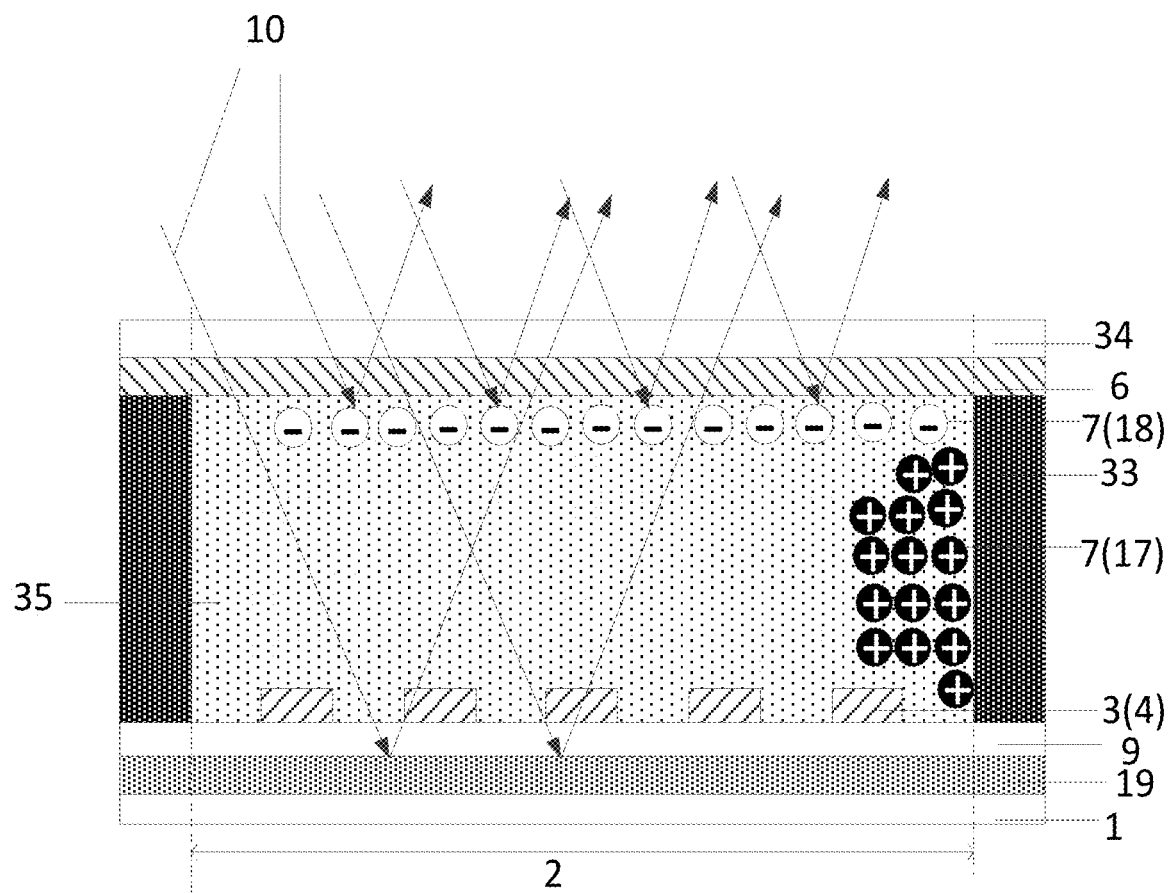
FIG. 8 is a schematic diagram of a structure of a display panel according to an embodiment of the present disclosure.

In a specific implementation, when the plurality of charged particles includes the white charged particles and the black charged particles, in the case where the number of the white charged particles is less than the number of the black charged particles, a color of the reflective layer may be set to white, so that reflection of white light is enhanced by providing the reflective layer. As shown in FIG. 8, the black charged particles are driven to be aggregated to an edge of the pixel by the electric field generated between the common electrode and the pixel electrode and the electric field generated between the strip-shaped electrodes of the pixel electrode, and the light 10 reaches the white charged particles 18 and the reflective layer 19 and is reflected by the white charged particles 18 and the reflective layer 19, so that the white state display can be realized by the white charged particles I combination with the reflective layer.

In a specific implementation, when the plurality of charged particles are all the black charged particles, the black charged particles may be used for realizing a black state display, the reflective layer may be used for realizing a white state display, the black charged particles may be driven to move through the electric field generated between the pixel electrode and the common electrode and the electric field generated between the strip-shaped electrodes in the pixel electrode, and an area of the reflective layer covered by the black charged particles may be adjusted by adjusting the aggregation degrees of the black charged particles on the top or the bottom of the electrophoretic liquid layer, thereby adjusting the reflectivity, to realize different gray scales.

In some embodiments, as shown in FIGS. 7 and 8, the reflective layer 19 is located between the first base substrate 1 and the pixel electrode 3.

In a specific implementation, the reflective layer is located between the pixel electrode and the first driving transistors, for example.

In some embodiments, as shown in FIGS. 7 and 8, the reflective layer 19 is made of a metal material, and the display panel further includes a first insulating layer 9 between the reflective layer 19 and the pixel electrode 3.

In a specific implementation, when the reflective layer is made of the metal material and is located between the pixel electrode and the first driving transistors, the reflective layer is provided with vias by passing a region where the pixel electrode and the first driving transistors are electrically connected to each other.

Figure 9:
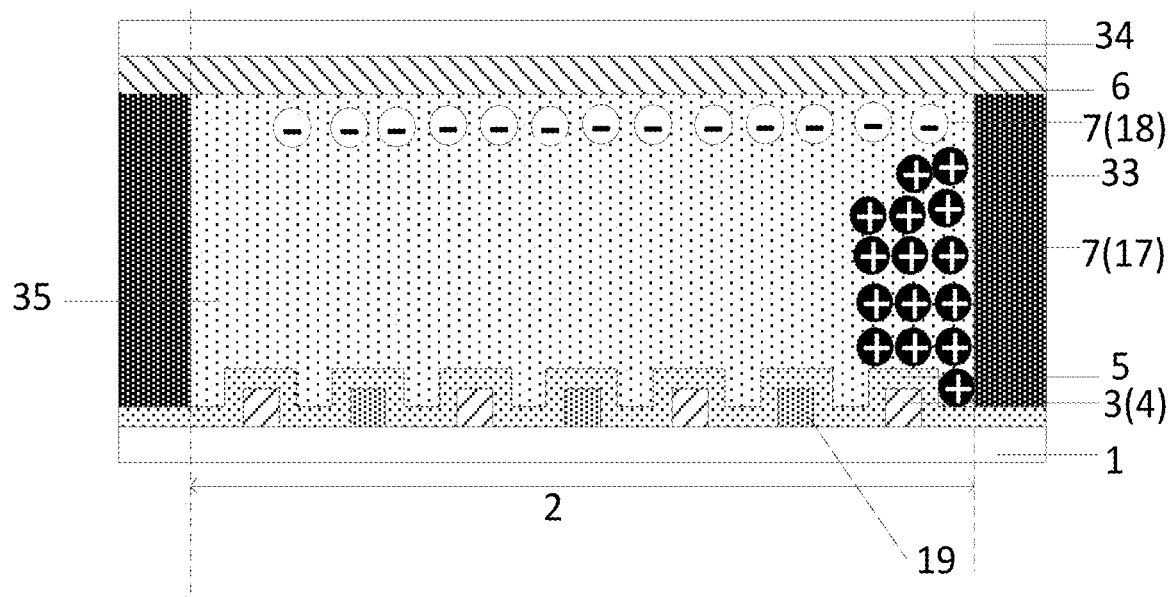
FIG. 9 is a schematic diagram of a structure of a display panel according to an embodiment of the present disclosure.
Figure 10:
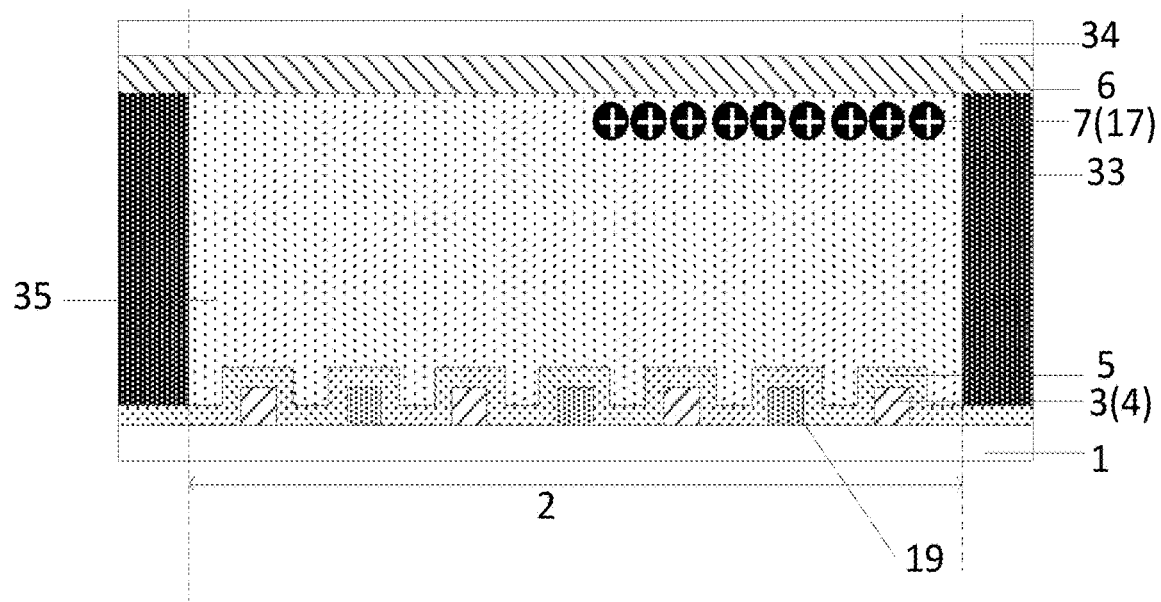
FIG. 10 is a schematic diagram of a structure of a display panel according to an embodiment of the present disclosure.

Alternatively, in some embodiments, as shown in FIGS. 9 and 10, the reflective layer 19 is made of the metal material, and the reflective layer 19 is disposed in the same layer as the pixel electrode 3;

An orthographic projection of the reflective layer 19 on the first base substrate 1 and an orthographic projection of the pixel electrode 3 on the first base substrate 1 do not overlap each other.

According to the display panel provided by the embodiment of the present disclosure, the reflective layer and the pixel electrode are arranged in the same layer, so that a pattern of the reflective layer and a pattern of the pixel electrode may be formed in one patterning process, the process for manufacturing the display panel can be simplified, and the cost can be saved. Moreover, the reflective layer and the pixel electrode are arranged in the same layer, and the pixel electrode also has a reflecting function under the condition that the reflective layer and the pixel electrode are made of the same material, so that the flow for manufacturing the display panel is simplified, and the aperture ratio of the reflective layer is increased.

In a specific implementation, under the condition that the reflective layer and the pixel electrode are made of the same material, a high-reflectivity metal material may be selected, and the reflective layer and the pixel electrode are made of, for example, an indium tin oxide/silver/indium tin oxide (ITO/Ag/ITO) stack or a molybdenum/aluminum (Mo/Al) stack or the like.

Figure 11:
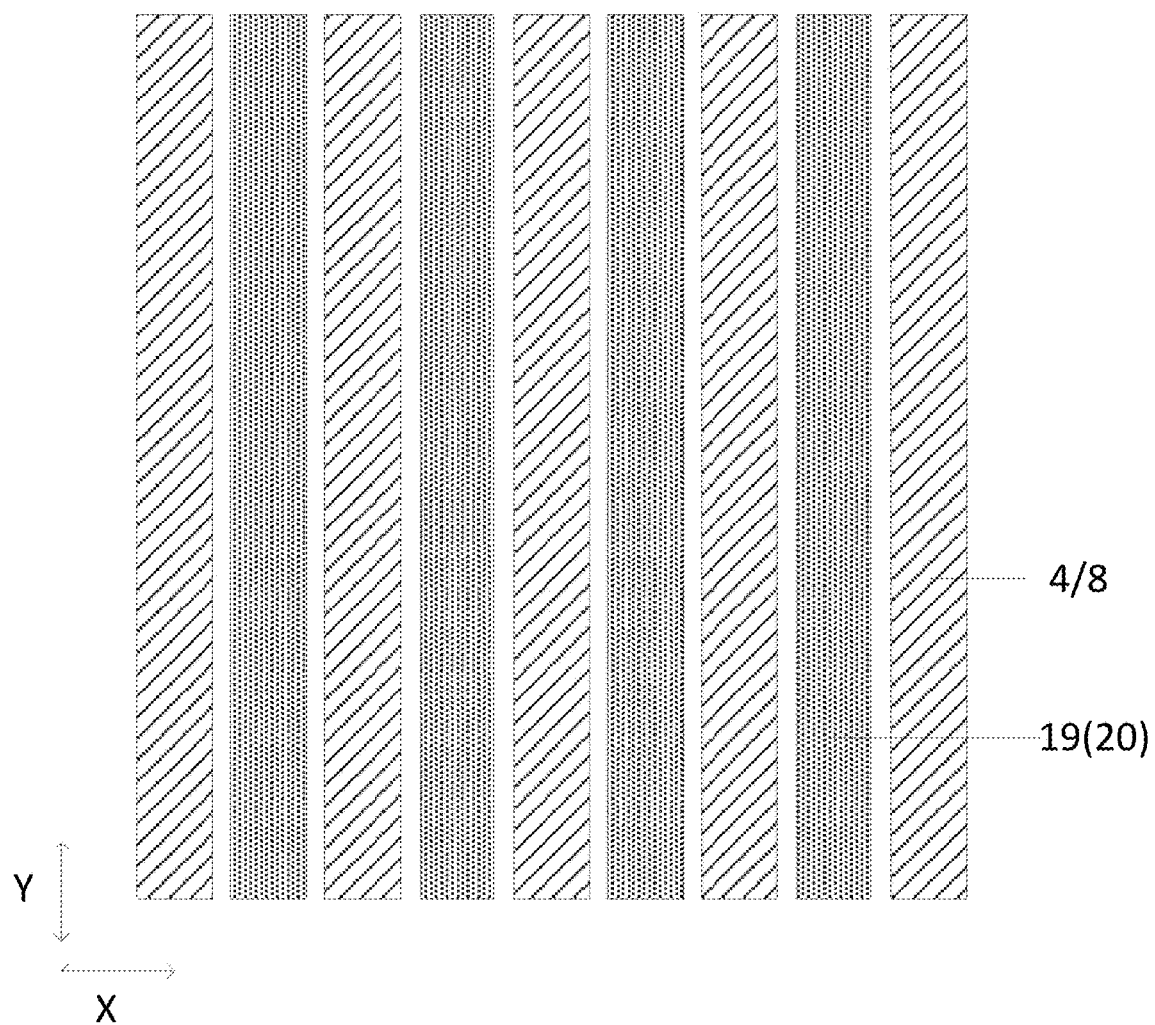
FIG. 11 is a schematic diagram of a structure of a pixel electrode and a reflective layer according to an embodiment of the present disclosure.

In some embodiments, as shown in FIG. 11, the plurality of strip-shaped electrodes 4 are a plurality of pixel sub-electrodes 8 extending along the first direction Y and disposed independently from each other, and the reflective layer 19 includes a plurality of strip-shaped reflective patterns 20 extending along the first direction Y; the strip-shaped reflective patterns 20 and the strip-shaped electrodes 4 are spaced apart from each other.

Figure 12:
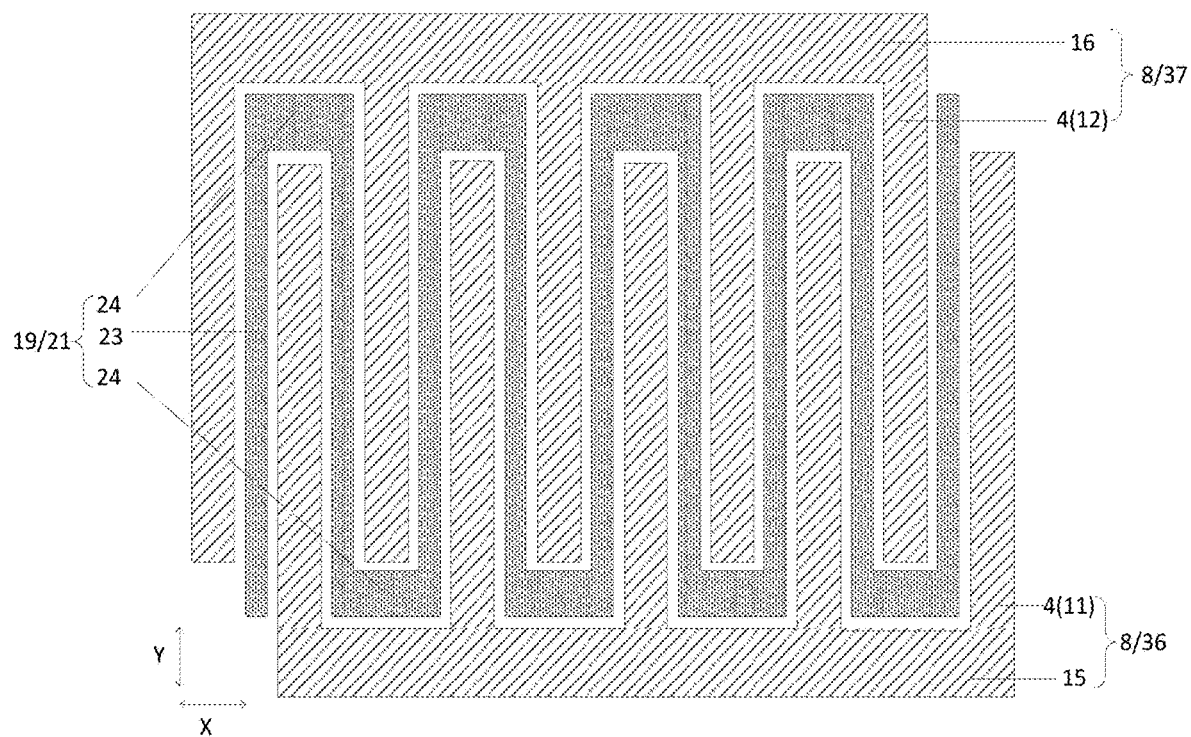
FIG. 12 is a schematic diagram of a structure of a pixel electrode and a reflective layer according to an embodiment of the present disclosure.

Alternatively, in some embodiments, as shown in FIG. 12, the pixel electrode 3 includes: a first pixel sub-electrode 36 and a second pixel sub-electrode 3, the first pixel sub-electrode 36 includes a plurality of first strip-shaped electrodes 11 and a first connection electrode 15, and the second pixel sub-electrode 37 includes a plurality of second strip-shaped electrodes 12 and a second connection electrode 16.

The reflective layer 19 includes a plurality of zigzag-shaped reflective patterns 21.

Each zigzag-shaped reflective pattern 21 includes: a plurality of strip-shaped first reflective sub-patterns 23 and a plurality of second reflective sub-patterns 24; each second reflective sub-patterns 24 connect two first reflective sub-patterns 23 adjacent to the second reflective sub-patterns 24; each first reflective sub-pattern 23 extends in the first direction Y, and is positioned between the first strip-shaped electrodes 11 and the second strip-shaped electrodes 12; the plurality of second reflective sub-patterns 24 are positioned between the first connection electrode 15 and the second strip-shaped electrodes 12, or between the second connection electrode 16 and the first strip-shaped electrodes 11.

Figure 13:
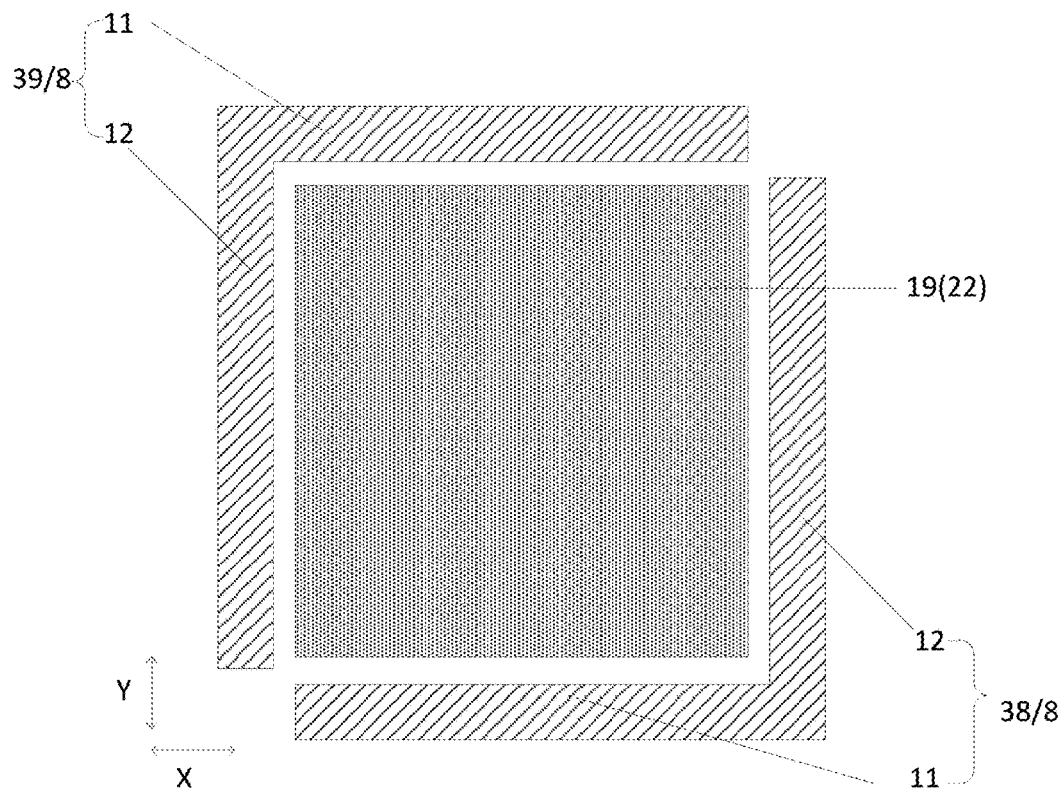
FIG. 13 is a schematic diagram of a structure of a pixel electrode and a reflective layer according to an embodiment of the present disclosure.

Alternatively, in some embodiments, as shown in FIG. 13, the pixel electrode 3 includes two pixel sub-electrodes 8, each including a first strip-shaped electrode 11 and a second strip-shaped electrode 12;

The reflective layer 19 includes a plurality of rectangular first reflective patterns 22; an orthogonal projection of each rectangular first reflective pattern 22 on the first base substrate 1 is located within a region surrounded by orthogonal projections of the two pixel sub-electrodes 8 on the first base substrate 1.

In a specific implementation, in a case where the reflective layer and the pixel electrode do not overlap with each other, in an arrangement direction of the plurality of strip-shaped electrodes, a width of a portion of the reflective layer (e.g., the strip-shaped reflective pattern 20 in FIG. 11, the first reflective sub-pattern 23 in FIG. 12, and the rectangular first reflective pattern 22 in FIG. 13) located between two adjacent strip-shaped electrodes may be greater than, equal to, or less than a width of the strip-shaped electrode.

Figure 14:
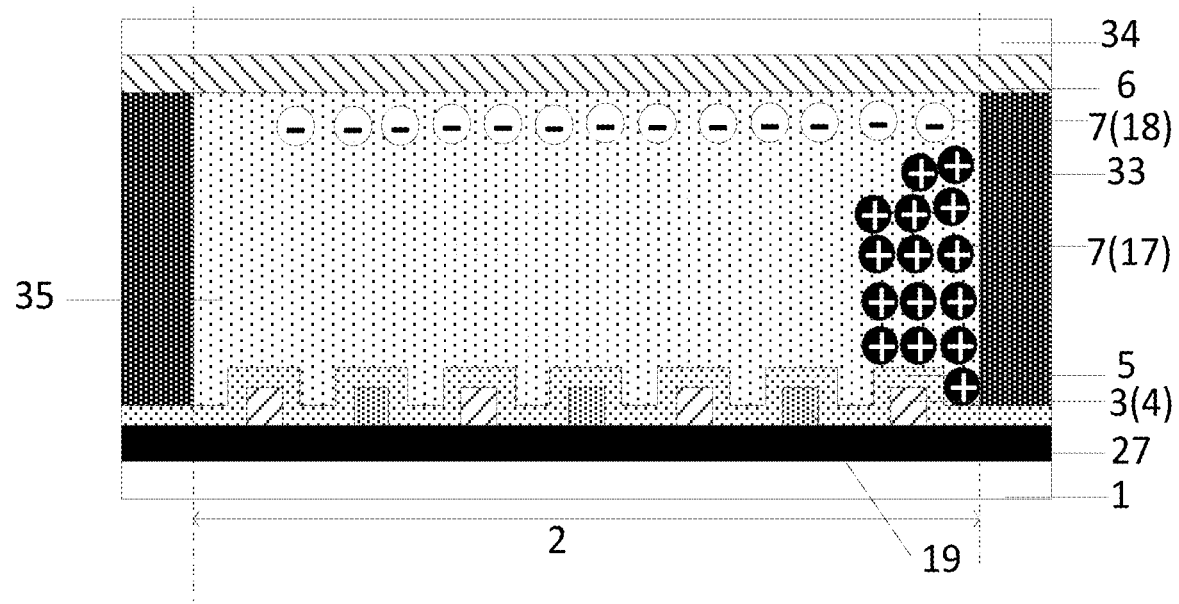
FIG. 14 is a schematic diagram of a structure of a display panel according to an embodiment of the present disclosure.
Figure 15:
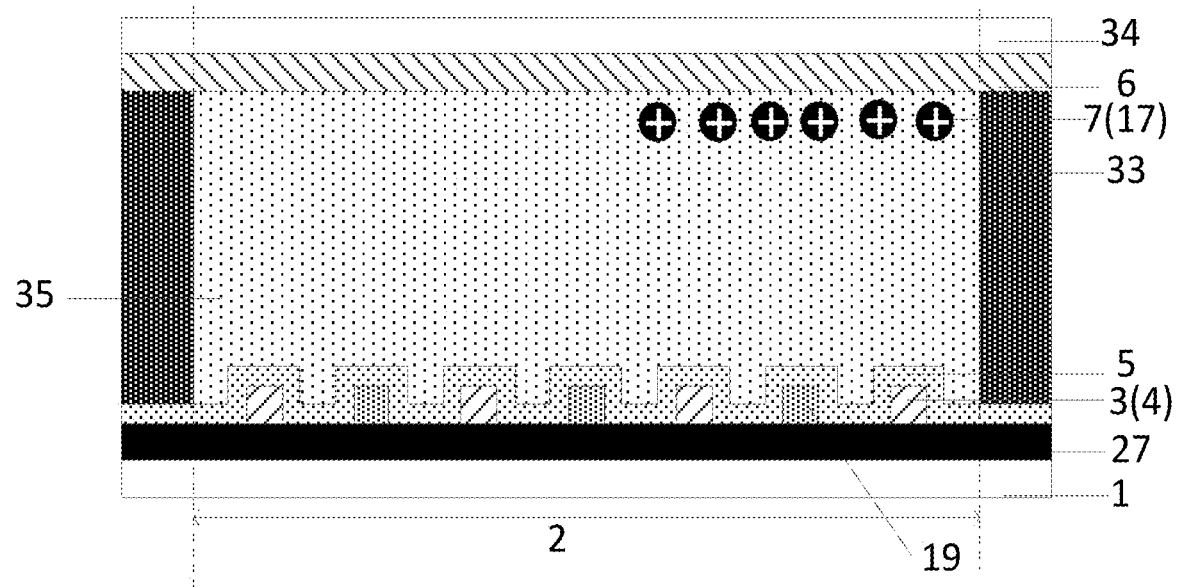
FIG. 15 is a schematic diagram of a structure of a display panel according to an embodiment of the present disclosure.

In some embodiments, as shown in FIGS. 14 and 15, the display panel further includes:

A light shielding layer 27 located between the reflective layer 19 and the first base substrate 1.

In the display panel provided by the embodiment of the present disclosure, the light shielding layer is provided on a side of the reflective layer close to the first base substrate, so that light leakage of the display panel from one side of the first base substrate can be avoided.

In a specific implementation, the light shielding layer is, for example, a black insulating layer.

Figure 16:
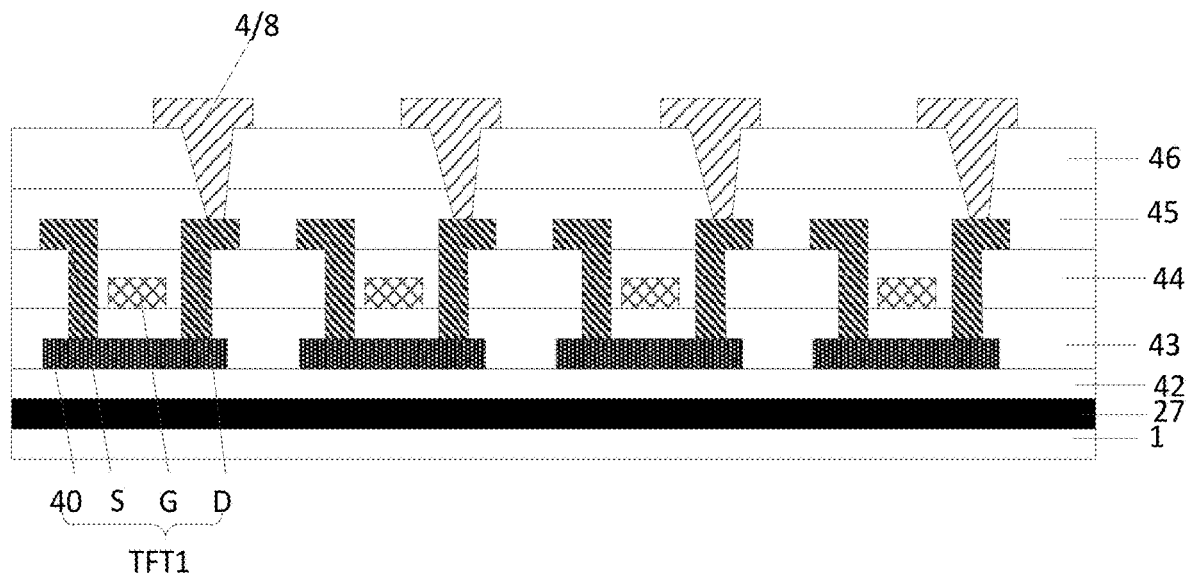
FIG. 16 is a schematic diagram of a structure of a display panel according to an embodiment of the present disclosure.

In a specific implementation, as shown in FIG. 16, the light shielding layer 27 is located between the buffer layer 42 and the first base substrate 1, for example.

Figure 17:
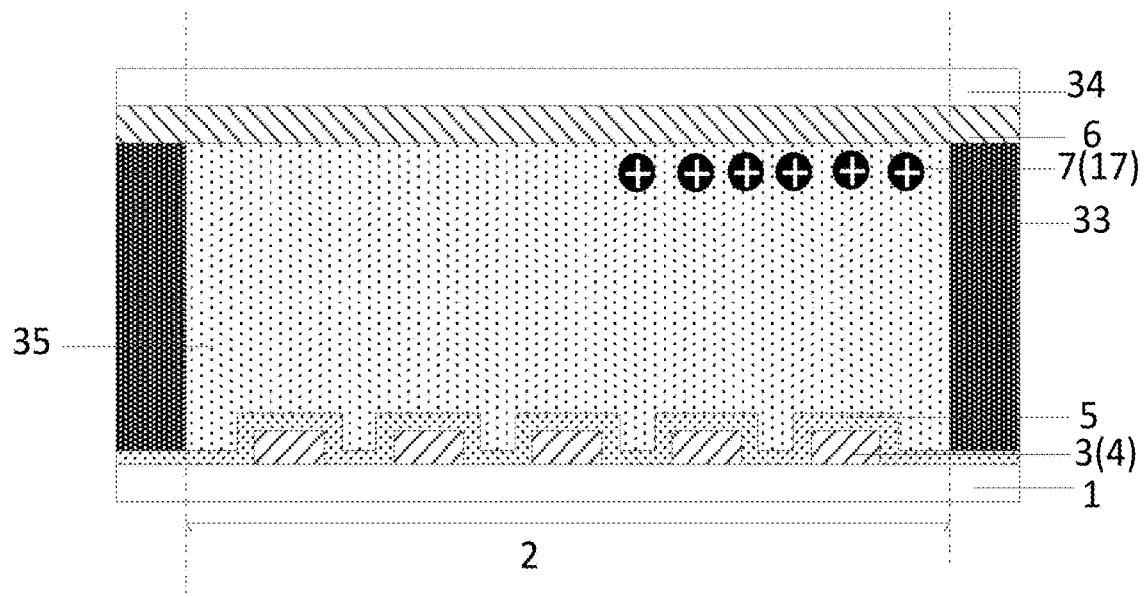
FIG. 17 is a schematic diagram of a structure of a display panel according to an embodiment of the present disclosure.

Alternatively, in a specific implementation, the display panel according to an embodiment of the present disclosure may be a transmissive display panel, as shown in FIG. 17, the plurality of charged particles 7 are all the black charged particles 17, without the reflective layer disposed between the pixel electrode 3 and the first base substrate 1. In a specific implementation, one side of the first base substrate of the transmissive display panel away from the pixel electrode is a light incident side, and the electric field generated between the strip-shaped electrodes may drive the aggregation degree of the black charged particles at the bottom of the electrophoretic liquid layer, to adjust the blocking degree of the black charged particles on the transmitted light, so as to adjust the brightness.

Figure 18:
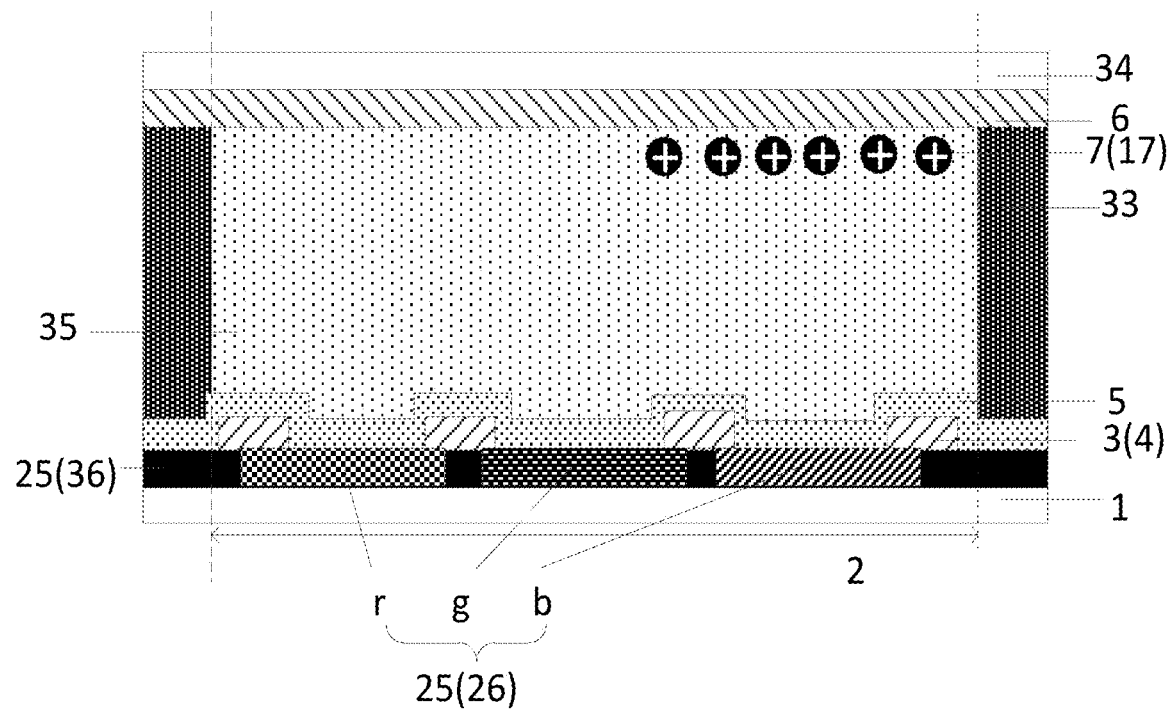
FIG. 18 is a schematic diagram of a structure of a display panel according to an embodiment of the present disclosure.

For the transmissive display panel, in some embodiments, as shown in FIG. 18, the display panel further includes:

A color filter layer 25 located between the first base substrate 1 and the pixel electrode 3, and including a plurality of color filters 26.

In a specific implementation, as shown in FIG. 18, the plurality of color filters 26 includes a red color filter r, a blue color filter b, and a green color filter g. Therefore, the transmissive display panel can realize full color display.

In some embodiments, as shown in FIG. 18, the color filter layer 25 further includes a light shielding layer 36 including a plurality of opening areas, the color filters 26 are located in the opening areas.

In some embodiments, the pixel electrode is made of a light transmitting material; an orthographic projection of the pixel electrode on the first base substrate overlaps with an orthographic projection of the color filter on the first base substrate.

In some embodiments, as shown in FIG. 1, FIGS. 6 to 10, FIGS. 14 to 15, and FIGS. 17 to 18, the display panel further includes a plurality of blocking structures 33.

That is, the charged particles are blocked from moving to the adjacent pixels by providing the blocking structures.

Figure 19:
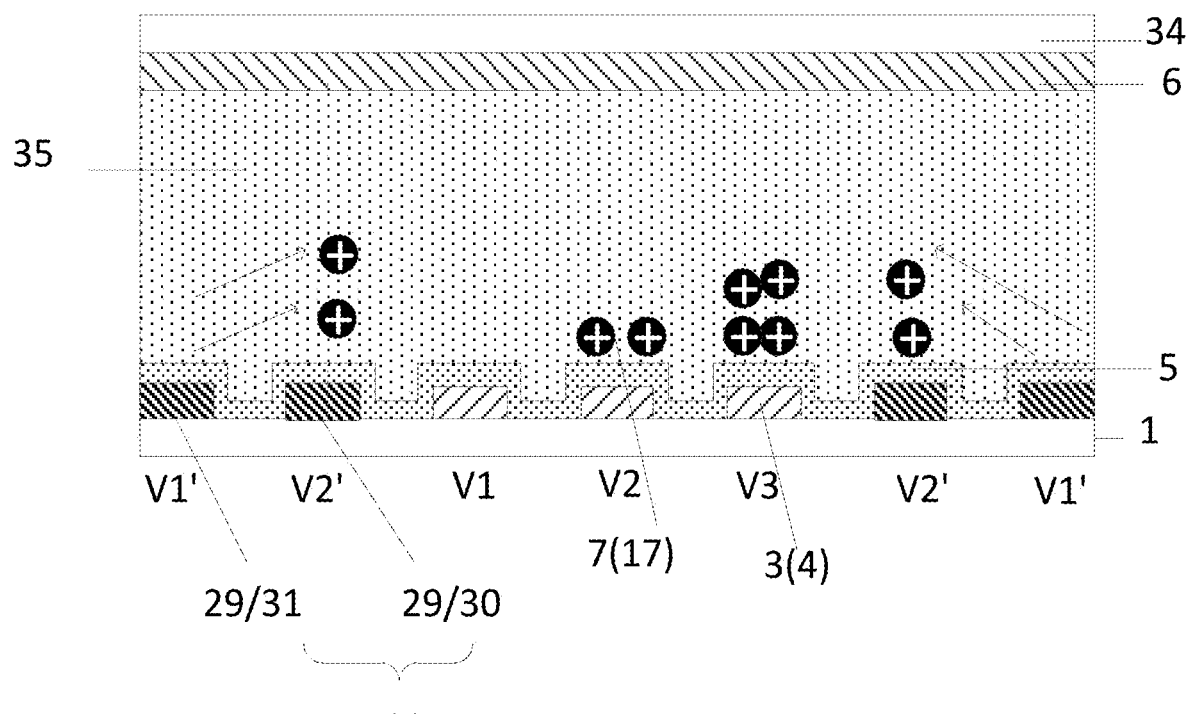
FIG. 19 is a schematic diagram of a structure of a display panel according to an embodiment of the present disclosure.

Alternatively, in some embodiments, as shown in FIG. 19, the display panel further includes a plurality of blocking electrode groups 28; each blocking electrode group 28 is located between adjacent pixels, and is configured to: form an electric field to block the charged particles 7 in the pixel; the electric field formed by the blocking electrode group 28 has a component in the direction parallel to the plane where the first base substrate 1 is located;

Each blocking electrode group 28 includes: a plurality of strip-shaped blocking electrode portions 29 respectively located on both sides of the pixel electrode 3 in the arrangement direction of the pixel sub-electrodes (i.e., in the arrangement direction of the strip-shaped electrodes 4); the plurality of strip-shaped blocking electrode portions 29 located on both sides of the pixel electrode 3 are provided independently from each other in the arrangement direction of the strip-shaped electrodes 4.

It should be noted that the blocking structures (if any) are usually provided on one side of one of the base substrates, but due to the limitation of the process conditions, the blocking structures are easily not in close contact with the structures provided on the other base substrate after the aligning and assembling process, which causes the charged particles to move to the adjacent pixels, and affects the display effect.

According to the display panel provided by the embodiment of the present disclosure, one blocking electrode group is arranged between every two adjacent pixels, and is loaded with a voltage to block the charged particles, so that the charged particles can be prevented from moving to the adjacent pixels without the blocking structures. The above defect, that the blocking structures cannot be in close contact with the structures provided on the first base substrate or the second base substrate, which causes the charged particles to move to the adjacent pixels, can be eliminated.

In some embodiments, the blocking electrode groups are in one-to-one correspondence with the pixels.

In some embodiments, the display panel further includes n blocking electrode driving signal terminals, and n strip-shaped blocking electrode portions are respectively connected to the n blocking electrode driving signal terminals; ith strip-shaped blocking electrode portions in different blocking electrode groups are electrically connected to the same blocking electrode driving signal terminal. That is, the same driving signal may be applied to the ith strip-shaped blocking electrode portions in different blocking electrode groups, to control the blocking electrode groups conveniently. In this way, it can be avoided to increase the difficulty of designing and manufacturing the display panel under the condition that the blocking electrode groups are provided.

In some embodiments, the display panel further includes a plurality of second driving transistors electrically connected to the strip-shaped blocking electrode portions in one-to-one correspondence. Therefore, the strip-shaped blocking electrode portions in different blocking electrode groups can be independently controlled through the plurality of second driving transistors.

In some embodiments, as shown in FIG. 19, the blocking electrode groups 28 and the pixel electrode 3 are disposed in the same layer. Therefore, the process for manufacturing the display panel can be saved, and the cost is saved.

In a specific implementation, a thickness of each strip-shaped blocking electrode portion may be the same as that of each strip-shaped electrode.

In some embodiments, in the arrangement direction of the strip-shaped electrodes, a width of each strip-shaped blocking electrode portion may be the same as that of each strip-shaped electrode; in the arrangement direction of the strip-shaped electrodes, a distance between any two adjacent strip-shaped blocking electrode portions, a distance between the strip-shaped blocking electrode portion and the strip-shaped electrode adjacent to the each other and a distance between any two adjacent strip-shaped electrodes are the same. In a specific implementation, for example, a thickness of each of the strip-shaped electrodes and the strip-shaped blocking electrode portions is 0.07 micrometer; the width of each of the strip-shaped electrodes and the strip-shaped blocking electrode portions is 4 micrometers in the arrangement direction of the strip-shaped electrodes, and the distance between any two adjacent strip-shaped blocking electrode portions, the distance between the strip-shaped blocking electrode portion and the strip-shaped electrode adjacent to the each other, and the distance between any two adjacent strip-shaped electrodes are 4 micrometers.

Alternatively, in some embodiments, in the arrangement direction of the strip-shaped electrodes, the width of each strip-shaped blocking electrode portion is less than that of each strip-shaped electrode, the distance between any two adjacent strip-shaped blocking electrode portions is less than the distance between any two adjacent strip-shaped electrodes; and the distance between the strip-shaped electrode and the strip-shaped blocking electrode portion adjacent to the each other is less than the distance between any two adjacent strip-shaped electrodes.

In the display panel provided by the embodiment of the present disclosure, the width of each strip-shaped blocking electrode portion is less than that of each strip-shaped electrode, the distance between any two adjacent strip-shaped blocking electrode portions is less than the distance between any two adjacent strip-shaped electrodes; and the distance between the strip-shaped blocking electrode portion and the strip-shaped electrode adjacent to the each other is less than the distance between any two adjacent strip-shaped electrodes, which can reduce an area occupied by the blocking electrode groups, improve the aperture ratio of the pixel, and improve the display effect.

In a specific implementation, in the arrangement direction of the strip-shaped electrodes, the width of each strip-shaped blocking electrode portion is greater than or equal to 2 micrometers and less than or equal to 3 micrometers, and the distance between any two adjacent strip-shaped blocking electrode portions is greater than or equal to 2 micrometers and less than or equal to 3 micrometers. For example, a thickness of each of the strip-shaped electrodes and the strip-shaped blocking electrode portions is 0.07 micrometer; in the arrangement direction of the strip-shaped electrodes, the width of each strip-shaped electrode is 4 micrometers, the width of each strip-shaped blocking electrode portion is 2 micrometers; the distance between any two adjacent strip-shaped blocking electrode portions and the distance between the strip-shaped blocking electrode portion and the strip-shaped electrode adjacent to the each other are 2 micrometers, and the distance between any two adjacent strip-shaped electrodes are 4 micrometers.

Figure 20:
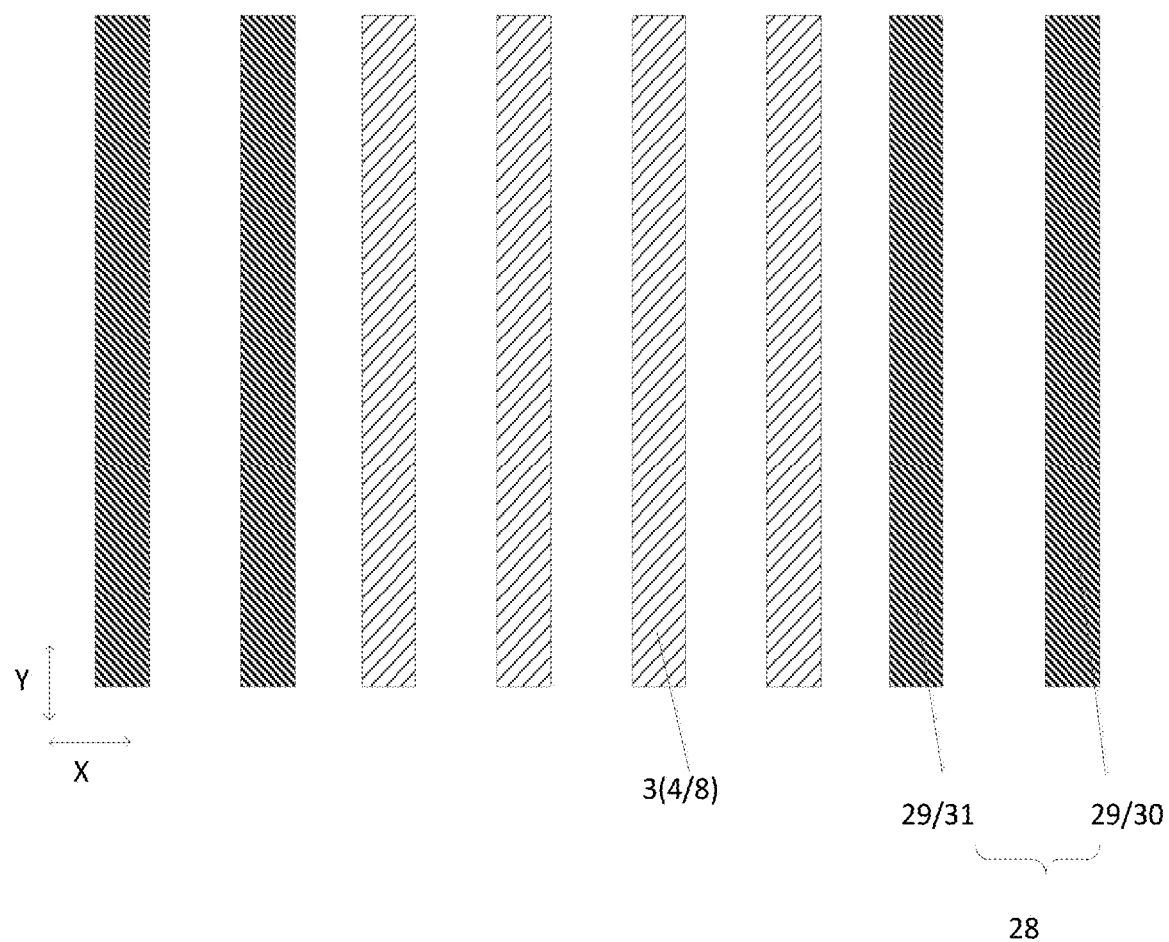
FIG. 20 is a schematic diagram of a structure of a pixel electrode and a blocking electrode group according to an embodiment of the present disclosure.

In some embodiments, as shown in FIG. 19, the first to nth strip-shaped blocking electrode portions are located on each side of the pixel electrode 3 in a direction from the strip-shaped blocking electrode portion to the pixel electrode, that is, in the arrangement direction of the strip-shaped electrodes 4, that is, in the second direction X in FIG. 20, where n is an integer greater than or equal to 2. The nth strip-shaped blocking electrode portion is positioned between the first strip-shaped blocking electrode portion 30 and the pixel electrode 3.

In a specific implementation, when the charged particles include charged particles of only one color, at least two strip-shaped blocking electrode portions are disposed on each side of the pixel electrode 3. The charged particles include only the black charged particles. As shown in FIGS. 19 to 28, two strip-shaped blocking electrode portions are disposed on each side of the pixel electrode 3, where the two strip-shaped blocking electrode portions are a first strip-shaped blocking electrode portion 30 and a second strip-shaped blocking electrode portion 31 located between the first strip-shaped blocking electrode portion 30 and the pixel electrode 3, respectively. As shown in FIG. 19, the charged black particles are positively charged, and a direction of the electric field formed by the two strip-shaped blocking electrode portions points to the pixel, so that the positively charged black particles can be prevented from moving to the adjacent pixels. When the charged particles include two types of charged particles with opposite electric properties, at least three strip-shaped blocking electrode portions are disposed on each side of the pixel electrode. The charged particles include positively charged black particles and negatively charged white particles. As shown in FIGS. 29 to 34, three strip-shaped blocking electrode portions are disposed on each side of the pixel electrode; the three strip-shaped blocking electrode portions are a first strip-shaped blocking electrode portion 30, a second strip-shaped blocking electrode portion 31, and a third strip-shaped blocking electrode portion 46, the second strip-shaped blocking electrode portion 31 is located between the first strip-shaped blocking electrode portion 30 and the pixel electrode 3, and the third strip-shaped blocking electrode portion 46 is located between the second strip-shaped blocking electrode portion 31 and the pixel electrode 3. As shown in FIG. 29, in the three strip-shaped blocking electrode portions, a direction of the electric field formed by the first strip-shaped blocking electrode portion 31 and the second strip-shaped blocking electrode portion 30 points to a pixel gap between this pixel and an adjacent pixel to the pixel, so that the negatively charged white particles can be prevented from moving to the adjacent pixel, and a direction of the electric field formed by the second strip-shaped blocking electrode portion 31 and the third strip-shaped blocking electrode portion 46 points to the pixel, so that the positively charged black particles can be prevented from moving to the adjacent pixel.

Figure 30:
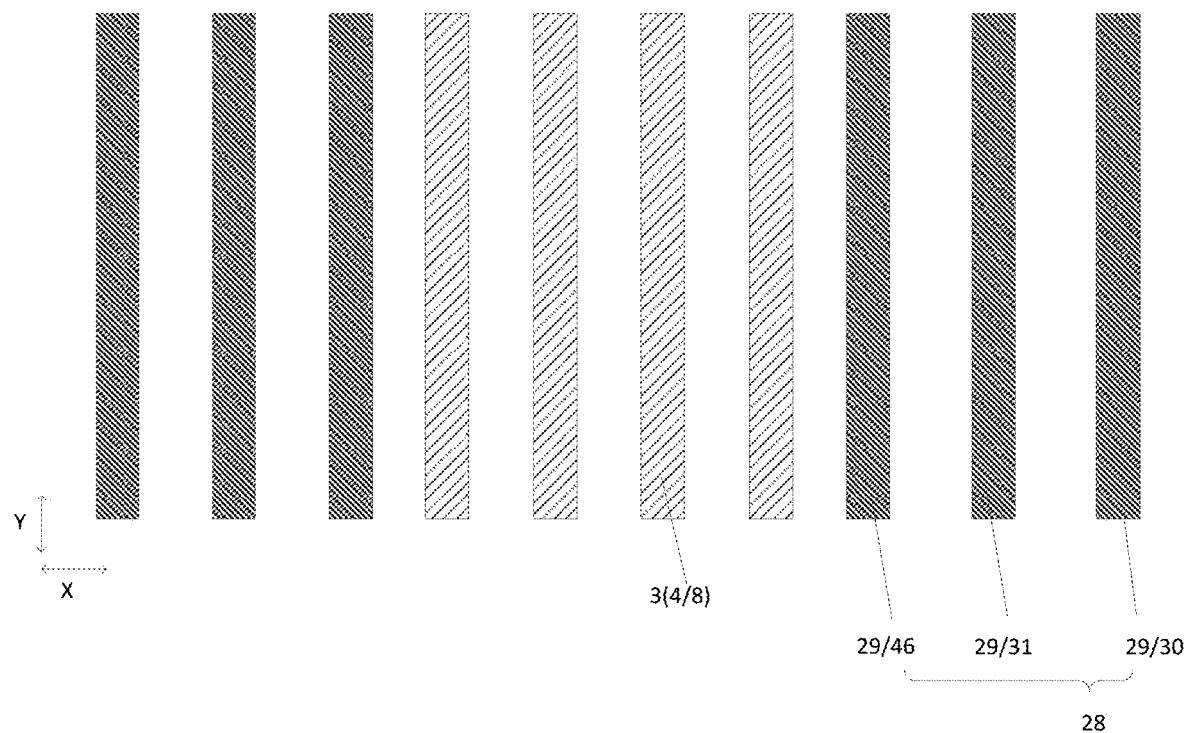
FIG. 30 is a schematic diagram of a structure of a pixel electrode and a blocking electrode group according to an embodiment of the present disclosure.

In some embodiments, as shown in FIGS. 20 and 30, each blocking electrode group 28 includes only strip-shaped electrode portions 29.

In some embodiments, the strip-shaped blocking electrode portion further serves as a touch electrode. That is, the display panel provided by the embodiment of the present disclosure is a touch display panel.

Figure 21:
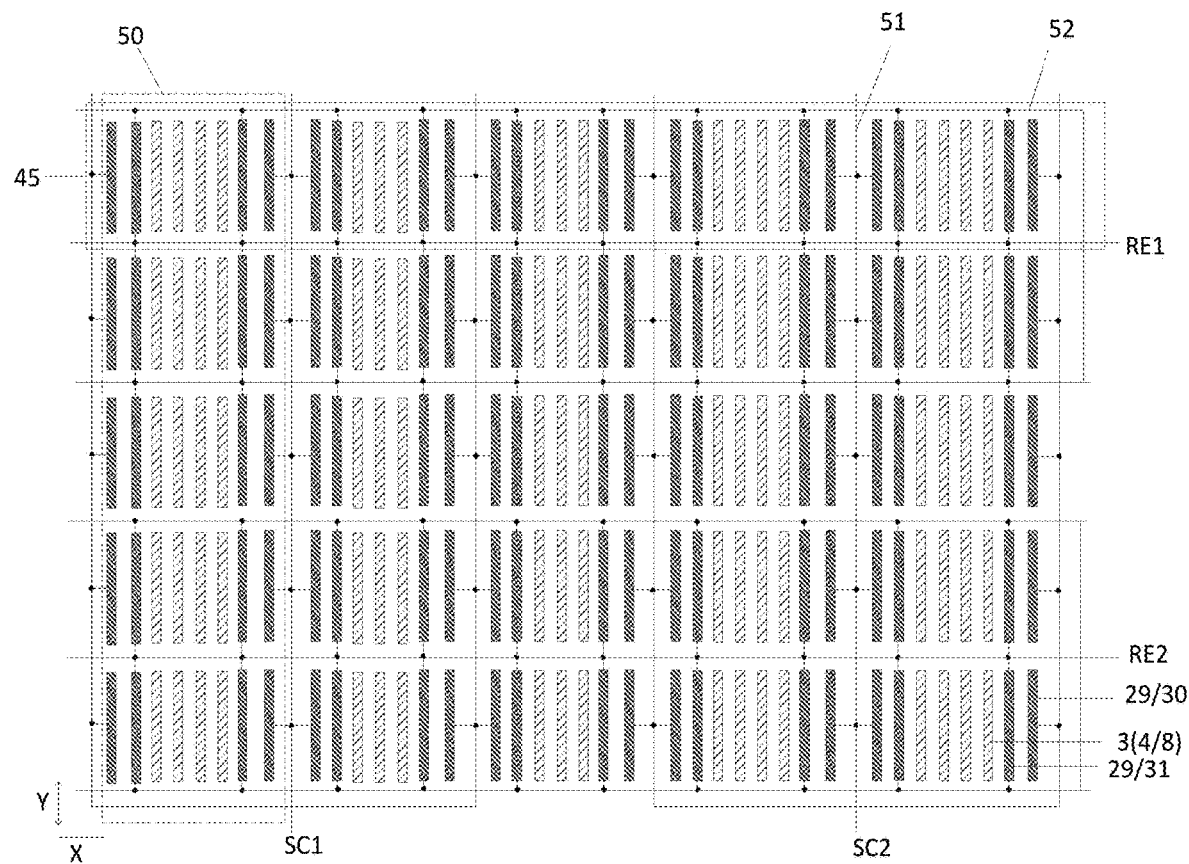
FIG. 21 is a schematic diagram of a structure of a pixel electrode and a blocking electrode group according to an embodiment of the present disclosure.
Figure 22:
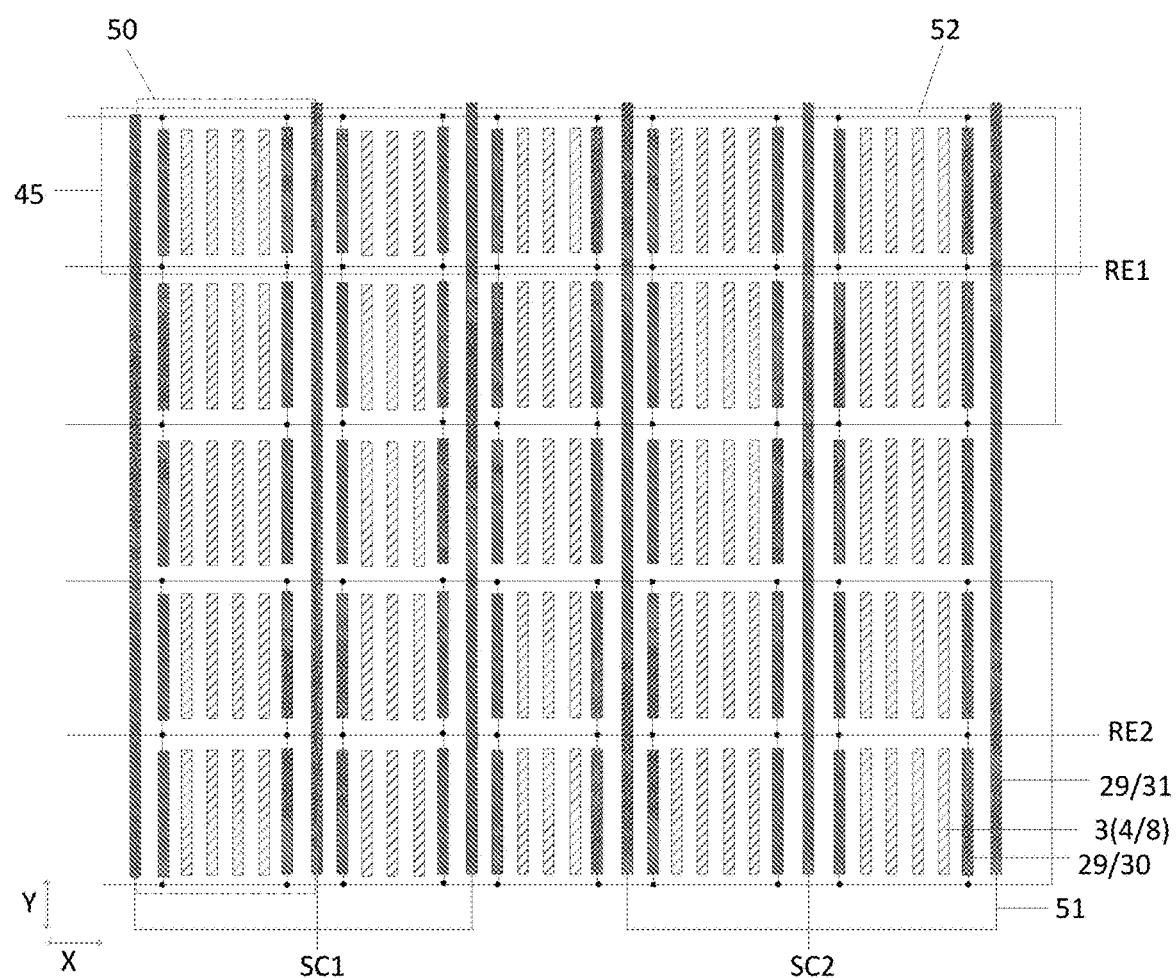
FIG. 22 is a schematic diagram of a structure of a pixel electrode and a blocking electrode group according to an embodiment of the present disclosure.

In some embodiments, as shown in FIGS. 21 and 22, the display panel further includes: a plurality of first touch signal lines 51 and a plurality of second touch signal lines 52.

An extending direction of the first touch signal lines 51 is the same as that of the strip-shaped blocking electrode portions 29, and an extending direction of the second touch signal lines 52 is the same as the arrangement direction of the strip-shaped blocking electrode portions 29; that is, the first touch signal lines 51 extend along the first direction Y, and the second touch signal lines 52 extend along the second direction X.

For any side of the pixel electrode 3 of each pixel 2, the outermost strip-shaped blocking electrode portion 29 is electrically connected to a first touch signal line 51, and the strip-shaped blocking electrode portion 29 closest to the pixel electrode 3 is electrically connected to a second touch signal line 52.

In some embodiments, as shown in FIG. 21, the first touch signal lines 51 and the second touch signal lines 52 intersect with each other.

Any two adjacent pixel columns 50 share the same first touch signal line 51, and any two adjacent ones of at least a part of adjacent pixel rows 45 share the same second touch signal line 52. That is, for two pixels in each row in any two adjacent pixel columns, the outermost strip-shaped blocking electrode portions 29 adjacent to each other in the two pixels are electrically connected to the same first touch signal line 51; for two pixels in each column in any two adjacent ones of at least a part of adjacent pixel rows, the strip-shaped blocking electrode portions 29 closest to the corresponding pixel electrodes are electrically connected to the same second touch signal line 52; and in each of the other part of adjacent pixel rows, the strip-shaped blocking electrode portions 29 closest to the corresponding pixel electrodes are electrically connected to only one second touch signal line 52.

It should be noted that in FIG. 21, the outermost strip-shaped blocking electrode portion 29 is a first strip-shaped blocking electrode portion 30 electrically connected to the first touch signal line 51, the strip-shaped blocking electrode portion 29 closest to the pixel electrode 3 is a second strip-shaped blocking electrode portion 31 electrically connected to the second touch signal line 52.

Alternatively, in some embodiments, as shown in FIG. 22, any two adjacent pixel columns 50 share the outermost strip-shaped blocking electrode portion 29 between the two adjacent pixel columns 50, that is, any two adjacent pixel columns 50 share the first strip-shaped blocking electrode portion 30 between the two adjacent pixel columns 50.

In the extending direction of the strip-shaped blocking electrode portion 29, that is, in the first direction Y, the outermost strip-shaped blocking electrode portions 29 on the same side in each pixel column 50 are integrally connected, that is, the first strip-shaped blocking electrode portions 30 on the same side in each pixel column 50 are integrally connected.

In some embodiments, as shown in FIGS. 21 and 22, for each pixel, the strip-shaped blocking electrode portions 29 closest to the pixel electrode 3 are electrically connected to two second touch signal lines 52 located on opposing sides of the pixel electrode 3 in the first direction Y.

In some embodiments, as shown in FIGS. 21 and 22, the display panel further includes: a plurality of first touch signal terminals SC electrically connected to the plurality of first touch signal lines 51 and a plurality of second touch signal terminals RE electrically connected to the plurality of second touch signal lines 52. In FIGS. 21 and 22, each first touch signal terminal SC is electrically connected to three first touch signal lines 51 for providing touch driving signals to the first touch signal lines 51, and each second touch signal terminal RE is electrically connected to three second touch signal lines 52 for reading feedback signals of the touch driving signals transmitted by the second touch signal lines 52.

Figure 23:
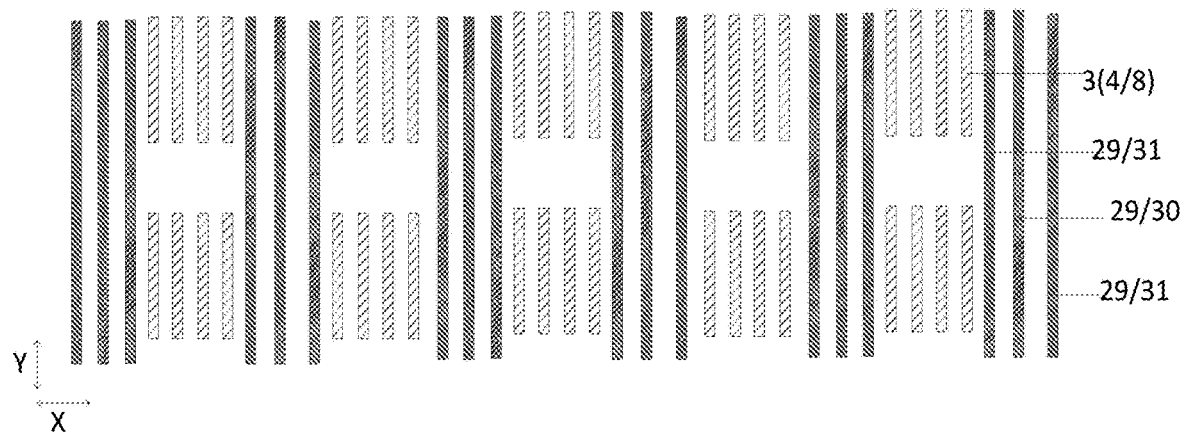
FIG. 23 is a schematic diagram of a structure of a pixel electrode and a blocking electrode group according to an embodiment of the present disclosure.
Figure 31:
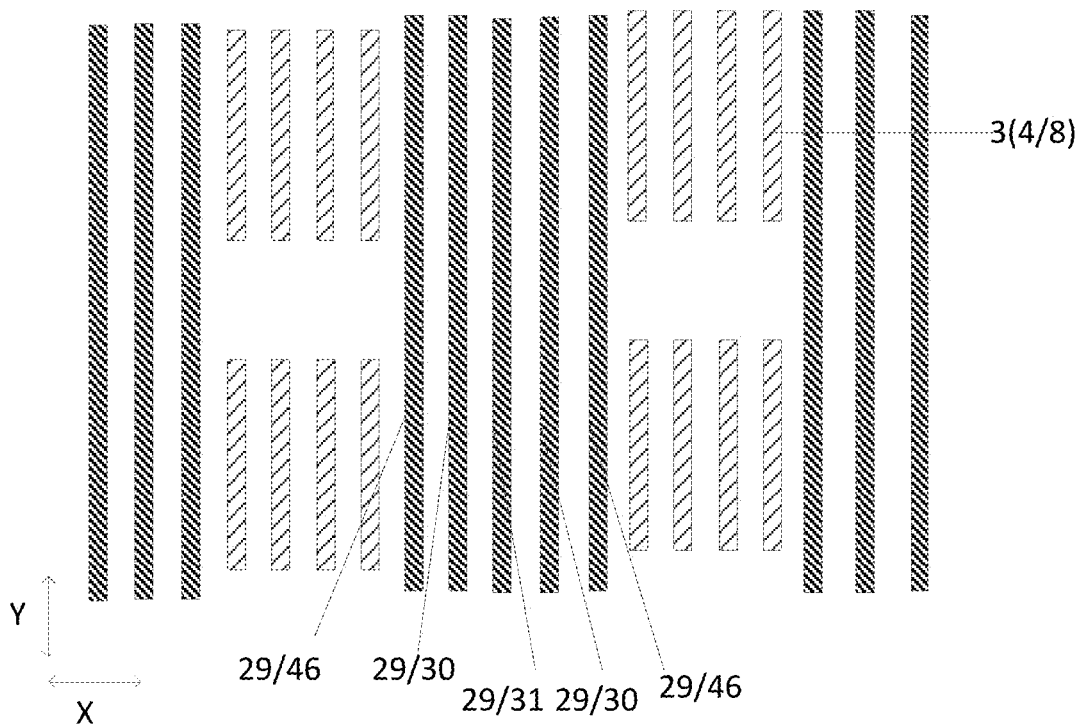
FIG. 31 is a schematic diagram of a structure of a pixel electrode and a blocking electrode group according to an embodiment of the present disclosure.

In some embodiments, as shown in FIGS. 23 and 31, in the direction from the strip-shaped blocking electrode portion 29 to the pixel electrode 3, that is, in the extending direction of the strip-shaped electrodes 4, the strip-shaped blocking electrode portions 29 located at the same position are integrally connected, that is, the strip-shaped blocking electrode portions 29 located at the same corresponding positions in pixels in each pixel column 50 are integrally connected.

In some embodiments, as shown in FIGS. 24 to 28 and 32 to 34, each blocking electrode group 28 further includes: n connection portions 42; the n connection portions include first to nth connection portions; the ith connection portion is connected to two ith strip-shaped blocking electrode portions 29; wherein i is an integer, and 1≤i≤n.

As shown in FIGS. 24 to 28, each blocking electrode group includes two connection portions 42, which are a first connection portion 43 and a second connection portion 32, respectively; the first connection portion 43 connects two first strip-shaped portions 30, and the second connection portion 32 connects two second strip-shaped portions 31.

Figure 32:
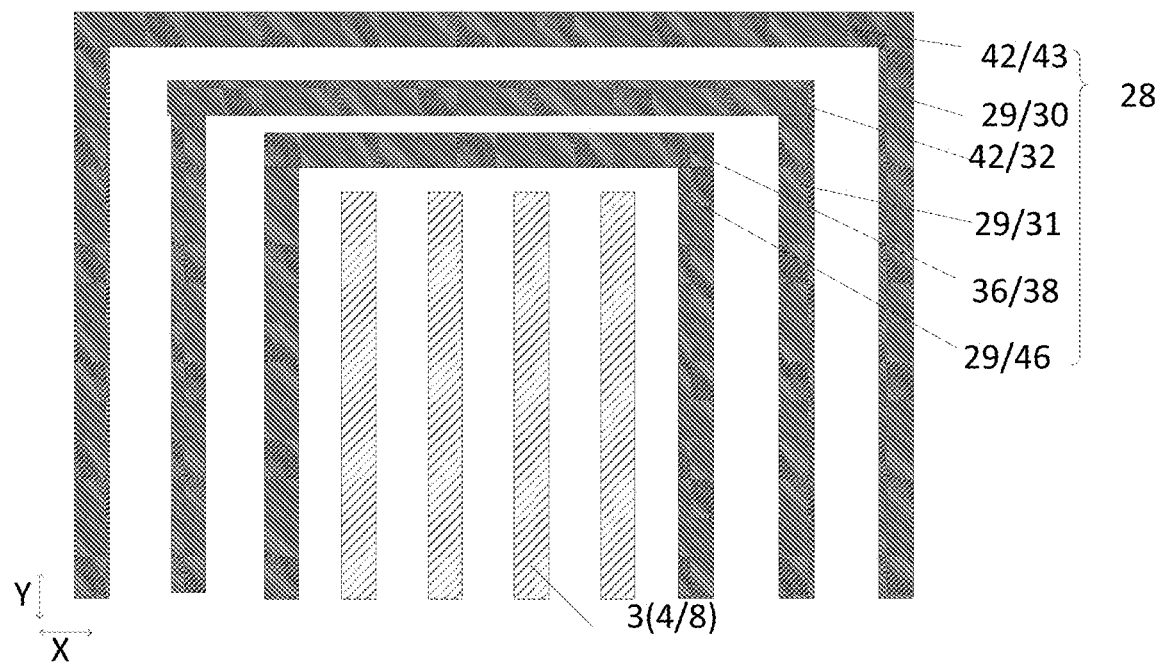
FIG. 32 is a schematic diagram of a structure of a pixel electrode and a blocking electrode group according to an embodiment of the present disclosure.
Figure 33:
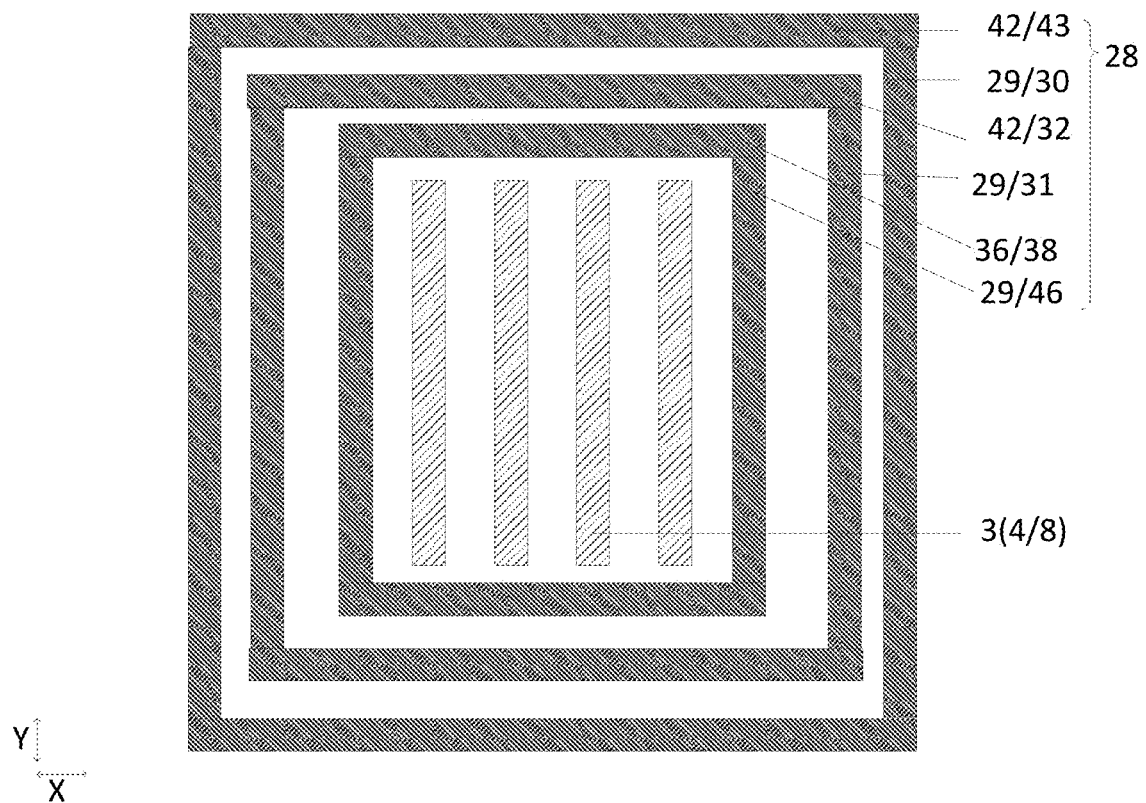
FIG. 33 is a schematic diagram of a structure of a pixel electrode and a blocking electrode group according to an embodiment of the present disclosure.
Figure 34:
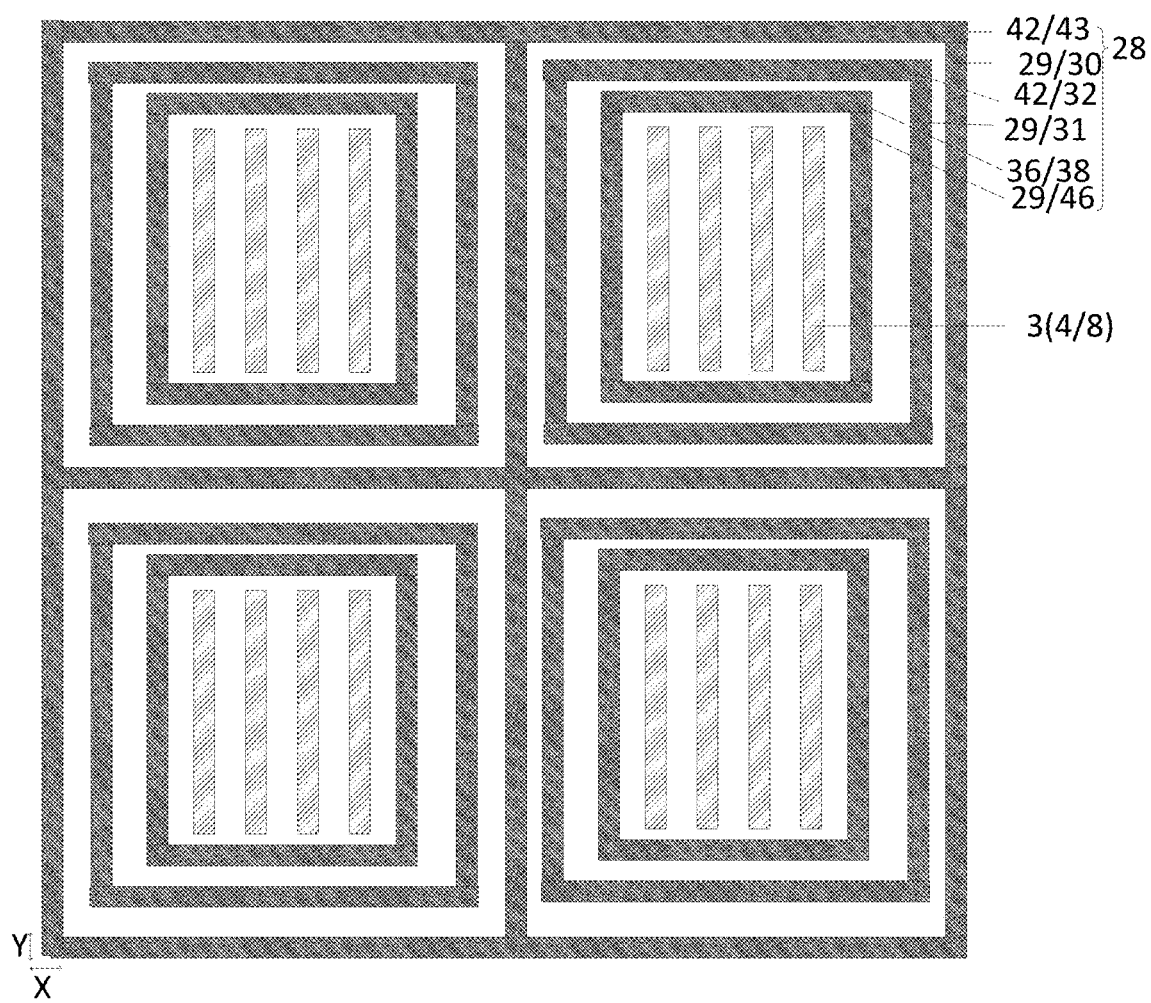
FIG. 34 is a schematic diagram of a structure of a pixel electrode and a blocking electrode group according to an embodiment of the present disclosure.

As shown in FIGS. 32 to 34, each blocking electrode group includes three connection portions 42, which are a first connection portion 43, a second connection portion 32, and a third connection portion 44, wherein the first connection portion 43 connects two first strip-shaped blocking electrode portions 30, the second connection portion 32 connects two second strip-shaped blocking electrode portions 31, and the third connection portion 44 connects two third strip-shaped blocking electrode portions 46.

In some embodiments, as shown in FIGS. 24 to 26, and 32, two ith strip-shaped blocking electrode portions 29 are connected to only one ith connection portion 42.

Figure 24:
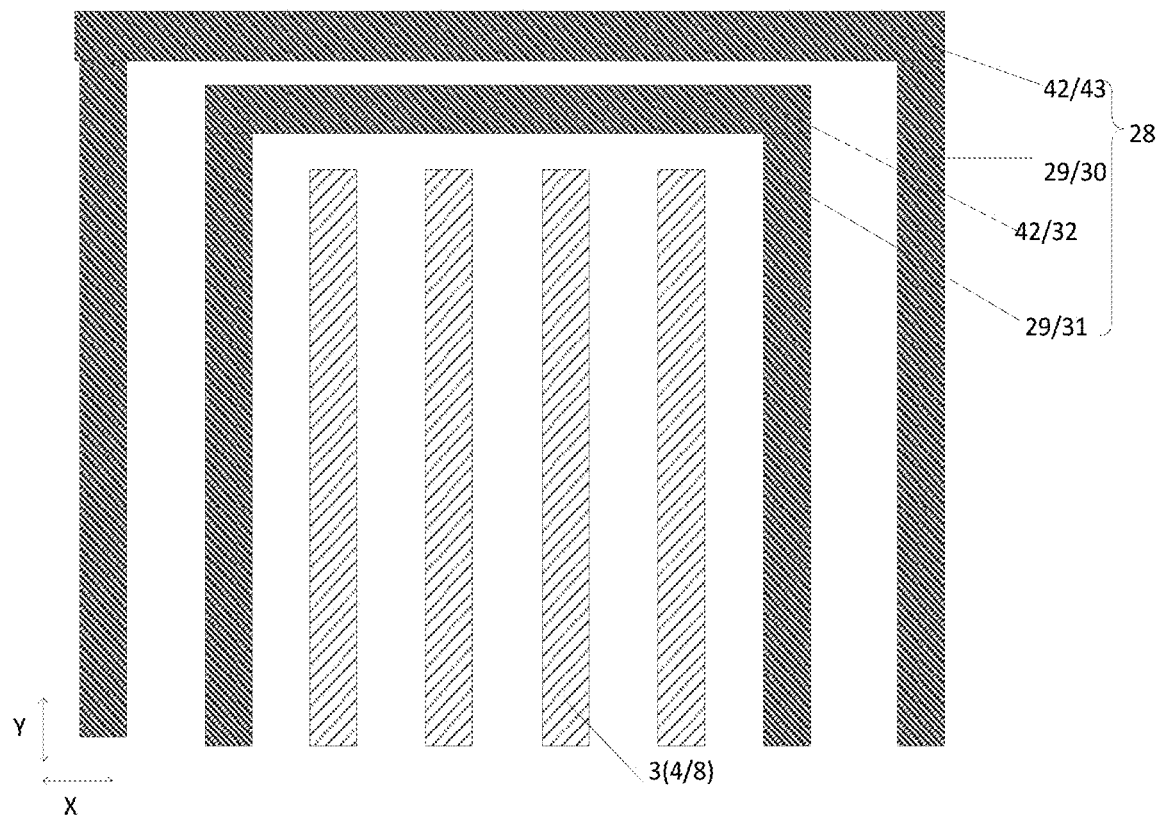
FIG. 24 is a schematic diagram of a structure of a pixel electrode and a blocking electrode group according to an embodiment of the present disclosure.

In some embodiments, as shown in FIGS. 24 and 32, the connection portions 42 are located on the same side of the pixel electrode 3 in the direction from the connection portions 42 to the pixel electrode 3, i.e., in the extending direction of the strip-shaped electrode 4.

Alternatively, in some embodiments, as shown in FIG. 24, the plurality of connection portions 42 are located on different sides of the pixel electrode 3 in the direction from the strip-shaped blocking electrode portion 29 to the pixel electrode 3, i.e., in the extending direction of the strip-shaped electrode 4.

Figure 25:
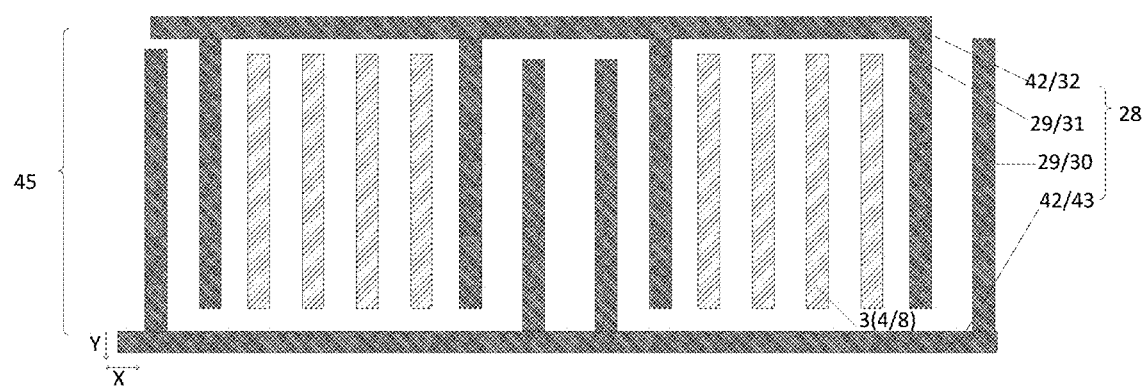
FIG. 25 is a schematic diagram of a structure of a pixel electrode and a blocking electrode group according to an embodiment of the present disclosure.
Figure 26:
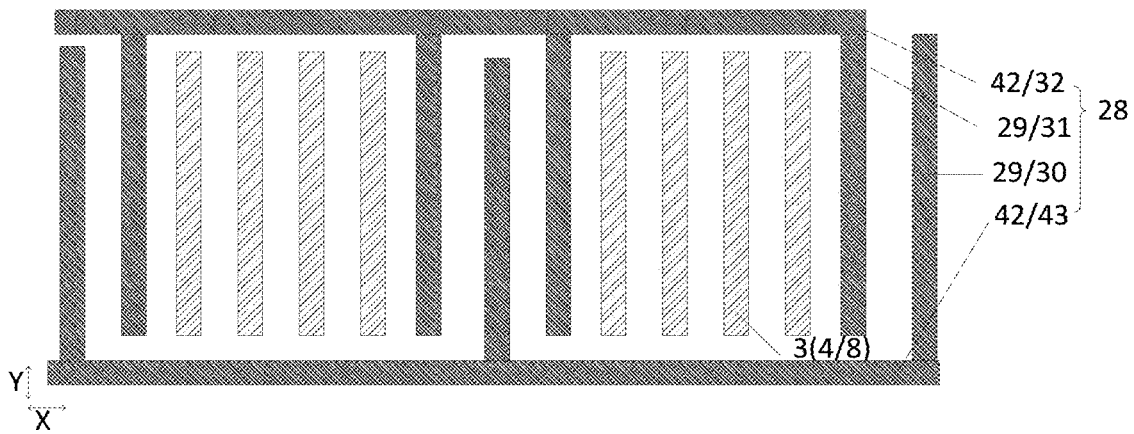
FIG. 26 is a schematic diagram of a structure of a pixel electrode and a blocking electrode group according to an embodiment of the present disclosure.
Figure 27:
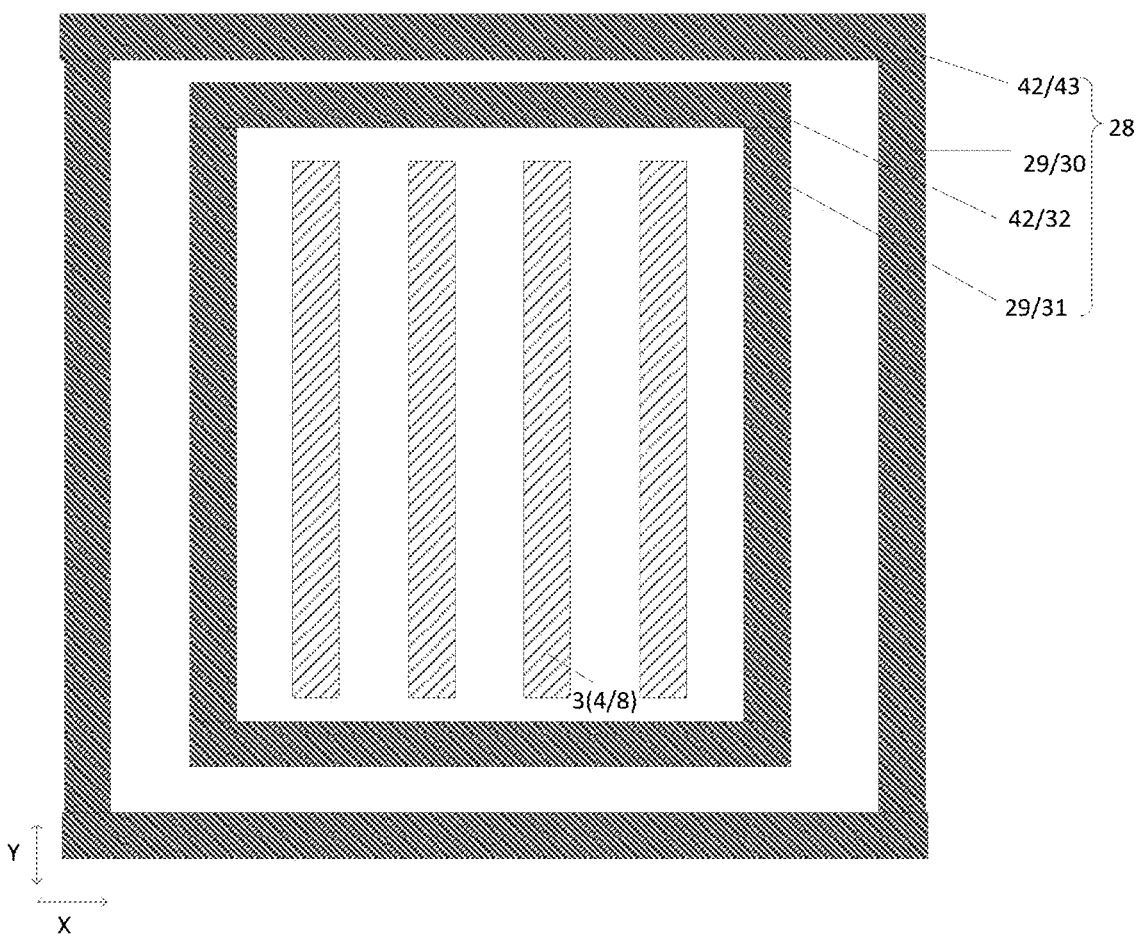
FIG. 27 is a schematic diagram of a structure of a pixel electrode and a blocking electrode group according to an embodiment of the present disclosure.

In the case where the plurality of connection portions are located on different sides of the pixel electrode, in some embodiments, as shown in FIGS. 25, 26, the plurality of pixels include a plurality of pixel rows 45; in the plurality of blocking electrode groups 28 corresponding to each pixel row 45, the connection portions 42 located on the side of the pixel electrode 3 and farthest from the pixel electrode 3 are integrally connected in the extending direction of the strip-shaped blocking electrode portion 29 in the row.

That is, in FIGS. 25 and 26, in each pixel row, the plurality of first connection portions 43 are integrally connected as a single piece, and the plurality of second connection portions 32 are integrally connected as a single piece. Therefore, the same driving signal is input into the ith connection portions in each pixel row, so as to control the blocking electrode group. In a specific implementation, when the n blocking electrode driving signal terminals are used to provide signals to the blocking electrode groups, the ith connection portions in the pixel rows may be electrically connected to the same blocking electrode driving signal terminal.

In some embodiments, when the blocking electrode groups are in one-to-one correspondence with the pixels, two blocking electrode groups are included between any two adjacent pixels. As shown in FIG. 26, in the arrangement direction of the strip-shaped blocking electrode portions 29, two blocking electrode groups 28 between any two adjacent pixels share a first strip-shaped blocking electrode portion 30. Therefore, the number of the strip-shaped blocking electrode portions can be reduced, the area of the blocking electrode groups is further reduced, and the aperture ratio of the pixel is prevented from being influenced.

Alternatively, in some embodiments, as shown in FIGS. 27, 29, 33 to 34, in an extending direction of each ith strip-shaped blocking electrode portion 29, two ith connection portions 42 are connected to both ends of the ith strip-shaped blocking electrode portion 29; the two ith connection portions 42 and the two ith strip-shaped blocking electrode portions 29 are connected together to form an annular blocking electrode. Therefore, in the extending direction of the strip-shaped electrode, at least two connection portions are adjacent to each other, and an electric field formed between the connection portions can also prevent the charged particles from moving to adjacent pixels, That is, it is ensured that the charged particles in an area surrounded by the annular blocking electrode cannot move to the adjacent pixels.

Figure 28:
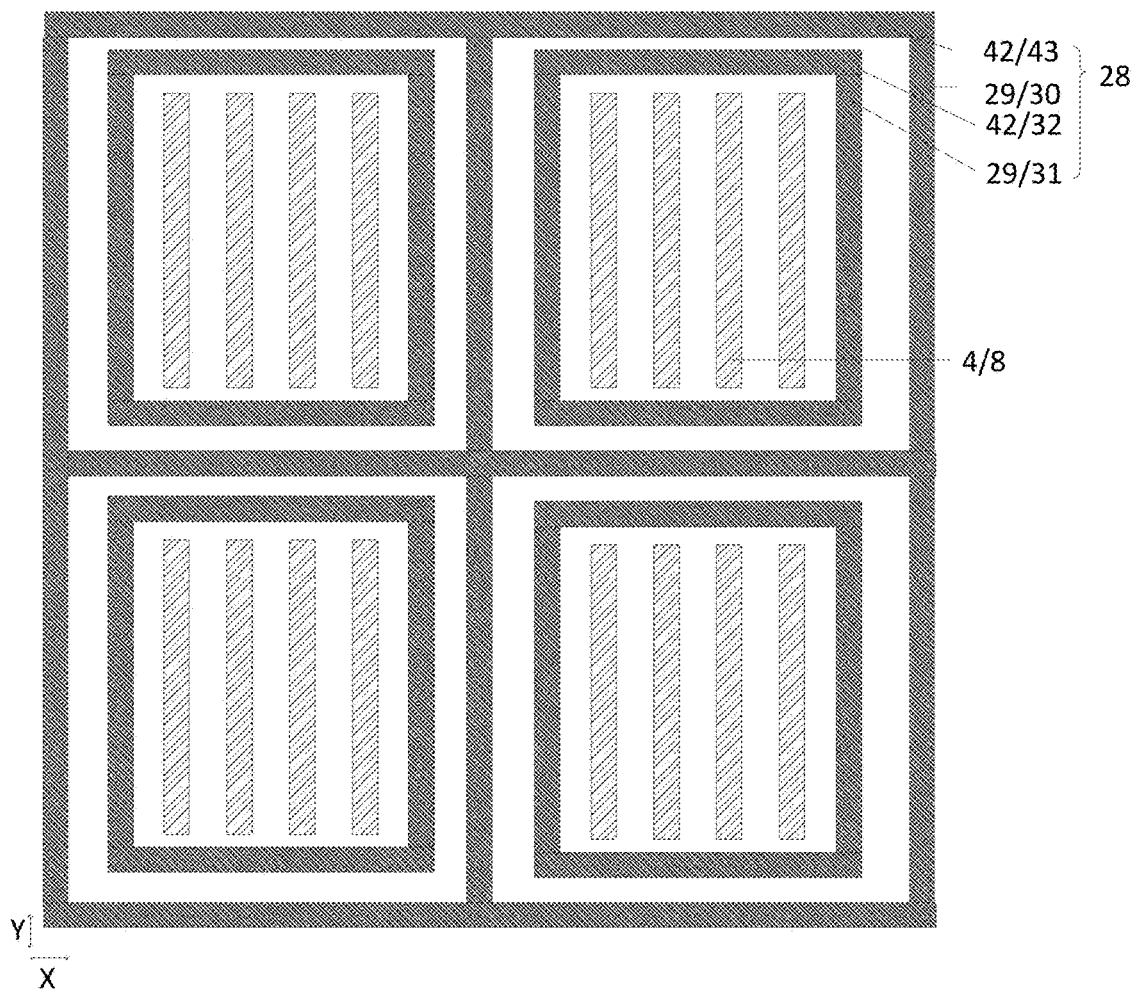
FIG. 28 is a schematic diagram of a structure of a pixel electrode and a blocking electrode group according to an embodiment of the present disclosure.
Figure 29:
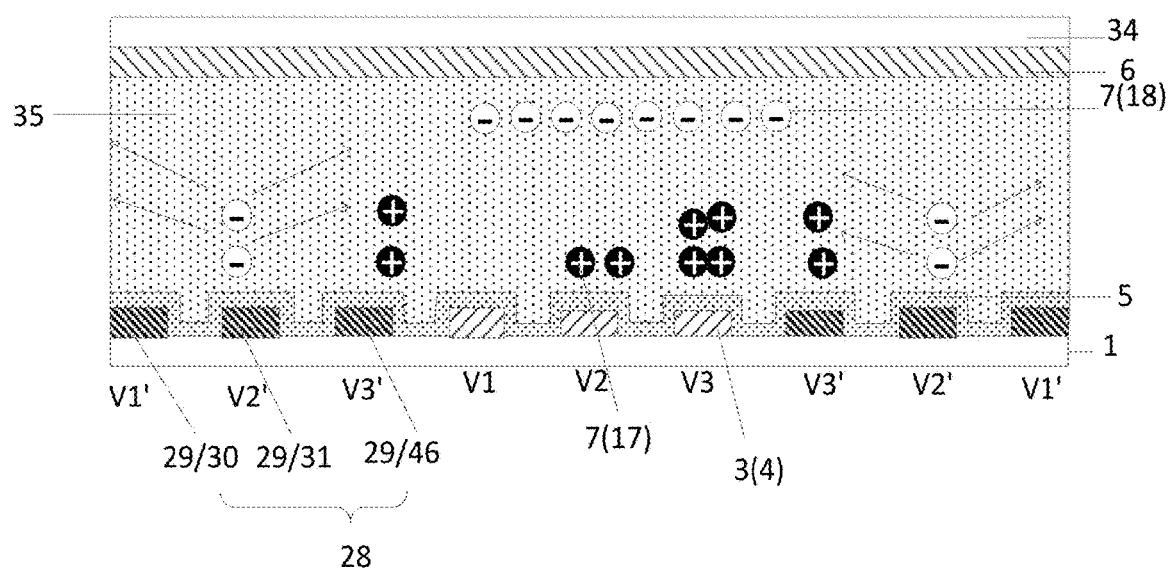
FIG. 29 is a schematic diagram of a structure of a display panel according to an embodiment of the present disclosure.

In some embodiments, as shown in FIGS. 28 and 34, the first strip-shaped blocking electrode portions 30 of the blocking electrode groups 28 are integrally connected as a single piece, and a pattern of an orthographic projection of the integrally connected first blocking strip-shaped electrode portions 30 of the blocking electrode groups 28 on the first base substrate is a grid pattern.

Figure 35:
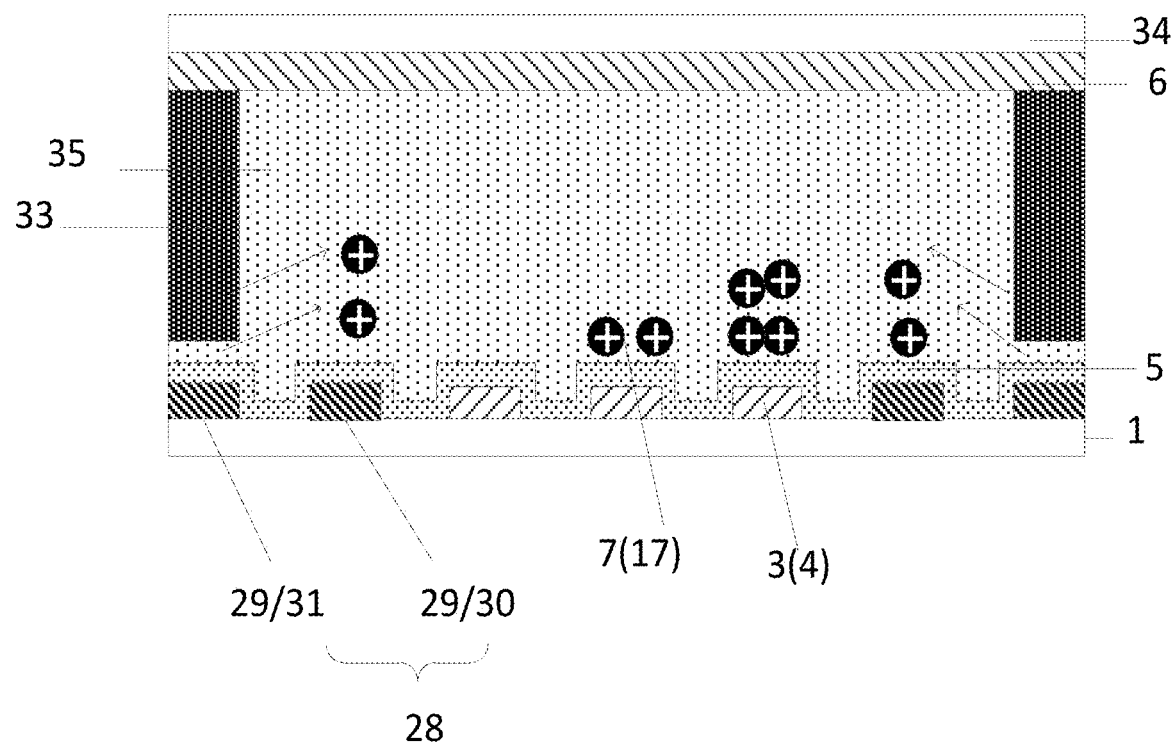
FIG. 35 is a schematic diagram of a structure of a display panel according to an embodiment of the present disclosure.

In some embodiments, as shown in FIG. 35, when the display panel includes the blocking electrode group 28, the display panel further includes: a plurality of blocking structures 33 located on a side of the common electrode 6 close to the first base substrate 1; an orthographic projection of each blocking structure 33 on the first base substrate 1 overlaps with an orthographic projection of the corresponding blocking electrode group 28 on the first base substrate 1.

That is, in the embodiment of the present disclosure, double blocking the charged particles is realized by the electric field generated by the electric field generated by the blocking electrodes (electric barriers) and the blocking structures, and the charged particles are prevented from moving to the adjacent pixels.

In some embodiments, as shown in FIG. 35, the orthographic projection of each blocking structure on the first base substrate 1 overlaps with an orthographic projection of the corresponding first strip-shaped blocking electrode portion 31 on the first base substrate 1. The orthographic projection of each blocking structure on the first base substrate 1 does not overlap with an orthographic projection of other strip-shaped blocking electrode portions 29 on the first base substrate 1.

Figure 36:
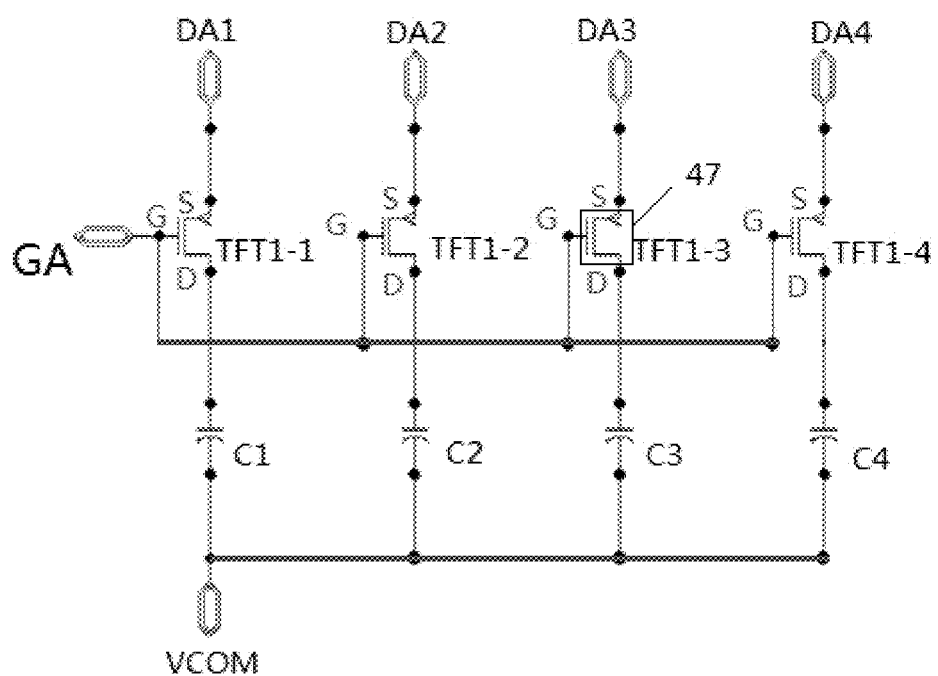
FIG. 36 is a circuit diagram of a first driving unit corresponding to a pixel according to an embodiment of the present disclosure.
Figure 37:
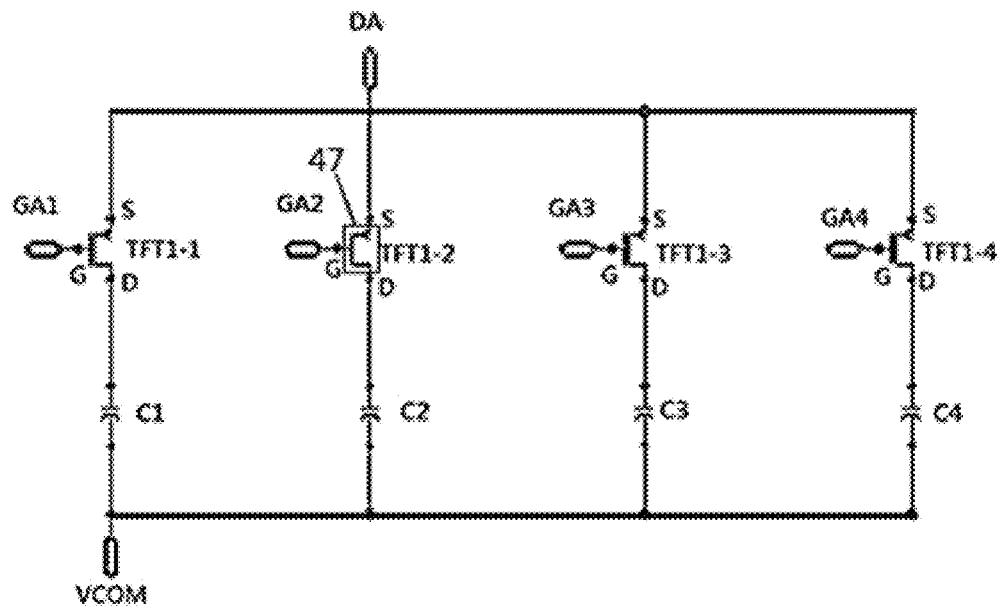
FIG. 37 is a circuit diagram of a first driving unit corresponding to a pixel according to an embodiment of the present disclosure.

In some embodiments, as shown in FIGS. 36 and 37, the display panel further includes: a plurality of first scanning signal lines GA and a plurality of data signal lines DA; a source electrode S of each first driving transistor TFT1 is electrically connected to the corresponding data signal line DA, a drain electrode D of each first driving transistor TFT1 is electrically connected to the pixel electrode, and a gate electrode G of each first driving transistor TFT1 is electrically connected to the corresponding first scanning signal line GA.

Therefore, the first driving transistor TFT1 is controlled to be turned on by a scanning signal supplied from the first scanning signal line GA, and a signal from the data signal line DA is written to the strip-shaped electrodes in the pixel electrode.

In some embodiments, as shown in FIGS. 36, 37, each driving unit 47 includes only the first driving transistors TFT1.

In some embodiments, as shown in FIG. 36, in the plurality of first driving transistors TFT1 corresponding to each pixel, the gate electrodes G of different first driving transistors TFT1 are electrically connected to the same first scanning signal line GA, and the source electrodes S of different first driving transistors TFT1 are electrically connected to different data signal lines DA.

Alternatively, in some embodiments, as shown in FIG. 37, in the plurality of first driving transistors TFT1 corresponding to each pixel, the gate electrodes G of different first driving transistors TFT1 are electrically connected to different first scanning signal lines GA, and the source electrodes S of different first driving transistors TFT1 are electrically connected to the same data signal line DA.

It should be noted that in FIGS. 36 and 37, a capacitor C represents a capacitor formed by the pixel sub-electrode and the common electrode, and the common electrode is electrically connected to a common electrode signal line VCOM. In FIGS. 36 and 37, as an example, each pixel electrode includes four pixel sub-electrodes, and accordingly, the four pixel sub-electrodes respectively form capacitors C1 to C4 with the common electrode, and are respectively electrically connected to the four first driving transistors TFT1-1 to TFT 1-4. In FIG. 36, gate electrodes G of the four first driving transistors TFT1-1 to TFT1-4 are electrically connected to the same first scanning signal line GA, and source electrodes S of the four first driving transistors TFT1-1 to TFT1-4 are electrically connected to the four data signal lines DA1 to DA4, respectively. In FIG. 37, the source electrodes S of the four first driving transistors TFT1-1 to TFT1-4 are electrically connected to the same data signal line DA, and the gate electrodes G of the four first driving transistors TFT1-1 to TFT1-4 are electrically connected to the four first scanning signal lines GA1 to GA4, respectively.

It should be noted that the plurality of pixels are divided into a plurality of pixel rows and a plurality of pixel columns. The arrangement direction of the plurality of pixel rows is, for example, the same as the arrangement direction of the plurality of first scanning signal lines, and the arrangement direction of the plurality of pixel columns is, for example, the same as the arrangement direction of the plurality of data signal lines. In a specific implementation, in each pixel, under the condition that the gate electrodes of different first driving transistors are electrically connected to the same first scanning signal line, and the source electrodes of different first driving transistors are electrically connected to different data signal lines, gate electrodes of the first driving transistors of pixels in each pixel row are electrically connected to the same first scanning signal line, and the first driving transistors in different pixel rows are electrically connected to different first scanning signal lines; source electrodes of the first driving transistors labeled with the same number in pixels in each pixel column are electrically connected to the same data signal line. For example, the source electrodes of the first driving transistors labeled with the number of TFT1-1 in one pixel column are electrically connected to the data signal line DA1; in different pixel columns, source electrodes of the first driving transistors labeled with the same number are electrically connected to different data signal lines. In a specific implementation, in each pixel, under the condition that the gate electrodes of different first driving transistors are electrically connected to different first scanning signal lines, and the source electrodes of different first driving transistors are electrically connected to the same data signal line, source electrodes of the first driving transistors of pixels in each pixel column are electrically connected to the same data signal line, and source electrodes of the first driving transistors in different pixel columns are electrically connected to different data signal lines; the gate electrodes of the first driving transistors labeled with the same number in each pixel row are electrically connected to the same first scanning signal line. For example, the gate electrodes of the first driving transistors labeled with the number of TFT1-1 in one pixel row are electrically connected to the first scanning signal line GA1; for different pixel rows, the gate electrodes of the first driving transistors labeled with the same number are electrically connected to different first scanning signal lines.

Figure 38:
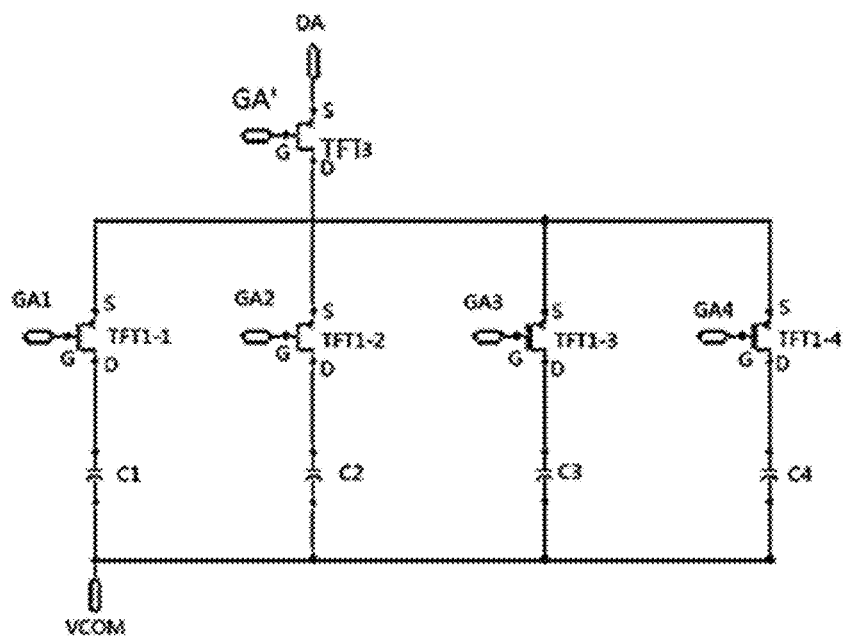
FIG. 38 is a circuit diagram of a first driving unit corresponding to a pixel according to an embodiment of the present disclosure.

Alternatively, in some embodiments, as shown in FIG. 38, each driving unit 47 further includes a plurality of third driving transistors TFT3 and a plurality of second scanning signal lines GA'; the source electrodes of the plurality of first driving transistors TFT1 are electrically connected to a drain electrode of the corresponding third driving transistors TFT3, a source electrode of the third driving transistor TFT3 is electrically connected to the corresponding data signal lines DA, and a gate electrode of the third driving transistor TFT3 is electrically connected to the corresponding second scanning signal lines GA'.

In a specific implementation, a plurality of third driving transistors TFT3 corresponding to the same pixel row are electrically connected to the same second scanning signal line GA'.

In a specific implementation, as shown in FIG. 38, signals input through the first scanning signal lines GA1 to GA4 are full-screen scanning signals, that is, the scanning signal transmitted through the first scanning signal line GA1 is input to the first driving transistor TFT1-1 in each pixel electrically connected to the first scanning signal line GA1 simultaneously; the scanning signal transmitted through the first scanning signal line GA2 is input to the first driving transistor TFT1-2 in each pixel electrically connected to the first scanning signal line GA2 simultaneously; the scanning signal transmitted through the first scanning signal line GA3 is input to the first driving transistor TFT1-3 in each pixel electrically connected to the first scanning signal line GA3 simultaneously; the scanning signal transmitted through the first scanning signal line GA4 is input to the first driving transistor TFT1-4 in each pixel electrically connected to the first scanning signal line GA4 simultaneously. In addition, the same third driving transistor TFT3 is shared by the pixels in each pixel row, and is configured to provide a driving signal to the pixels, and the plurality of first driving transistors TFT1-1 to TFT1-4 are controlled to be turned on in cooperation with the plurality of first scanning signal lines GA1 to GA4, so that the driving signal is written into each of the plurality of pixel sub-electrodes.

Figure 39:
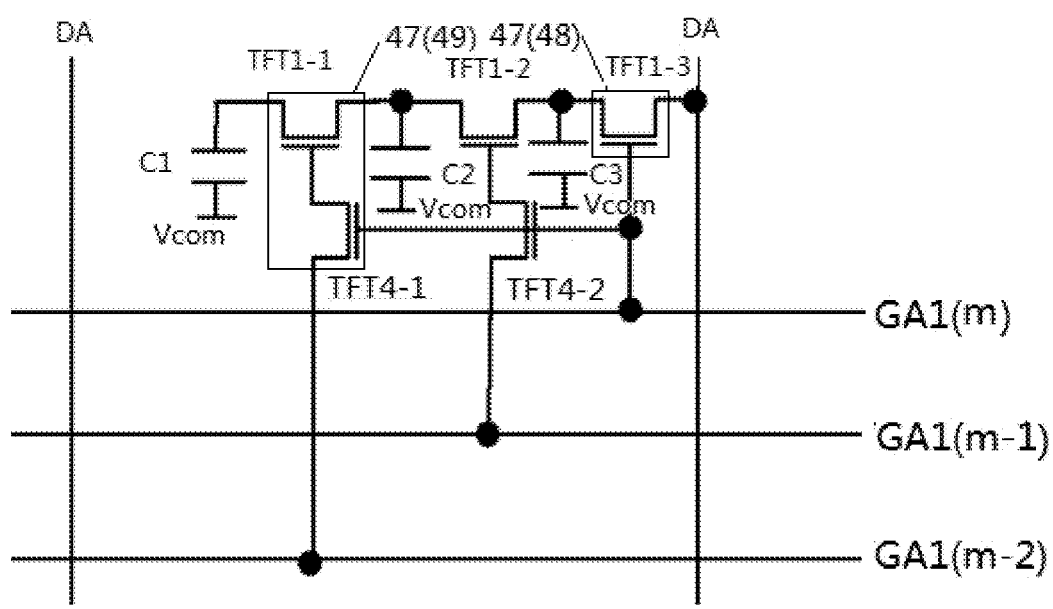
FIG. 39 is a circuit diagram of a first driving unit corresponding to a pixel according to an embodiment of the present disclosure.

Alternatively, in some embodiments, as shown in FIG. 39, the plurality of driving units 47 corresponding to each pixel includes one first driving unit 48 and a (at least one) second driving unit 49; the first driving unit 48 includes only the first driving transistor TFT1, and the (each) second driving unit 49 further includes a fourth driving transistor TFT4 electrically connected to the first driving transistor TFT1;

The plurality of first driving transistors TFT1 in the plurality of driving units 47 are connected in series by source and drain electrodes of the plurality of first driving transistors TFT1, and a source electrode of the first driving transistor TFT1 in the first driving unit 48 is electrically connected to the corresponding data signal line DA;

A source electrode of the fourth driving transistor TFT4 in each second driving unit 49 is electrically connected to the corresponding first scanning signal line GA, a drain electrode of the fourth driving transistor TFT4 in each second driving unit 49 is electrically connected to a gate electrode of the corresponding first driving transistor TFT1 in the second driving unit 49, and a gate electrode of the fourth driving transistor TFT4 in each second driving unit 49 is electrically connected to a gate electrode of the first driving transistor TFT1 in the first driving unit 48;

The different driving units 47 are electrically connected to different first scanning signal lines GA.

In FIG. 39, three driving units 47 corresponding to each pixel are illustrated as an example, where the three driving units 47 include one first driving unit 48 and two second driving units 49; the first driving unit 48 includes the first driving transistor TFT1-3, one of the two second driving units 49 includes the first driving transistor TFT1-1 and the fourth driving transistor TFT4-1, and the other second driving unit 49 includes the first driving transistor TFT1-2 and the fourth driving transistor TFT4-2. A source electrode of the first driving transistor TFT1-3 is electrically connected to the corresponding data signal line DA, a drain electrode of the first driving transistor TFT1-3 is electrically connected to a source electrode of the first driving transistor TFT1-2, and a drain electrode of the first driving transistor TFT1-2 is electrically connected to a source electrode of the first driving transistor TFT1-1. A gate electrode of the first driving transistor TFT1-3, a source electrode of the fourth driving transistor TFT4-2, and a source electrode of the fourth driving transistor TFT4-1 are electrically connected to three first scanning signal lines GA1(m) to GA1(m−2), respectively.

In a specific implementation, in each pixel row, the gate electrodes of the first driving transistors TFT1-1 corresponding to different pixels are electrically connected to the same first scanning signal line GA1(m), the source electrodes of the fourth driving transistors TFT4-2 corresponding to different pixels are electrically connected to the same first scanning signal line GA1(m−1), and the source electrodes of the fourth driving transistors TFT4-1 corresponding to different pixels are electrically connected to the same first scanning signal line GA1(m−2); in the same pixel column, the source electrodes of the first driving transistors TFT1-1 corresponding to different pixels are electrically connected to the same data signal line DA.

In a specific implementation, as shown in FIG. 39, the first driving transistor TFT1-1 to TFT1-3 and the fourth driving transistor TFT4-1 to TFT4-2 corresponding to each pixel have the same type, and may be formed by using an a-Si process, which is simple and easy to implement, and thus, reduces the difficulty of manufacturing the display panel. In FIG. 39, the first driving transistors TFT1-1 to TFT1-3 and the fourth driving transistors TFT4-1 to TFT4-2 are all N-type transistors, as an example. However, the first driving transistors TFT1-1 to TFT1-3 and the fourth driving transistors TFT4-1 to TFT4-2 may be all P-type transistors.

In a specific implementation, as shown in FIG. 39, pixels in an m-th pixel row share the first scanning signal line GA with pixels in an (m−1)th pixel row and an (m−2)th pixel row. Therefore, the number of the first scanning signal lines can be reduced, the difficulty of designing and manufacturing the display panel is reduced, and the cost is saved. As shown in FIG. 39, the gate electrodes of the first driving transistors TFT1-1 corresponding to the pixels in the m-th pixel row are electrically connected to the first scanning signal line GA1(m) in an m-th row, the source electrodes of the fourth driving transistors TFT4-2 corresponding to the pixels in the m-th pixel row are electrically connected to the first scanning signal line GA1(m−1) in an (m−1)th row, and the source electrodes of the fourth driving transistors TFT4-1 corresponding to the pixels in the m-th pixel row are electrically connected to the first scanning signal line GA1 (m−2) in an (m−2)th row.

Figure 40:
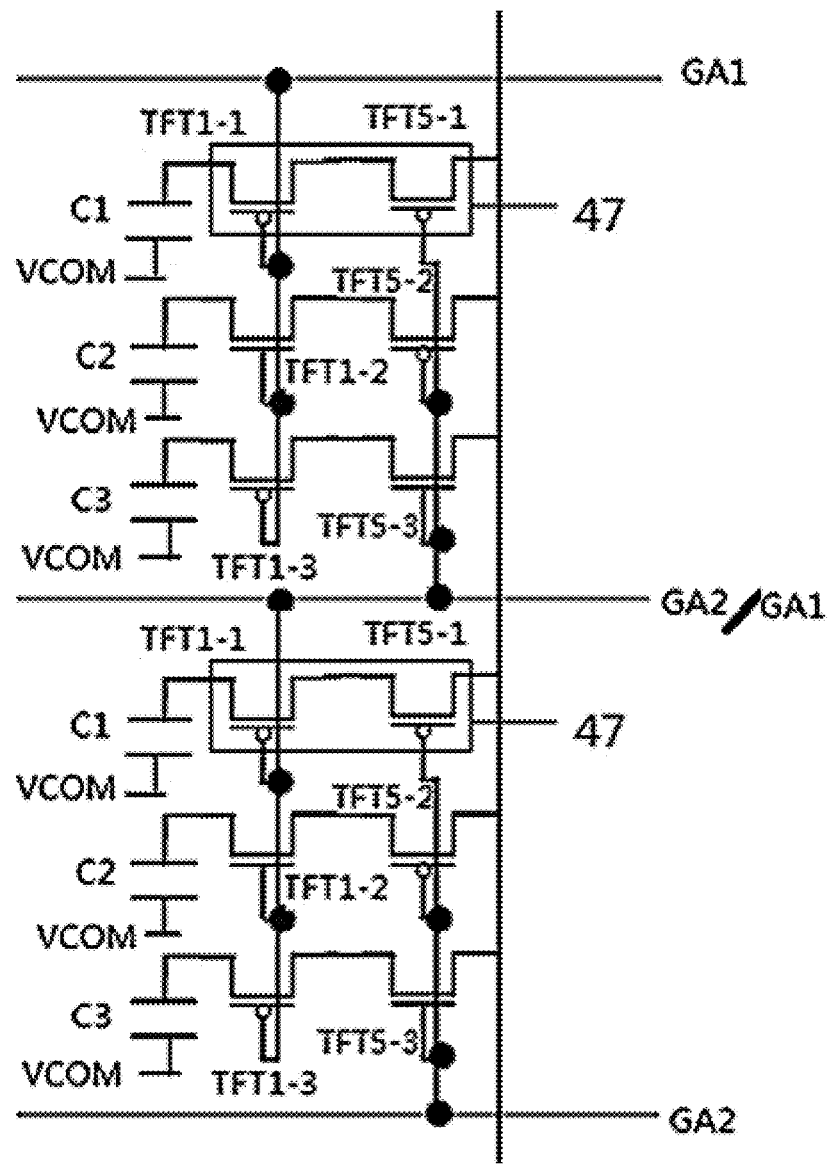
FIG. 40 is a circuit diagram of a first driving unit corresponding to a pixel according to an embodiment of the present disclosure.
Figure 41:
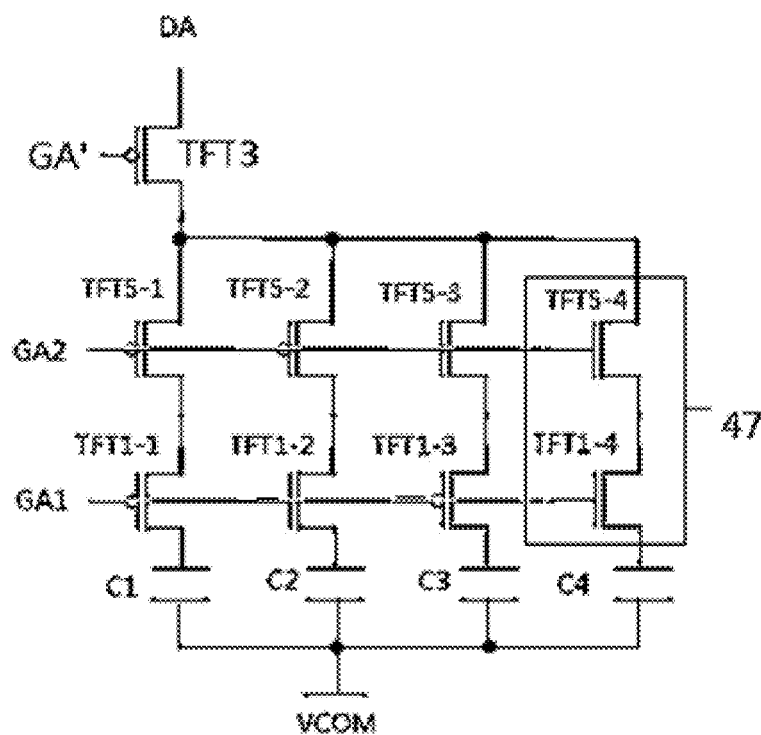
FIG. 41 is a circuit diagram of a first driving unit corresponding to a pixel according to an embodiment of the present disclosure.

Alternatively, in some embodiments, as shown in FIGS. 40, 41, each driving unit 47 further includes a fifth driving transistor TFT5 electrically connected to the first driving transistor TFT1; the source electrode of the first driving transistor TFT1 of each driving unit 47 is electrically connected to a drain electrode of the fifth driving transistor TFT5, and a source electrode of the fifth driving transistor TFT5 is electrically connected to the data signal line DA; gate electrodes of the first driving transistor TFT1 and the fifth driving transistor TFT5 are electrically connected to different first scanning signal lines GA;

In the driving units 47 corresponding to each pixel, the gate electrodes of the first driving transistors TFT1 are electrically connected to a same first scanning signal line GA, and the gate electrodes of the fifth driving transistors TFT5 are electrically connected to a same first scanning signal line GA.

In some embodiments, as shown in FIG. 40, in the plurality of driving units 47, the first driving transistor TFT1 and the fifth driving transistor TFT5 in one of the driving units are of the same type, and the first driving transistor TFT1 and the fifth driving transistor TFT5 in each of the remaining driving units are of different types. In FIG. 40, the first driving transistor TFT1-1 and the fifth driving transistor TFT5-1 are of the same type and are both P-type transistors; the first driving transistor TFT1-2 is an N-type transistor, and the fifth driving transistor TFT5-2 is a P-type transistor; the first driving transistor TFT1-3 is a P-type transistor and the fifth driving transistor TFT5-3 is an N-type transistor.

In some embodiments, as shown in FIG. 40, the same first scanning signal line is shared by two adjacent pixel rows. Specifically, the first scanning signal line GA2 in the m-th pixel row serves as the first scanning signal line GA1 in the (m+1)th pixel row.

According to the display panel provided by the embodiment of the present disclosure, the same first scanning signal line is shared by two adjacent pixel rows, so that when the fifth driving transistors TFT5 are added, the driving of the first driving transistors TFT1 and the fifth driving transistors TFT5 corresponding to each pixel can be realized without increasing the number of scanning signal lines, which does not increase the difficulty of designing and manufacturing the display panel, thereby saving the wiring space, and saving the cost.

In some embodiments, as shown in FIG. 41, the display panel further includes a plurality of third driving transistor TFT3, and a plurality of second scanning signal lines GA'; a gate electrode of each third driving transistor TFT3 is electrically connected to the corresponding second scanning signal line GA', a source electrode of the third driving transistor TFT3 is electrically connected to the data signal line DA, and the source electrodes of the fifth driving transistors TFT5 corresponding to each pixel are electrically connected to a drain electrode of the corresponding third driving transistor TFT3.

In a specific implementation, third driving transistors TFT3 corresponding to the same pixel row are electrically connected to the same second scanning signal line GA'. In some embodiments, as shown in FIG. 41, for the plurality of driving units 47, the first driving transistor TFT1 and the fifth driving transistor TFT5 in each of any two driving units are of the same type, and the first driving transistor TFT1 and the fifth driving transistor TFT5 in each of the remaining driving units are of different types. In FIG. 40, the first driving transistor TFT1-1 and the fifth driving transistor TFT5-1 are of the same type and are both P-type transistors; the first driving transistor TFT1-4 and the fifth driving transistor TFT5-4 are of the same type and are both N-type transistors; the first driving transistor TFT1-2 is an N-type transistor, and the fifth driving transistor TFT5-2 is a P-type transistor; the first driving transistor TFT1-3 is a P-type transistor and the fifth driving transistor TFT5-3 is an N-type transistor.

In a specific implementation, as shown in FIG. 41, signals input through the first scanning signal lines GA1 to GA2 are full-screen scanning signals, that is, the scanning signal transmitted through the first scanning signal line GA1 is input to the first driving transistors TFT1-1 to TFT1-4 in each pixel electrically connected to the first scanning signal line GA1 simultaneously; the scanning signal transmitted through the first scanning signal line GA2 is input to the fifth driving transistors TFT5-1 to TFT5-4 in each pixel electrically connected to the first scanning signal line GA2 simultaneously.

In addition, in a specific implementation, as shown in FIG. 41, the same third driving transistor TFT3 is shared by the pixels in each pixel row, and is configured to provide a driving signal to the pixels, and the plurality of first driving transistors TFT1 and the plurality of fifth driving transistors TFT5 are controlled to be turned on in cooperation with the plurality of first scanning signal lines GA1 and GA2, so that the driving signal is written into each of the plurality of pixel sub-electrodes.

Figure 42:
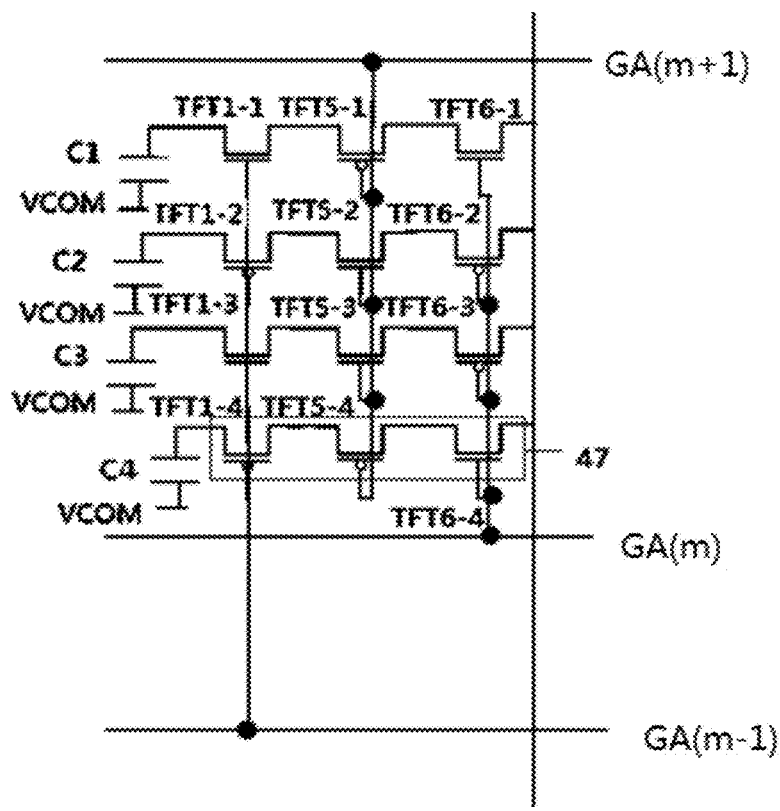
FIG. 42 is a circuit diagram of a first driving unit corresponding to a pixel according to an embodiment of the present disclosure.

In some embodiments, as shown in FIG. 42, each driving unit 47 further includes a sixth driving transistor TFT6 electrically connected to the fifth driving transistor TFT5; the source electrode of the fifth driving transistor TFT5 in each driving unit 47 is electrically connected to a drain electrode of the sixth driving transistor TFT6, and a source electrode of the sixth driving transistor TFT6 is electrically connected to the corresponding data signal line DA; the gate electrode of the first driving transistor TFT1, the gate electrode of the fifth driving transistor TFT5, and a gate electrode of the sixth driving transistor TFT6 are electrically connected to different first scanning signal lines GA;

In the driving units 47 corresponding to each pixel, the gate electrodes of the first driving transistors TFT1 are electrically connected to a same first scanning signal line GA, the gate electrodes of the fifth driving transistors TFT5 are electrically connected to a same first scanning signal line GA, and gate electrodes of the sixth driving transistors TFT6 are electrically connected to a same first scanning signal line GA.

In a specific implementation, as shown in FIG. 42, in the m-th pixel row, the gate electrodes of the first driving transistors TFT1 corresponding to each pixel are electrically connected to the first scanning signal line GA (m−1) in the (m−1)th row, the gate electrodes of the sixth driving transistors TFT6 corresponding to each pixel are electrically connected to the first scanning signal line GA(m) in the m-th row, and the gate electrodes of the fifth driving transistors TFT5 corresponding to each pixel are electrically connected to the first scanning signal line GA(m+1) in the (m+1)th row. That is, pixels in the m-th pixel row shares the first scanning signal lines GA with pixels in the (m−1)th and (m+1)th rows. Therefore, the number of the first scanning signal lines can be reduced, the difficulty of designing and manufacturing the display panel is reduced, the wiring space is saved, and the cost is saved.

In a specific implementation, the second to fifth driving transistors provided in the embodiments of the present disclosure are all thin film transistors, for example.

Based on the same inventive concept, an embodiment of the present disclosure further provides a method for driving a display panel, as shown in FIG. 43, including:

S101, determining a pixel in which charged particles are to move along the direction parallel to the plane where the first base substrate is located according to a picture to be displayed;

S102, in a data writing stage, providing a first driving signal to the common electrode in the pixel in which the charged particles are to move along the direction parallel to the plane where the first base substrate is located, providing the incompletely same second driving signals to the plurality of pixel sub-electrodes included in the pixel electrode in the pixel, to drive at least part of the charged particles to move along the direction parallel to the plane where the first base substrate is located.

According to the method for driving a display panel provided by the embodiment of the present disclosure, the pixel electrode includes the plurality of pixel sub-electrodes independent from each other. The plurality of pixel sub-electrodes are arranged independently from each other, so that the plurality of pixel sub-electrodes may be provided with the incompletely same second driving signals. In this way, the electric field may be formed between the strip-shaped electrodes arranged at intervals and included by the plurality of pixel sub-electrodes with an angle greater than 0 with respect to the direction perpendicular to the first base substrate, the electric field formed between the plurality of strip-shaped electrodes may be used to drive the charged particles to move along a direction parallel to a plane where the first base substrate is located, and the electric field generated by the plurality of strip-shaped may be used for changing an aggregation state of the charged particles along the direction parallel to the plane where the first base substrate is located, so as to adjust the gray scale. Compared with a case that only an electric field, which is generated by the common electrode and the pixel electrode and is perpendicular to a direction where the first base substrate is located, drives the charged particles to move, in the embodiment of the present disclosure, the charged particles move along the direction parallel to the plane where the first base substrate is located, which can shorten a migration distance of the charged particles, and therefore the refreshing time.

In some embodiments, the display panel includes a plurality of blocking electrode groups, and in the data writing stage, the method further includes:

Providing incompletely same third driving signals to different strip-shaped blocking electrode portions in each blocking electrode group to form an electric field for blocking the charged particles in the pixel from moving to the adjacent pixels.

In some embodiments, when the pixel sub-electrodes are strip-shaped electrodes, voltages of the second driving signals applied to the plurality of strip-shaped electrodes are decreased sequentially in the arrangement direction of the plurality of strip-shaped electrodes. For example, in the arrangement direction of the plurality of strip-shaped electrodes, the voltages of the second driving signals applied to the plurality of strip-shaped electrodes are in an arithmetic progression.

In some embodiments, a voltage of the third driving signal applied to one of the strip-shaped blocking electrode portions adjacent to the strip-shaped electrodes and the voltage of the second driving signals applied to the plurality of strip-shaped electrodes are in an arithmetic progression.

In some embodiments, a voltage value of the first driving signal is 0.

Next, with reference to FIG. 19, the voltages of the second driving signals, the voltages of the third driving signals, and the electric fields generated by the pixel electrode, the common electrode, and the blocking electrode groups will be described, and the voltage value of the first driving signal is 0. The pixel electrode 3 includes three strip-shaped electrodes 4, and the blocking electrode group 28 includes a first strip-shaped blocking electrode portion 30 and a second strip-shaped blocking electrode portion 31; the voltages of the second driving signals applied to the three strip-shaped electrodes 4 are V1, V2, and V3, respectively, the voltages of the third driving signals applied to the first strip-shaped blocking electrode portion 30 and the second strip-shaped blocking electrode portion 31 are V1', V2', respectively; V1, V2, and V3 are −3 volts (V), −6V, −9V, respectively; and V1', and V2' are 0V, −12V, respectively; and simulation results of the electric fields generated by the pixel electrode, the common electrode, and the blocking electrode group are shown in FIG. 44. Alternatively, V1, V2 and V3 are 0V, −4V and −8V, respectively; and V1' and V2' are 0V and −12V, respectively.

It should be noted that the charged particles in FIG. 19 include only the black charged particles; in the case where the charged particles include the black charged particles and the white charged particles, as shown in FIG. 29, each blocking electrode group 28 includes the first strip-shaped blocking electrode portion 31, the second strip-shaped blocking electrode portion 30, and the third strip-shaped blocking electrode portion 46, and a voltage of the third driving signal applied to the third strip-shaped blocking electrode portion 46 is V3'; for example, V1', V2', and V3' are −12V, 0V, and −12V, respectively. When two blocking electrode groups corresponding to any two adjacent pixels share the first strip-shaped blocking electrode portion, simulation results of the electric fields generated by the pixel electrode, the common electrode, and the blocking electrode groups are shown in FIG. 45.

In some embodiments, the strip-shaped blocking electrode portions further serve as touch electrodes, and the method further includes the following steps:

In a touch stage, providing touch signals to the blocking electrode groups.

Figure 47:
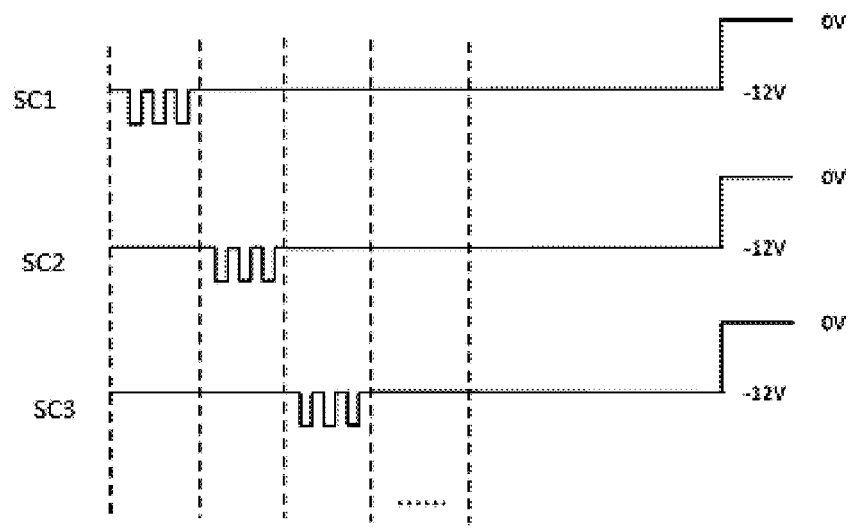
FIG. 47 is a timing diagram of a touch stage of a method for driving a display panel according to an embodiment of the present disclosure.

In a specific implementation, a display stage includes the data writing stage, as shown in FIG. 46, each touch stage is located between adjacent display stages, that is, each touch stage is located in a black frame insertion stage between adjacent display stages. Next, a description will be given by taking the display panel as shown in FIG. 23 as an example. The touch driving signals are input to the first touch signal lines through the first touch signal terminals SC, and feedback voltages of the touch driving signals transmitted by the second touch signal lines are read through the second touch signal terminals RE, thereby determining a touch position. In the touch stage, V1' and V2' are 0V and −12V, respectively, and a timing of the touch stage corresponding to FIG. 23 is shown in FIG. 47.

Next, the operation of the circuits shown in FIGS. 36 to 41 will be described as an example.

In a specific implementation, for the circuit shown in FIG. 36, the providing the incompletely same second driving signals to the plurality of pixel sub-electrodes included in the pixel electrode in the pixel, specifically includes:

Loading the first scanning signal through the first scanning signal line to control the first driving transistors TFT1-1 to TFT1-4 to be turned on, and loading data signals corresponding to the second driving signals for the four pixel sub-electrodes through the data signal lines DA1 to DA4.

For the circuit shown in FIG. 37, the providing the incompletely same second driving signals to the plurality of pixel sub-electrodes included in the pixel electrode in the pixel, specifically includes:

Controlling the first driving transistors TFT1-1 to TFT1-4 by the first scanning signal lines GA1 to GA4 to be sequentially turned on, and sequentially loading data signals corresponding to the second driving signals for the four pixel sub-electrodes through the data signal line DA.

For the circuit shown in FIG. 38, the providing the incompletely same second driving signals to the plurality of pixel sub-electrodes included in the pixel electrode in the pixel, specifically includes:

Controlling the first driving transistors TFT1-1 to TFT1-4 by the first scanning signal lines GA1 to GA4 to be sequentially turned on, and controlling the third driving transistor TFT3 by the second scanning line GA' to be turned on, and sequentially loading data signals corresponding to the second driving signals for the four pixel sub-electrodes through the data signal line DA.

Figure 48:
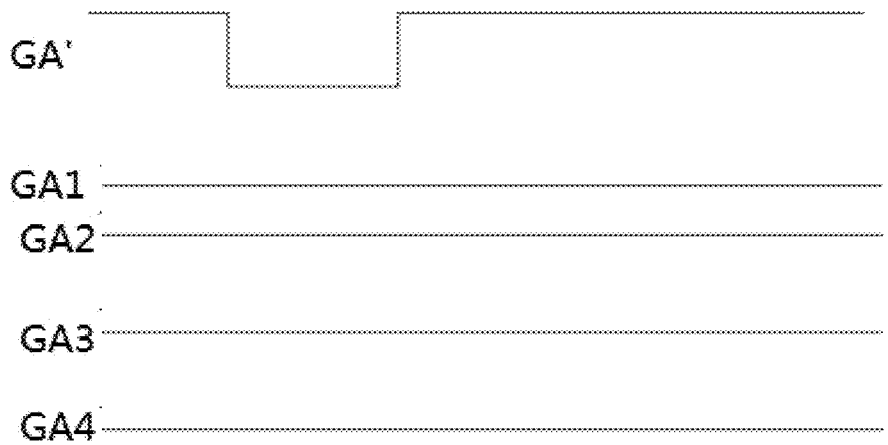
FIGS. 48 to 51 are timing diagrams illustrating a method for driving a display panel according to an embodiment of the present disclosure.
Figure 49:
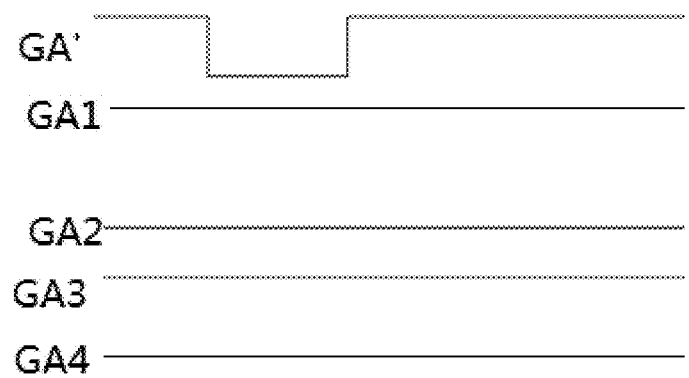
Figure 50:
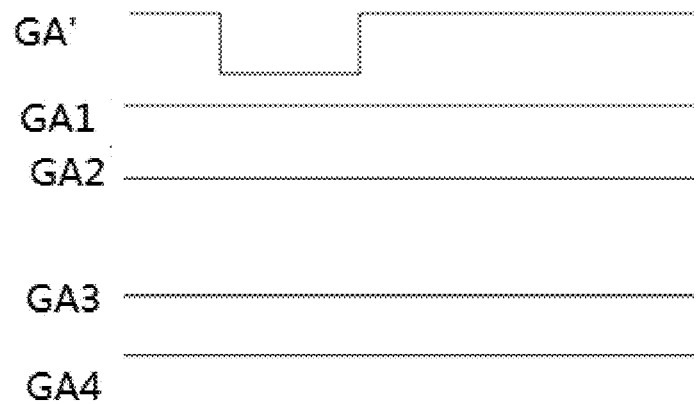
Figure 51:
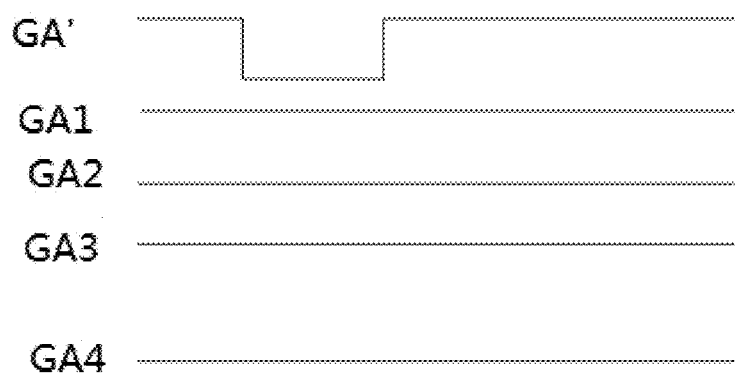

In a specific implementation, in the circuit shown in FIG. 38, the second driving signal with a voltage of V1 is provided to the strip-shaped electrode through the transistor TFT1-1, the second driving signal with a voltage of V2 is provided to the strip-shaped electrode through the transistor TFT1-2, the second driving signal with a voltage of V3 is provided to the strip-shaped electrode through the transistor TFT1-3, and the second driving signal with a voltage of V4 is provided to the strip-shaped electrode through the transistor TFT1-4. The operation of the circuit is as follows: a timing when the second driving signal with the voltage of V1 is provided to the strip-shaped electrodes through the transistors TFT1-1 in all the pixels is shown in FIG. 48, wherein the second scanning lines GA' corresponding to the plurality of pixel rows are turned on row by row, the first scanning signal input through the first scanning signal line GA1 corresponding to each pixel is a low level signal, the first scanning signals input through the first scanning signal lines GA2 to GA4 corresponding to each pixel are high level signals, the transistor TFT1-1 is turned on, and the transistors TFT1-2 to TFT1-4 are turned off. A timing when the second driving signal with the voltage of V2 is provided to the strip-shaped electrodes through the transistors TFT1-2 in all the pixels is shown in FIG. 49, wherein the second scanning lines GA' corresponding to the plurality of pixel rows are turned on row by row, the first scanning signal input through the first scanning signal line GA2 corresponding to each pixel is a low level signal, the first scanning signals input through the first scanning signal lines GA1 and GA3 to GA4 corresponding to each pixel are high level signals, the transistor TFT1-2 is turned on, and the transistors TFT1-1, TFT1-3 to TFT1-4 are turned off. A timing when the second driving signal with the voltage of V3 is provided to the strip-shaped electrodes through the transistors TFT1-3 in all the pixels is shown in FIG. 50, wherein the second scanning lines GA' corresponding to the plurality of pixel rows are turned on row by row, the first scanning signal input through the first scanning signal line GA3 corresponding to each pixel is a low level signal, the first scanning signals input through the first scanning signal lines GA1, GA2 and GA4 corresponding to each pixel are high level signals, the transistor TFT1-3 is turned on, and the transistors TFT1-1, TFT1-2, TFT1-4 are turned off. A timing when the second driving signal with the voltage of V4 is provided to the strip-shaped electrodes through the transistors TFT1-4 in all the pixels is shown in FIG. 51, wherein the second scanning lines GA' corresponding to the plurality of pixel rows are turned on row by row, the first scanning signal input through the first scanning signal line GA4 corresponding to each pixel is a low level signal, the first scanning signals input through the first scanning signal lines GA1 to GA3 corresponding to each pixel are high level signals, the transistor TFT1-4 is turned on, and the transistors TFT1-1 to TFT1-3 are turned off.

Figure 52:
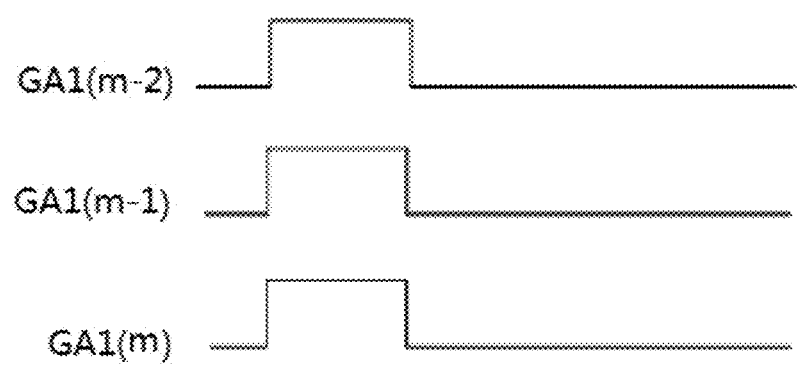
FIGS. 52 to 54 are timing diagrams illustrating a method for driving a display panel according to an embodiment of the present disclosure.
Figure 53:
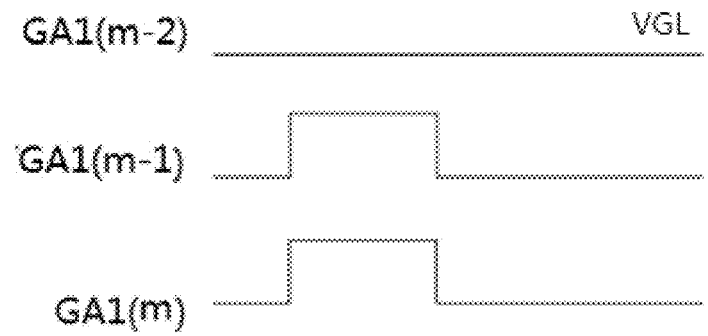
Figure 54:
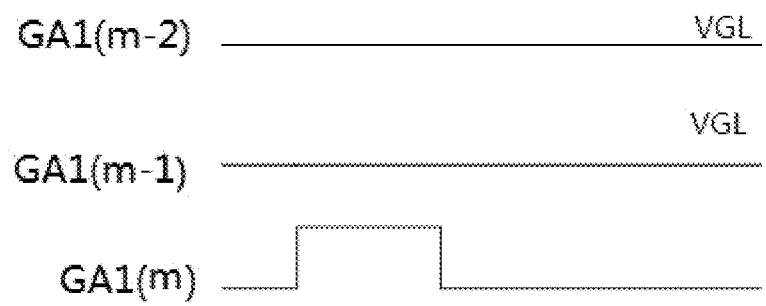

In a specific implementation, for the circuit shown in FIG. 39, the second driving signal with the voltage of V1 is provided to the strip-shaped electrode through the transistor TFT1-1, the second driving signal with the voltage of V2 is provided to the strip-shaped electrode through the transistor TFT1-2, and the second driving signal with the voltage of V3 is provided to the strip-shaped electrode through the transistor TFT1-3; the providing the incompletely same second driving signals to the plurality of pixel sub-electrodes included in the pixel electrode in the pixel, specifically includes:

During writing the second driving signal with the voltage of V1, controlling the first driving transistors TFT1-1 to TFT1-3 and the fourth driving transistors TFT4-1 to TFT4-2 by the first scanning signal lines GA1 to GA3 to be turned on, to write the data voltage loaded by the data signal line DA to each strip-shaped electrode in the pixel electrode, that is, to the capacitors C1 to C3; the timing is shown in FIG. 52, the first scanning signals input through the first scanning signal lines GA1(m) to GA1(m-2) are all high level signals VGH;

During writing the second driving signal with the voltage of V2, controlling the first driving transistor TFT1-1 to be turned off, the first driving transistors TFT1-2 to TFT1-3 and the fourth driving transistors TFT4-1 to TFT4-2 by the first scanning signal lines GA1 to GA3 to be turned on, to write the data voltage loaded by the data signal line DA to the capacitors C2 to C3; the timing is shown in FIG. 53, the first scanning signal input through the first scanning signal line GA1(m-2) is a low level signal, and the first scanning signals input through the first scanning signal lines GA1(m-1) to GA1(m) are all high level signals VGH;

During writing the second driving signal with the voltage of V3, controlling the first driving transistors TFT1-1 and TFT1-2 to be turned off, the first driving transistor TFT1-3 and the fourth driving transistors TFT4-1 to TFT4-2 by the first scanning signal lines GA1 to GA3 to be turned on, to write the data voltage loaded by the data signal line DA to the capacitor C3; the timing is shown in FIG. 54, the first scanning signals input through the first scanning signal lines GA1 (m-2) to GA1(m-1) are low level signals VGL, and the first scanning signal input through the first scanning signal line GA1(m) is a high level signal VGH.

Figure 55:
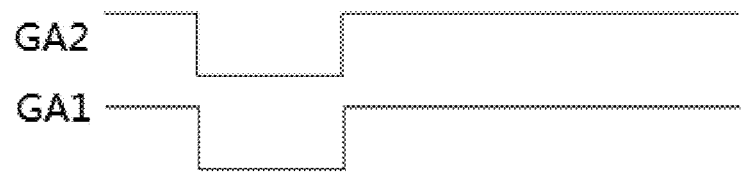
FIGS. 55 to 58 are timing diagrams illustrating a method for driving a display panel according to an embodiment of the present disclosure.
Figure 56:
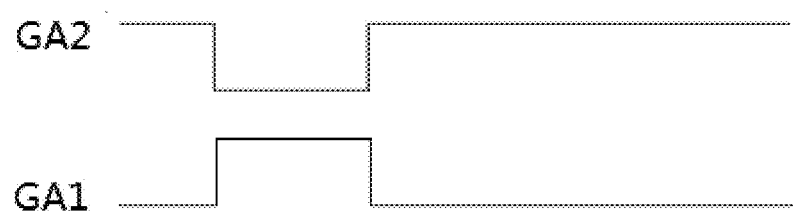
Figure 57:
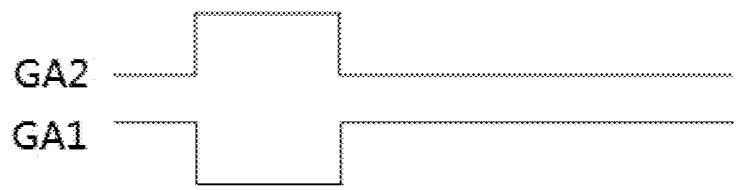

In a specific implementation, for the circuit shown in FIG. 40, the second driving signal with the voltage of V1 is provided to the strip-shaped electrodes through the transistor TFT5-1 and the transistor TFT1-1, the second driving signal with the voltage of V2 is provided to the strip-shaped electrodes through the transistor TFT5-2 and the transistor TFT1-2, and the second driving signal with the voltage of V3 is provided to the strip-shaped electrodes through the transistor TFT5-3 and the transistor TFT1-3. The providing the incompletely same second driving signals to the plurality of pixel sub-electrodes included in the pixel electrode in the pixel, specifically includes:

During writing the second driving signal with the voltage of V1, the timing is shown in FIG. 55, the first scanning signal input through the first scanning signal line GAL is a low level signal; the first scanning signal input through the first scanning signal line GA2 is a high level signal;

During writing the second driving signal with the voltage of V2, the timing is shown in FIG. 56, the first scanning signal input through the first scanning signal line GAL is a high level signal; the first scanning signal input through the first scanning signal line GA2 is a low level signal;

During writing the second driving signal with the voltage of V3, the timing is shown in FIG. 57, the first scanning signal input through the first scanning signal line GAL is a low level signal; the first scanning signal input through the first scanning signal line GA2 is a high level signal.

Figure 58:
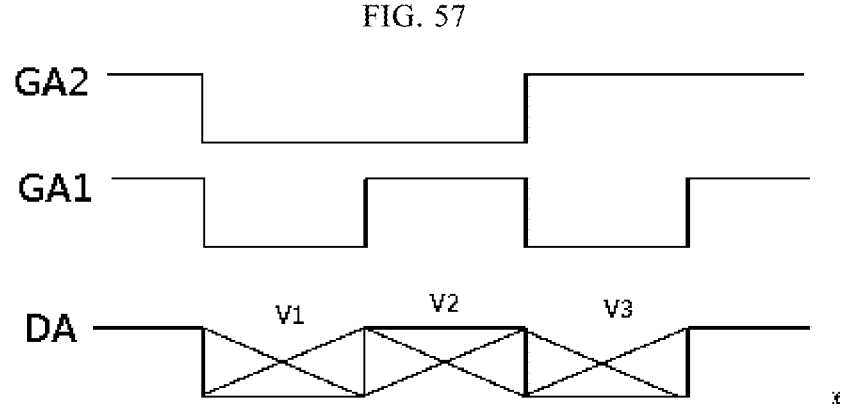

The scanning timing of the data writing stage for the pixels in the row is shown in FIG. 58.

Figure 59:
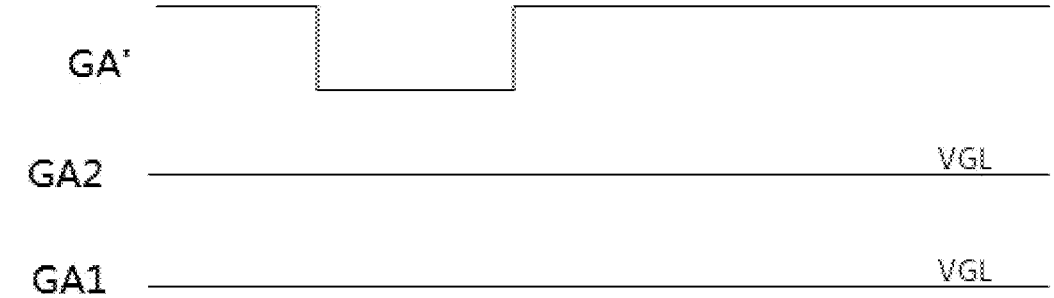
FIGS. 59 to 63 are timing diagrams illustrating a method for driving a display panel according to an embodiment of the present disclosure.
Figure 60:
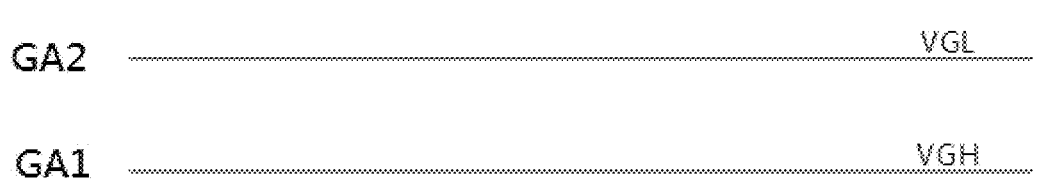
Figure 61:
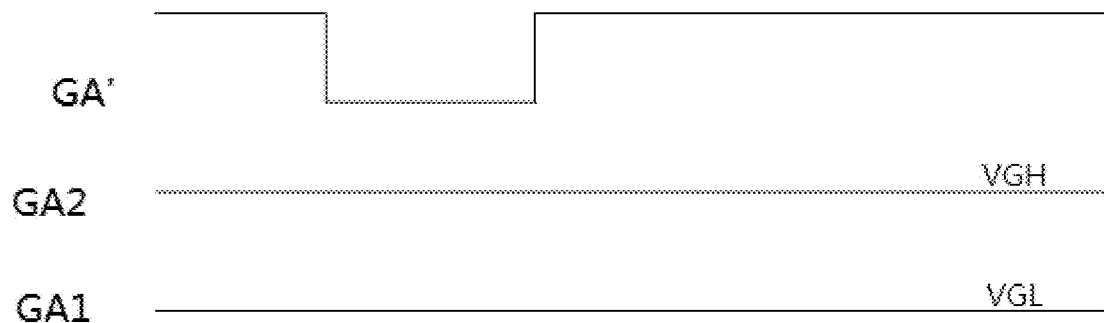
Figure 62:
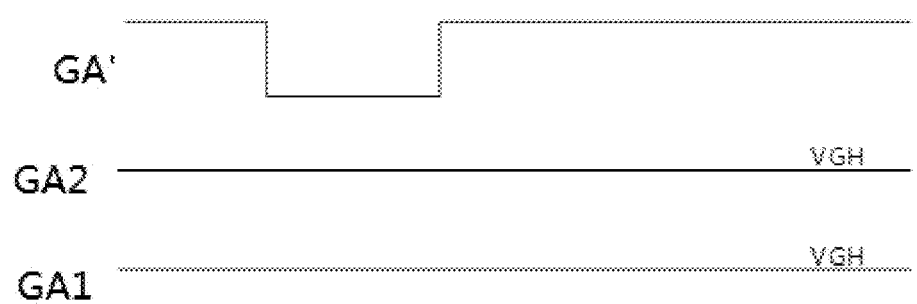

In a specific implementation, for the circuit shown in FIG. 41, the second driving signal with the voltage of V1 is provided to the strip-shaped electrodes through the transistors TFT5-1 and TFT1-1, the second driving signal with the voltage of V2 is provided to the strip-shaped electrodes through the transistors TFT5-2 and TFT1-2, the second driving signal with the voltage of V3 is provided to the strip-shaped electrodes through the transistors TFT5-3 and TFT1-3, and the second driving signal with the voltage of V4 is provided to the strip-shaped electrodes through the transistors TFT5-4 and TFT1-4. The providing the incompletely same second driving signals to the plurality of pixel sub-electrodes included in the pixel electrode in the pixel, specifically includes:

During writing the second driving signal with the voltage of V1, the timing is shown in FIG. 59, the second scanning lines GA' corresponding to the plurality of pixel rows are turned on row by row, the first scanning signal input through the first scanning signal line GA1 corresponding to each pixel is a low level signal VGL, and the first scanning signal input through the first scanning signal line GA2 corresponding to each pixel is a low level signal VGL;

During writing the second driving signal with the voltage of V2, the timing is shown in FIG. 60, the second scanning lines GA' corresponding to the plurality of pixel rows are turned on row by row, the first scanning signal input through the first scanning signal line GA1 corresponding to each pixel is a high level signal VGH, and the first scanning signal input through the first scanning signal line GA2 corresponding to each pixel is a low level signal VGL;

During writing the second driving signal with the voltage of V3, the timing is shown in FIG. 61, the second scanning lines GA' corresponding to the plurality of pixel rows are turned on row by row, the first scanning signal input through the first scanning signal line GA1 corresponding to each pixel is a low level signal VGL, and the first scanning signal input through the first scanning signal line GA2 corresponding to each pixel is a high level signal VGH;

During writing the second driving signal with the voltage of V4, the timing is shown in FIG. 62, the second scanning lines GA' corresponding to the plurality of pixel rows are turned on row by row, the first scanning signal input through the first scanning signal line GA1 corresponding to each pixel is a high level signal VGH, and the first scanning signal input through the first scanning signal line GA2 corresponding to each pixel is a high level signal VGH.

Figure 63:
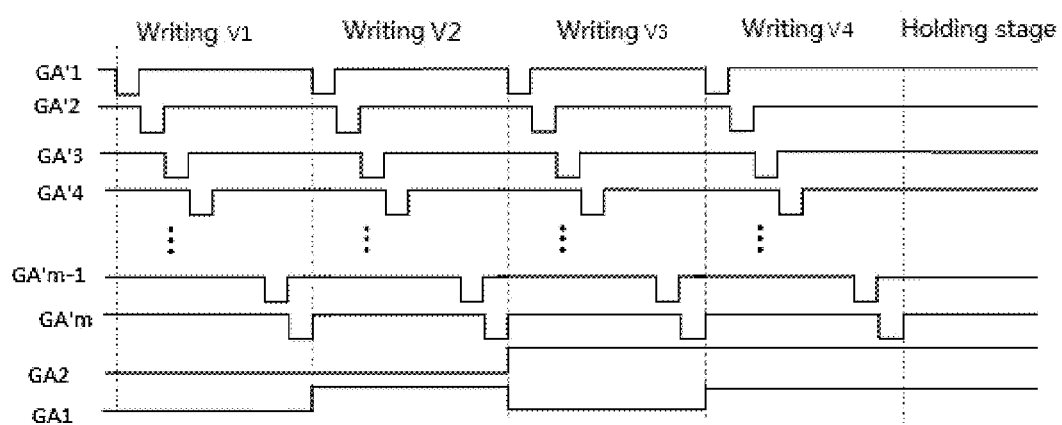

A timing of the display panel for refreshing each frame is shown in FIG. 63. A refreshing frequency of the display panel is, for example, 12 hertz (Hz).

In a specific implementation, for the circuit shown in FIG. 42, the second driving signal with the voltage of V1 is provided to the strip-shaped electrodes through the transistor TFT6-1, the transistor TFT5-1 and the transistor TFT1-1, the second driving signal with the voltage of V2 is provided to the strip-shaped electrodes through the transistor TFT6-2, the transistor TFT5-2 and the transistor TFT1-2, the second driving signal with the voltage of V3 is provided to the strip-shaped electrodes through the transistor TFT6-3, the transistor TFT5-3 and the transistor TFT1-3, and the second driving signal with the voltage of V4 is provided to the strip-shaped electrodes through the transistor TFT6-4, the transistor TFT5-4 and the transistor TFT1-4. The providing the incompletely same second driving signals to the plurality of pixel sub-electrodes included in the pixel electrode in the pixel, specifically includes:

During writing the second driving signal with the voltage of V1, the first scanning signals input through the first scanning signal lines GA(m−1) and GA(m) are high level signals, and the first scanning signal input through the first scanning signal line GA(m+1) is a low level signal;

During writing the second driving signal with the voltage of V2, the first scanning signals input through the first scanning signal lines GA(m−1) and GA(m) are low level signals, and the first scanning signal input through the first scanning signal line GA(m+1) is a high level signal;

During writing the second driving signal with the voltage of V3, the first scanning signals input through the first scanning signal lines GA(m−1) and GA(m+1) are high level signals, and the first scanning signal input through the first scanning signal line GA(m) is a low level signal;

During writing the second driving signal with the voltage of V4, the first scanning signals input through the first scanning signal lines GA(m−1) and GA(m+1) are low level signals, and the first scanning signal input through the first scanning signal line GA(m) is a high level signal;

In some embodiments, before the data writing stage, the method further includes: In a charged particle activation stage, loading a fourth driving signal to the common electrode and a fifth driving signal to the pixel electrode, to drive the charged particles to move along the direction perpendicular to the first base substrate.

The method for driving a display panel provided by the embodiment of the present disclosure further includes the charged particle activation stage before the data writing stage, so that the motion activity of the charged particles can be activated, and it can avoid the situation that the corresponding gray scale cannot be realized because the charged particles cannot move due to the low motion activity of the charged particles.

In a specific implementation, a voltage of the fourth driving signal applied to the common electrode is 0V.

In some embodiments, the charged particle activation stage includes a plurality of gray scale input stages, and the loading the fifth driving signal to the pixel electrode in the charged particle activation stage, specifically includes:

In the plurality of gray scale input stages, alternately loading a first level signal and a second level signal to the pixel electrode; an electrical property of the first level signal and an electrical property of the second level signal are opposite to each other.

In a specific implementation, when the first level signal is applied to the pixel electrode, a gray scale of the pixel is a first gray scale Lr1; and when the second level signal is applied to the pixel electrode, the gray scale of the pixel is a second gray scale Lr2. In the method for driving a display panel provided by the embodiment of the present disclosure, the motion activity of the charged particles is activated by alternately refreshing the two gray scales.

In a specific implementation, the alternately loading the first level signal and the second level signal at one time is regarded as one activation operation, and the number of times of alternately loading the first level signal and the second level signal to the pixel electrode, that is, the number of the activation operations, may be selected according to actual needs.

It should be noted that the driving principle for the charged particles is as follows: the charged particles move under an electric field for a duration, i.e., a moving distance of the charged particles is the integral of the electric field over time. When the voltage of the data signal is applied to (input to) the pixel sub-electrode, the voltage is held under the action of a capacitor formed between the pixel sub-electrode and the common electrode, so that the electric field generated by the pixel sub-electrode may be held. The time during which the electric field is stored in the pixel sub-electrode is a driving duration of the electric field. Till the pixel sub-electrode is reset, the electric field disappears, and the driving under the electric field is finished.

In some embodiments, the charged particle activation stage further includes a plurality of gray scale holding stages; each gray scale holding stage is located after the corresponding gray scale input stage, the method further includes:

In each gray scale holding stage, applying a zero-voltage data signal to the pixel electrode.

The display panel includes a plurality of first driving transistors TFT1; the circuit including the first driving transistors TFT1 corresponding to each pixel is shown in FIG. 36; in some embodiments, in the plurality of gray scale input stages, the alternately loading the first level signal and the second level signal to the pixel electrode, specifically includes:

In each gray scale input stage, driving the plurality of first driving transistors in each pixel to be simultaneously turned on, providing the first data signal corresponding to the first level signal to the source electrodes of the plurality of first driving transistors in the pixel in the odd-numbered gray scale input stages, and providing the second data signal corresponding to the second level signal to the source electrodes of the plurality of first driving transistors in the pixel in the even-numbered gray scale input stages.

Figure 64:
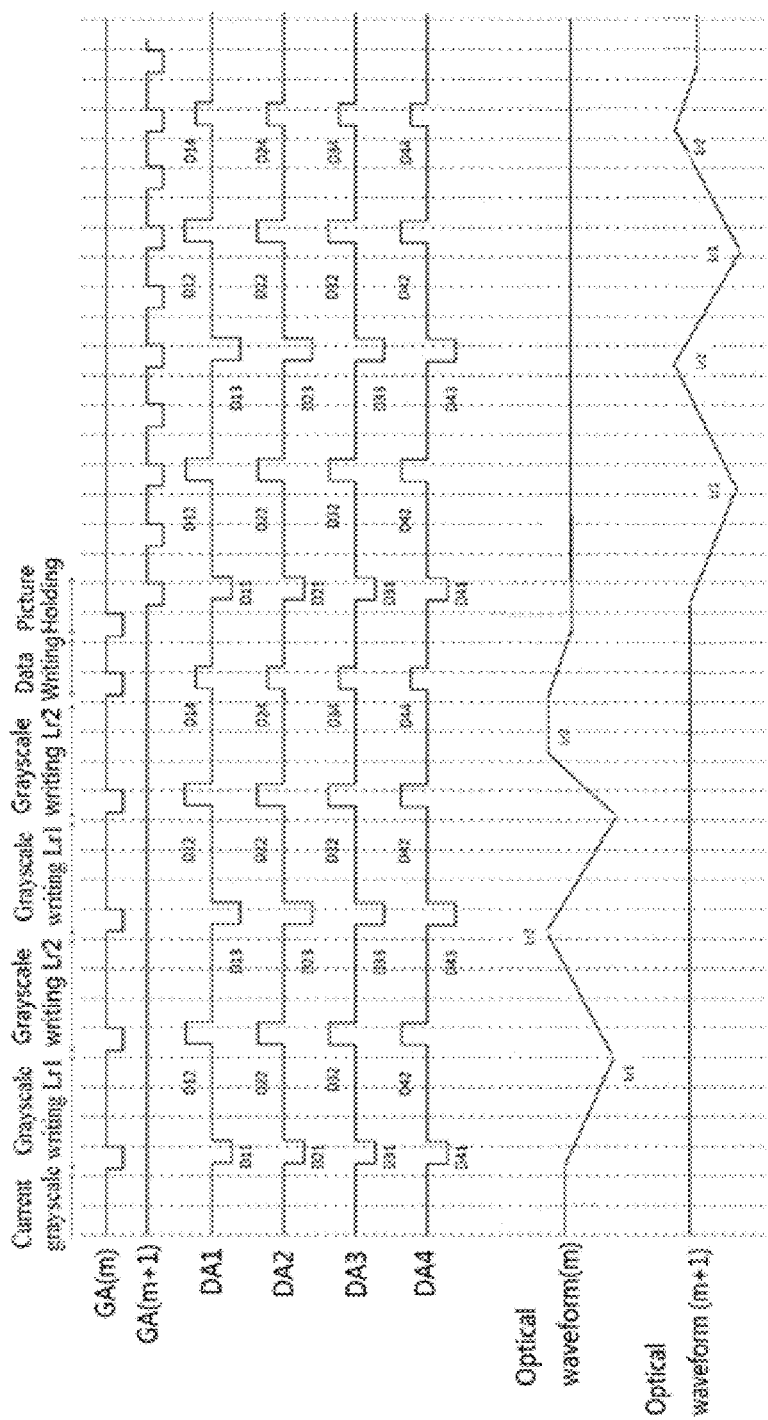
FIG. 64 is a timing diagram illustrating a method for driving a display panel according to an embodiment of the present disclosure.

FIG. 64 shows a timing of the charged particle activation stage and the data writing stage shown in FIG. 36. In FIG. 64, the charged particles are activated twice in the charged particle activation stage.

In some embodiments, in each gray scale holding stage, the method specifically includes:

Driving the plurality of first driving transistors in each pixel to be simultaneously turned on, and applying a zero-voltage data signal to the pixel electrode.

In a specific implementation, when the charged particle activation stage includes the gray scale holding stages, it is required to drive the pixel to a gray scale that the first driving transistors are simultaneously turned on twice, wherein the first driving transistors are simultaneously turned on for the first time, which is to apply the data signal voltage corresponding to the required gray scale to the pixel sub-electrode; the first driving transistors are simultaneously turned on for the second time, which is to reset the pixel sub-electrode, i.e., to apply the zero-voltage data signal to the pixel electrode, and a time difference between the first driving transistors being turned on for the first time and the second time is driving time, which may be set as a fixed value.

Figure 65:
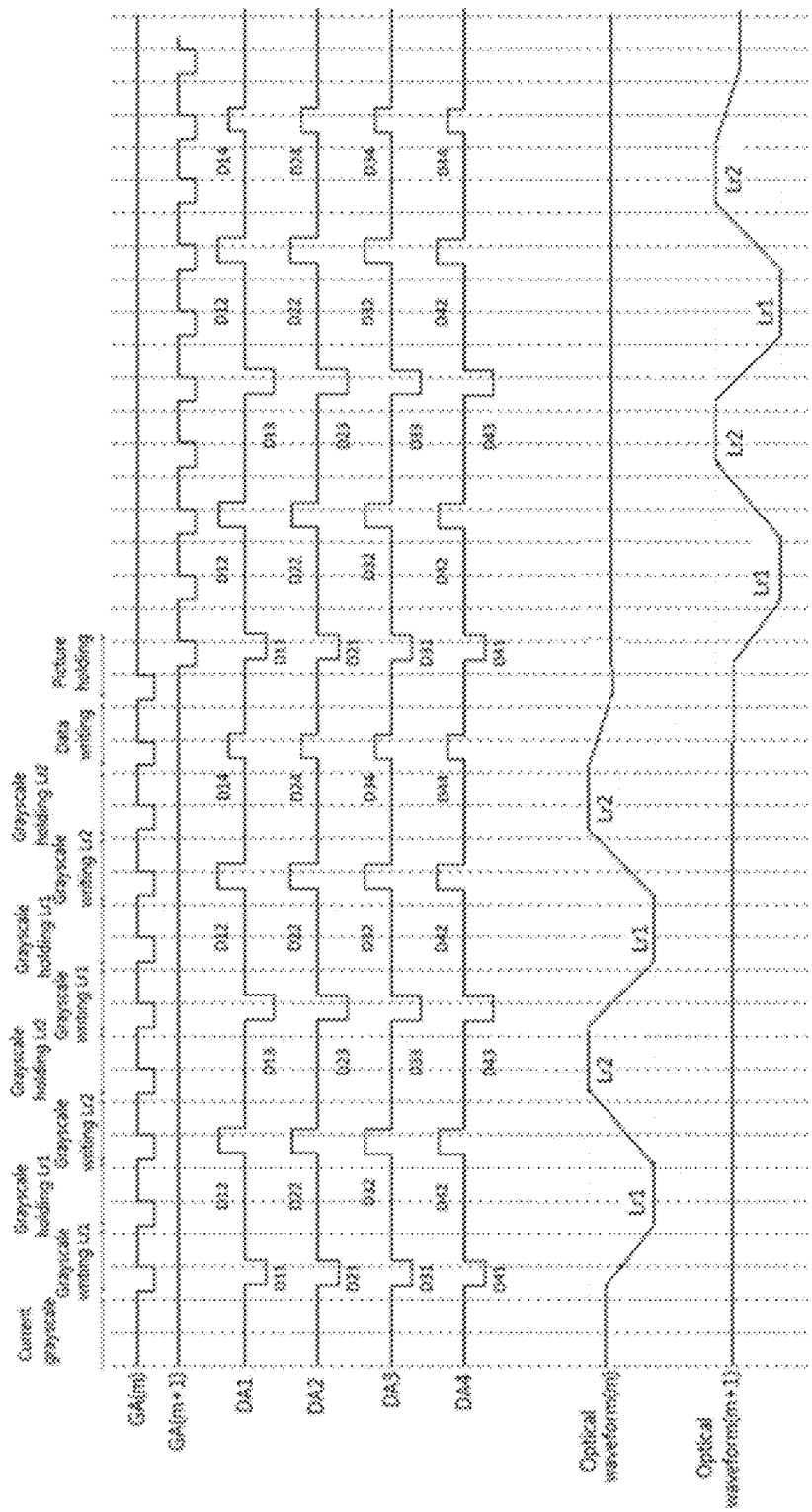
FIG. 65 is a timing diagram illustrating a method for driving a display panel according to an embodiment of the present disclosure.

FIG. 65 shows a timing of the charged particle activation stage including the gray scale holding stages and the data writing stage shown in FIG. 36. In FIG. 65, the charged particles are activated twice in the charged particle activation stage.

Alternatively, circuits of the plurality of first driving transistors TFT1 corresponding to each pixel are as shown in FIGS. 37 to 38, 40, 41, and 42; in some embodiments, in the plurality of gray scale input stages, the alternately loading the first level signal and the second level signal to the pixel electrode, specifically includes:

In each gray scale input stage, driving the plurality of first driving transistors in each pixel to be sequentially turned on, providing the first data signal corresponding to the first level signal for the source electrodes of the plurality of first driving transistors in the pixel in the odd-numbered gray scale input stages, and providing the second data signal corresponding to the second level signal for the source electrodes of the plurality of first driving transistors in the pixel in the even-numbered gray scale input stages.

In some embodiments, in each gray scale holding stage, the method specifically includes:

Driving the plurality of first driving transistors in each pixel to be sequentially turned on, and applying a zero-voltage data signal to the pixel electrode.

In a specific implementation, for the circuits shown in FIGS. 38 and 41, the method further includes: driving the third driving transistor to be turned on in the charged particle activation stage.

In a specific implementation, for the circuits shown in FIGS. 40, 41, and 42, the method further includes: in the charged particle activation stage, driving the fifth driving transistors to be turned on while driving the first driving transistors to be turned on.

In a specific implementation, for the circuit shown in FIG. 42, the method further includes: in the charged particle activation stage, driving the sixth driving transistors to be turned on while driving the first driving transistors and the fifth driving transistors to be turned on.

Alternatively, the circuit of the plurality of first driving transistors TFT1 corresponding to each pixel is shown in FIG. 39; in some embodiments, in the plurality of gray scale input stages, the alternately loading the first level signal and the second level signal to the pixel electrode, specifically includes:

In each gray scale input stage, driving the plurality of first driving transistors in each pixel to be sequentially turned on, and driving the plurality of fourth driving transistors in each pixel to be sequentially turned on; providing the first data signal corresponding to the first level signal for the source electrodes of the plurality of first driving transistors in the pixel in the odd-numbered gray scale input stages, and providing the second data signal corresponding to the second level signal for the source electrodes of the plurality of first driving transistors in the pixel in the even-numbered gray scale input stages.

In some embodiments, in each gray scale holding stage, the method specifically includes:

Driving the plurality of first driving transistors in each pixel to be sequentially turned on, driving the plurality of fourth driving transistors in each pixel to be sequentially turned on, and applying a zero-voltage data signal to the pixel electrode.

In some embodiments, the plurality of pixels includes a plurality of pixel rows, the method further includes:

Activating the charged particles in the plurality of pixel rows row by row according to a picture to be displayed, in the charged particle activation stage of each picture period;

Writing data in the plurality of pixel rows row by row according to the picture to be displayed in the data writing stage of each picture period.

That is, the display panel is scanned row by row, and the charged particle activation stage and the data writing stage for the m-th pixel row is followed by the charged particle activation stage and the data writing stage for the (m+1)th pixel row, and the timings shown in FIGS. 64 and 65 are those for the row by row scanning. In a specific implementation, a picture holding stage is further included after the data writing stage.

Figure 66:
FIG. 66 is a schematic diagram illustrating how to switch from one picture to another picture in a display panel according to an embodiment of the present disclosure.

In a specific implementation, according to the timing shown in FIGS. 64 and 65, the manner of switching a display picture is shown in FIG. 66, and FIG. 66 is a process of changing the display picture from a "I" pattern to a "-" pattern, where in the first row, an original picture is erased, the charged particles are activated, and a target picture is written, then in the second row, an original picture is erased, the charged particles are activated, and a target picture is written, and so on until the target picture is completed.

Alternatively, in some embodiments, the plurality of pixels includes a plurality of pixel rows; the method further includes:

Performing the charged particle activation stage and the data writing stage in the plurality of pixel rows row by row according to the picture to be displayed, in each picture period.

Figure 67:
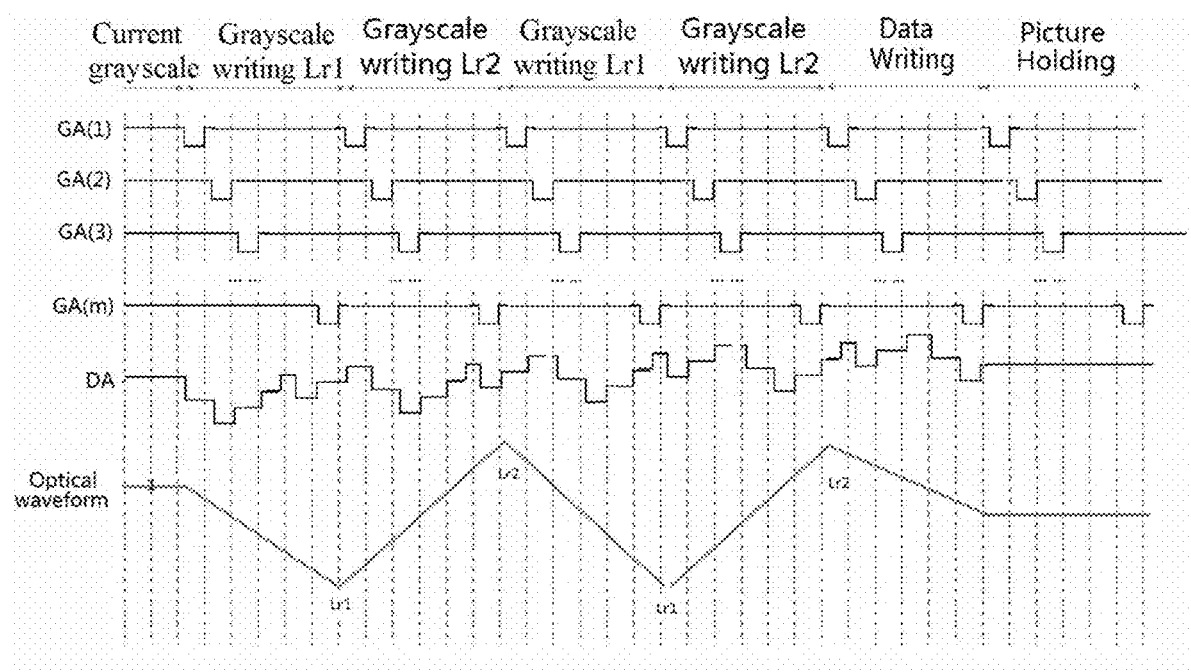
FIG. 67 is a timing diagram illustrating a method for driving a display panel according to an embodiment of the present disclosure.
Figure 68:
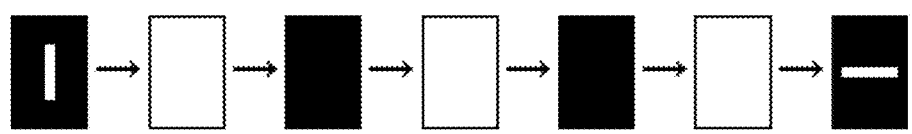
FIG. 68 is a schematic diagram illustrating how to switch from one picture to another picture in a display panel according to an embodiment of the present disclosure.

That is, the driving units of each pixel row are sequentially turned on, an Lr1 gray scale voltage is respectively written to the pixel sub-electrodes of each pixel row, the gray scale of the whole display panel is set as Lr1, then the driving units of each pixel row are sequentially turned on again, an Lr2 gray scale voltage is respectively written to the pixel sub-electrodes of each pixel row, the gray scale of the whole display panel is set as Lr2, and so on. Accordingly, the charged particle activation is achieved by alternately loading the Lr1 and Lr2 voltages. After the charged particle activation is finished, the driving units of each pixel row are sequentially turned on again to write the voltages of the data signals to each row, a target picture is written, and then, the driving units of each pixel row are sequentially turned on again to apply the zero-voltage signal, and the method enters the picture holding stage. A timing of the driving method is shown in FIG. 67. In the timing shown in FIG. 67, the manner of switching pictures is shown in FIG. 68, and firstly, an original picture is erased, gray scale pictures are cyclically written for the charged particle activation stage: Lr1-Lr2-Lr1-Lr2, and after the charged particle activation stage is completed, the target picture "-" is written.

The embodiment of the present disclosure provides a display apparatus including the display panel provided by the embodiment of the present disclosure.

In a specific implementation, the display apparatus is a reflective display apparatus, and a display panel of the reflective display apparatus may be provided with a reflective layer. Alternatively, the display apparatus is a transmissive display apparatus, the display panel may be provided with a color filter layer, the display apparatus further includes a backlight module, and the display panel is positioned on a light outgoing side of the backlight module.

The display apparatus provided by the embodiment of the present disclosure is any product or component with a display function, such as a flat panel reader, a display, a digital photo frame, a navigator or the like. Other essential components of the display apparatus are understood by one of ordinary skill in the art to exist, and are not described herein and should not be used to limit the present disclosure. The implementation of the display apparatus may refer to the embodiments of the display panel, and repeated descriptions are omitted.

To sum up, according to the display panel, the method for driving a display panel and the display apparatus provided by the embodiment of the present disclosure, the pixel electrode includes the plurality of pixel sub-electrodes independent from each other. The plurality of pixel sub-electrodes are arranged independently from each other, so that the plurality of pixel sub-electrodes may be provided with the incompletely same driving signals. In this way, the electric field may be formed between the strip-shaped electrodes arranged at intervals and included in the plurality of pixel sub-electrodes with an angle greater than 0 with respect to the direction perpendicular to the first base substrate, the electric field formed between the plurality of strip-shaped electrodes may be used to drive the charged particles to move along a direction parallel to a plane where the first base substrate is located, and the electric field generated by the plurality of strip-shaped may be used for changing an aggregation state of the charged particles along the direction parallel to the plane where the first base substrate is located, so as to adjust a gray scale. Compared with a case that an electric field, which is generated by the common electrode and the pixel electrode and is perpendicular to a direction where the first base substrate is located, drives the charged particles to move, in the embodiment of the present disclosure, the charged particles move along the direction parallel to the plane where the first base substrate is located, which can shorten a migration distance of the charged particles, and therefore the refreshing time.

While preferred embodiments of the present disclosure have been described, additional changes and modifications in those embodiments may occur to one of ordinary skill in the art once they learn of the basic inventive concepts. Therefore, it is intended that the appended claims are interpreted as including the preferred embodiment and all changes and modifications that fall within the scope of the disclosure.

It will be apparent to one of ordinary skill in the art that various modifications and variations can be made in the embodiments of the present disclosure without departing from the spirit or scope of the embodiments of the present disclosure. Thus, if such modifications and variations of the embodiments of the present disclosure fall within the scope of the claims of the present disclosure and their equivalents, the present disclosure is also intended to encompass these modifications and variations.

What is claimed is:

1. A display panel, wherein the display panel comprises: a first base substrate and a plurality of pixels on one side of the first base substrate; each pixel comprises:
   a pixel electrode comprising a plurality of pixel sub-electrodes independent from each other and configured to form an electric field with an angle greater than 0 with respect to a direction perpendicular to the first base substrate under control of driving signals;
   a common electrode on a side of the pixel electrode away from the first base substrate; and
   an electrophoretic liquid layer between the pixel electrode and the common electrode, wherein the electrophoretic liquid layer comprises a plurality of charged particles therein;
   wherein the driving signals are provided to the plurality of pixel sub-electrodes; and any one driving signal of the driving signals provided to the plurality of pixel sub-electrodes is different from at least one other driving signal of the driving signals;
   wherein the display panel further comprises a plurality of blocking electrode groups; each blocking electrode group is between two adjacent pixels, and is configured to form an electric field to block the plurality of charged particles in the pixel from moving to an adjacent pixel; the electric field formed by the blocking electrode group has a component in a direction parallel to a plane where the first base substrate is located; and
   each blocking electrode group comprises: a plurality of strip-shaped blocking electrode portions respectively on both sides of the pixel electrode in an arrangement direction of the plurality of pixel sub-electrodes; the strip-shaped blocking electrode portions on each side of the pixel electrode are independent from each other in the arrangement direction of the plurality of strip-shaped electrodes.

2. The display panel of claim 1, wherein the plurality of charged particles in each pixel only include a plurality of charged particles of a first color.

3. The display panel of claim 1, wherein the display panel further comprises:
- a reflective layer between the first base substrate and the electrophoretic liquid layer;
- the reflective layer is between the first base substrate and the pixel electrode; and
- the reflective layer is made of a metal material, and the display panel further comprises a first insulating layer between the reflective layer and the pixel electrode.

4. The display panel of claim 1, wherein the display panel further comprises: a reflective layer between the first base substrate and the electrophoretic liquid layer;
- the reflective layer is made of a metal material, and is in a same layer as the pixel electrode; and
- an orthographic projection of the reflective layer on the first base substrate and an orthographic projection of the pixel electrode on the first base substrate do not overlap with each other.

5. The display panel of claim 1, wherein each blocking electrode group comprises only the strip-shaped blocking electrode portions; and each strip-shaped blocking electrode portion further serves a touch electrode.

6. The display panel of claim 5, wherein the display panel further comprises: a plurality of first touch signal lines and a plurality of second touch signal lines;
- an extending direction of each first touch signal line is the same as that of each strip-shaped blocking electrode portion, and an extending direction of each second touch signal line is the same as the arrangement direction of the strip-shaped blocking electrode portions; and
- for any side of the pixel electrode of each pixel, an outermost strip-shaped blocking electrode portion is electrically connected to a corresponding first touch signal line, and a strip-shaped blocking electrode portion closest to the pixel electrode is electrically connected to a corresponding second touch signal line.

7. The display panel of claim 1, wherein each blocking electrode group comprises a first strip-shaped blocking electrode portion to an nth strip-shaped blocking electrode portion on each side of the pixel electrode in a direction from the strip-shaped blocking electrode portion to the pixel electrode, where n is an integer greater than or equal to 2; and
- each blocking electrode group further comprises: n connection portions; the n connection portions comprise a first connection portion to an nth connection portion; an ith connection portion is connected to two ith strip-shaped blocking electrode portions; where i is an integer, and 1≤i≤n.

8. The display panel of claim 7, wherein the two ith strip-shaped blocking electrode portions are connected to only one ith connection portion; and
- the n connection portions are on a same side of the pixel electrode in the extending direction of each strip-shaped blocking electrode portion; or
- the two ith strip-shaped blocking electrode portions are connected to only one ith connection portion; and
- the n connection portions are on different sides of the pixel electrode in the extending direction of each strip-shaped blocking electrode portion.

9. The display panel of claim 8, wherein the plurality of pixels comprises a plurality of pixel rows; in the blocking electrode groups corresponding to each pixel row, the connection portions on one side of the pixel electrode and farthest from the pixel electrode are connected as a single piece in the extending direction of the strip-shaped blocking electrode portion in the pixel row.

10. The display panel of claim 7, wherein the two ith connection portions are connected to two ends of each ith strip-shaped blocking electrode portion, respectively, in an extending direction of the ith strip-shaped blocking electrode portion; and the two ith connection portions and the two ith strip-shaped blocking electrode portions are connected together to form an annular blocking electrode.

11. The display panel of claim 1, wherein the plurality of charged particles comprises: charged particles of a first color and charged particles of a second color; and the strip-shaped blocking electrode portions on each side of the pixel electrode in the direction from the strip-shaped blocking electrode portion to the pixel electrode comprise: a first strip-shaped blocking electrode portion, a second strip-shaped blocking electrode portion between the first strip-shaped blocking electrode portion and the pixel electrode, and a third strip-shaped blocking electrode portion between the second strip-shaped blocking electrode portion and the pixel electrode, or
- wherein the plurality of charged particles are charged particles of a first color; and the strip-shaped blocking electrode portions on each side of the pixel electrode in the direction from the strip-shaped blocking electrode portion to the pixel electrode comprise: a first strip-shaped blocking electrode portion, and a second strip-shaped blocking electrode portion between the first strip-shaped blocking electrode portion and the pixel electrode.

12. The display panel of claim 11, wherein the first strip-shaped blocking electrode portions of the plurality of blocking electrode groups are connected as a single piece, and a pattern of an orthographic projection of the first blocking strip-shaped electrode portions connected as a single piece of the plurality of blocking electrode groups on the first base substrate is a grid pattern.

13. The display panel of claim 1, wherein the display panel further comprises: a plurality of blocking structures on a side of the common electrode close to the first base substrate; an orthographic projection of each blocking structure on the first base substrate overlaps with an orthographic projection of a corresponding blocking electrode group on the first base substrate; and a distance between each blocking structure and the corresponding blocking electrode group is greater than 0 in the direction perpendicular to the first base substrate.

14. A display apparatus, comprising the display panel of claim 1.

15. The display panel of claim 1, wherein the plurality of charged particles in each pixel comprises: a plurality of charged particles of a first color and a plurality of charged particles of a second color each having an electrical property opposite to that of each of the plurality of charged particles of the first color; and
- the number of the plurality of charged particles of the first color is greater than that of the plurality of charged particles of the second color.

16. A display panel, wherein the display panel comprises: a first base substrate and a plurality of pixels on one side of the first base substrate; each pixel comprises:
- a pixel electrode comprising a plurality of pixel sub-electrodes independent from each other and configured to form an electric field with an angle greater than 0 with respect to a direction perpendicular to the first base substrate under control of driving signals;

a common electrode on a side of the pixel electrode away from the first base substrate; and an electrophoretic liquid layer between the pixel electrode and the common electrode, wherein the electrophoretic liquid layer comprises a plurality of charged particles therein;

wherein the driving signals are provided to the plurality of pixel sub-electrodes; and any one driving signal of the driving signals provided to the plurality of pixel sub-electrodes is different from at least one other driving signal of the driving signals;

wherein each pixel sub-electrode at least comprises one strip-shaped electrode, and at least some of the strip-shaped electrodes of the plurality of pixel sub-electrodes are arranged at intervals;

wherein the display panel comprises a blocking electrode group, comprising a strip-shaped blocking electrode portion; and in an arrangement direction of the strip-shaped electrodes, a width of the strip-shaped blocking electrode portion is less than that of each strip-shaped electrode, a distance between every two adjacent strip-shaped blocking electrode portions is less than that between every two adjacent strip-shaped electrodes, and a distance between the strip-shaped electrode and the strip-shaped blocking electrode portion adjacent to each other is less than that between every two adjacent strip-shaped electrodes.

17. A method for driving a display panel, wherein the display panel comprises: a first base substrate and a plurality of pixels on one side of the first base substrate; each pixel comprises:

a pixel electrode comprising a plurality of pixel sub-electrodes independent from each other and configured to form an electric field with an angle greater than 0 with respect to a direction perpendicular to the first base substrate under control of driving signals;

a common electrode on a side of the pixel electrode away from the first base substrate; and an electrophoretic liquid layer between the pixel electrode and the common electrode, wherein the electrophoretic liquid layer comprises a plurality of charged particles therein;

wherein the driving signals are provided to the plurality of pixel sub-electrodes; and any one driving signal of the driving signals provided to the plurality of pixel sub-electrodes is different from at least one other driving signal of the driving signals;

wherein the method comprises:

determining a pixel in which charged particles are to move along the direction parallel to the plane where the first base substrate is located according to a picture to be displayed; and in a data writing stage, providing a first driving signal to the common electrode in the pixel in which the charged particles are to move along the direction parallel to the plane where the first base substrate is located, providing second driving signals to the plurality of pixel sub-electrodes in the pixel electrode in the pixel, to drive at least a part of the charged particles to move along the direction parallel to the plane where the first base substrate is located;

wherein any one second driving signal of the second driving signals provided to the plurality of pixel sub-electrodes is different from at least one other second driving signal of the second driving signals.

18. The method of claim 17, wherein the display panel comprises a plurality of blocking electrode groups, and in the data writing stage, the method further comprises:

providing third driving signals to different strip-shaped blocking electrode portions in each blocking electrode group to form an electric field for preventing the charged particles in the pixel from moving to an adjacent pixel;

wherein any one third driving signal of the third driving signals provided to the different strip-shaped blocking electrode portions is different from at least one other third driving signal of the third driving signals.

* * * * *